US009118805B2

(12) United States Patent
Shimada et al.

(10) Patent No.: US 9,118,805 B2
(45) Date of Patent: Aug. 25, 2015

(54) MULTI-POINT CONNECTION DEVICE, SIGNAL ANALYSIS AND DEVICE, METHOD, AND PROGRAM

(75) Inventors: Osamu Shimada, Minato-ku (JP); Toshiyuki Nomura, Minato-ku (JP); Akihiko Sugiyama, Minato-Ku (JP); Osamu Houshuyama, Minato-ku (JP)

(73) Assignee: NEC CORPORATION, Tokyo (JP)

( * ) Notice: Subject to any disclaimer, the term of this patent is extended or adjusted under 35 U.S.C. 154(b) by 1014 days.

(21) Appl. No.: 12/666,827

(22) PCT Filed: Jun. 26, 2008

(86) PCT No.: PCT/JP2008/061622
§ 371 (c)(1),
(2), (4) Date: Dec. 28, 2009

(87) PCT Pub. No.: WO2009/001887
PCT Pub. Date: Dec. 31, 2008

(65) Prior Publication Data
US 2010/0198990 A1 Aug. 5, 2010

(30) Foreign Application Priority Data
Jun. 27, 2007 (JP) .................. 2007-168547

(51) Int. Cl.
*H04L 12/16* (2006.01)
*H04N 7/15* (2006.01)
(Continued)

(52) U.S. Cl.
CPC .............. *H04N 7/152* (2013.01); *G10L 19/008* (2013.01); *H04M 3/56* (2013.01)

(58) Field of Classification Search
USPC .................................. 370/266, 267
See application file for complete search history.

(56) References Cited

U.S. PATENT DOCUMENTS 5,867,815 A * 2/1999 Kondo et al. .................. 704/228
6,240,386 B1   5/2001 Thyssen et al.
6,327,276 B1 * 12/2001 Robert et al. .................. 370/260
(Continued)

FOREIGN PATENT DOCUMENTS

EP    1120775 A1   8/2001
EP    1533789 A1   5/2005
(Continued)

OTHER PUBLICATIONS

M. Kato, et al., "A Low-Complexity Noise Suppressor With Nonuniform Subbands and a Frequency-Domain Highpass Filter," Proceedings of ICASSP, May 2006, pp. 473-476, vol. 1.
(Continued)

*Primary Examiner* — Timothy J Weidner
(74) *Attorney, Agent, or Firm* — Sughrue Mion, PLLC

(57) ABSTRACT

Provided is a multi-point connection device including: a first signal receiving unit which receives a first signal containing a plurality of constituent elements and first analysis information expressing the relationship between the constituent elements contained in the first signal; a second signal receiving unit which receives a second signal containing a plurality of constituent elements and second analysis information expressing the relationship between the constituent elements contained in the second signal; a signal mixing unit which mixes the first signal and the second signal; and an analysis information mixing unit which mixes the first analysis information and the second analysis information.

13 Claims, 44 Drawing Sheets

(51) Int. Cl.
*G10L 19/008* (2013.01)
*H04M 3/56* (2006.01)

(56) References Cited

U.S. PATENT DOCUMENTS

| | | | |
|---|---|---|---|
| 6,463,414 B1* | 10/2002 | Su et al. | 704/270.1 |
| 6,850,496 B1* | 2/2005 | Knappe et al. | 370/260 |
| 7,945,006 B2* | 5/2011 | Chen et al. | 370/266 |
| 2001/0053132 A1 | 12/2001 | Attimont et al. | |
| 2005/0152391 A1* | 7/2005 | Effros et al. | 370/432 |
| 2007/0027685 A1* | 2/2007 | Arakawa et al. | 704/226 |
| 2008/0008323 A1* | 1/2008 | Hilpert et al. | 381/1 |
| 2010/0189280 A1* | 7/2010 | Shimada et al. | 381/94.1 |
| 2010/0217586 A1* | 8/2010 | Shimada et al. | 704/226 |
| 2010/0228545 A1* | 9/2010 | Ito et al. | 704/226 |

FOREIGN PATENT DOCUMENTS

| | | |
|---|---|---|
| JP | 06-078062 A | 3/1994 |
| JP | 2000-022603 A | 1/2000 |
| JP | 2000-069179 A | 3/2000 |
| JP | 2000-083229 A | 3/2000 |
| JP | 2002-204175 A | 7/2002 |
| WO | WO 2006/084916 A2 | 8/2006 |

OTHER PUBLICATIONS

N.S. Jayant, et al. "Digital Coding of Waveforms, Principles and Applications to Speech and Video," 1990, Prentice-Hall, Inc.

Alan V. Oppenheim, et al., "Digital Signal Processing," 1975, pp. 238-251, Prentice-Hall, Inc.

P.P. Vaidyanathan, et al., "Multirate Systems and Filter Banks," 1993, pp. 188-271, Prentice Hall.

Manfred R. Schroeder, et al., "Code-Excited Linear Prediction (CELP): High-Quality Speech At Very Low Bit Rates," IEEE, 1985, pp. 937-940.

Yariv Ephraim, et al., "Speech Enhancement Using a Minimum Mean-Square Error Short-Time Spectral Amplitude Estimator," IEEE Transactions on Acoustics, Speech, and Signal Processing, vol. ASSP-32, No. 6, Dec. 1984, pp. 1109-1121.

Y. Ephraim, et al., "Speech Enhancement Using a Minimum Mean-Square Error Log-Spectral Amplitude Estimator," IEEE Transactions on Acoustics, Speech and Signal Processing, Apr. 1985, pp. 443-445, vol. ASSP-33, No. 2.

Thomas Lotter, et al., "Speech Enhancement by MAP Spectral Amplitude Estimation Using a Super-Gaussian Speech Model," EURASIP Journal on Applied Signal Processing 2005:7, Jul. 2005., pp. 1110-1126.

Steven F. Boll, "Suppression of Acoustic Noise in Speech Using Spectral Subtraction," IEEE Transactions on Acoustics, Speech, and Signal Processing, Apr. 1979, pp. 113-120, vol. ASSP-27, No. 2.

"Information technology—MPEG audio technologies—Part 1: MPEG Surround" International Standard, ISO/IEC 23003-1, First Edition, Feb. 15, 2007, pp. i.-v; 1-19.

J. Benesty, et al., "Speech Enhancement," Springer, 2005, pp. 371-402.

Michael Brandstein, et al., "Microphone Arrays, Signal Processing Techniques and Applicaitons," Springer, 2001, pp. 1-17.

J. Benesty, et al., "Speech Enhancement," Springer, 2005, pp. 229-246.

J. Benesty, et al., "Speech Enhancement," Springer, pp. 271-369, 2005.

"Call for Proposals on Spatial Audio Object Coding," International Organisation for Standardisation, ISO/IEC JTC1/SC29/WG11, Jan. 2007, Marrakech, Morocco.

J. Benesty et al., "Speech Enhancement," Springer, pp. 271-298, 2005.

J. Benesty et al., "Speech Enhancement," Springer, pp. 299-327, 2005.

J. Benesty et al., "Speech Enhancement," Springer, pp. 329-352, 2005.

J. Benesty et al., "Speech Enhancement," Springer, pp. 353-369, 2005.

* cited by examiner

SIGNAL CONTROL INFORMATION

SIGNAL CONTROL INFORMATION

SIGNAL CONTROL INFORMATION

SIGNAL CONTROL INFORMATION

SIGNAL CONTROL INFORMATION

SIGNAL CONTROL INFORMATION

SIGNAL CONTROL INFORMATION

SIGNAL CONTROL INFORMATION

SIGNAL CONTROL INFORMATION

SIGNAL CONTROL INFORMATION

SIGNAL CONTROL INFORMATION

SIGNAL CONTROL INFORMATION

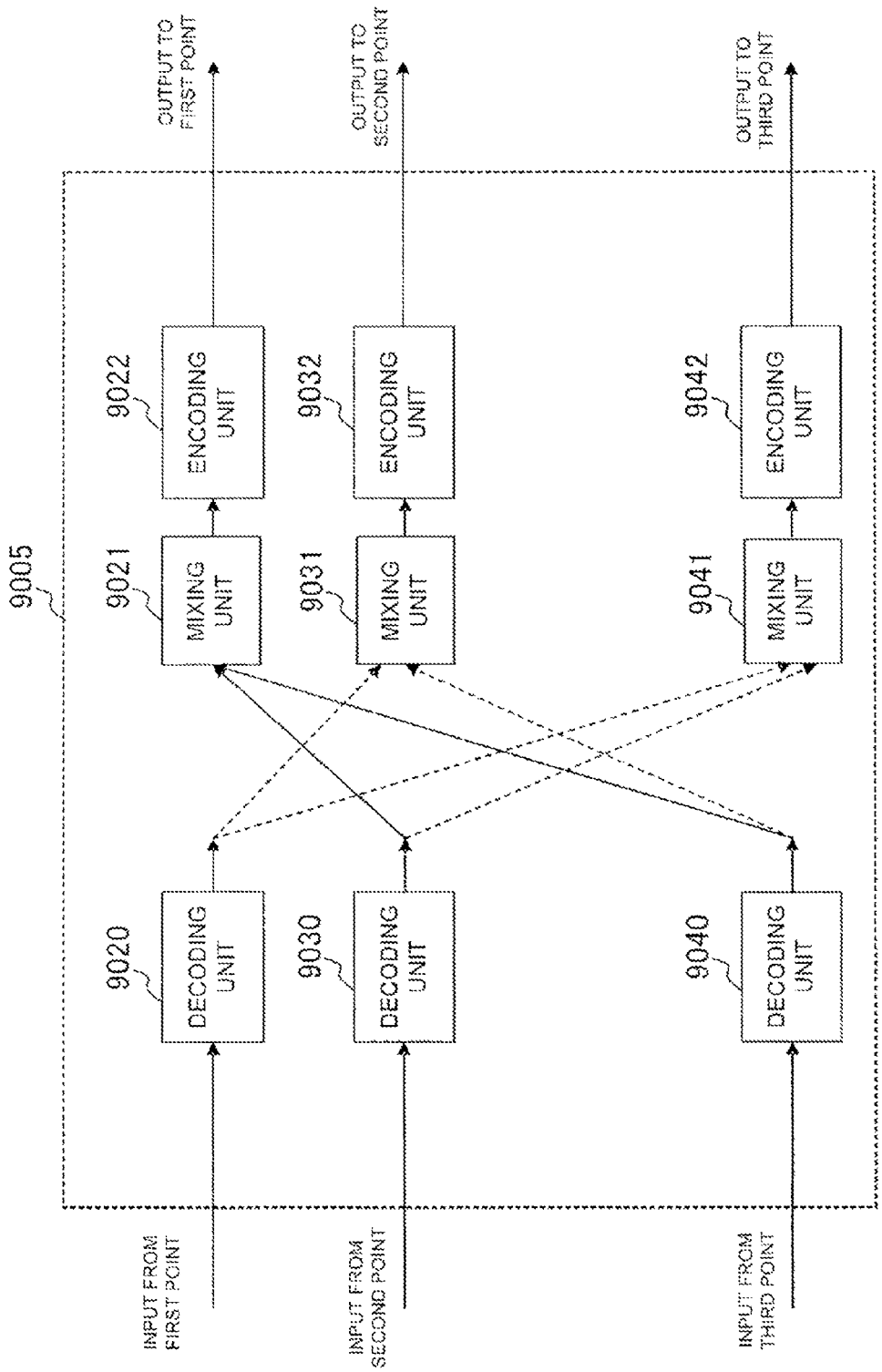

MULTI-POINT CONNECTION DEVICE, SIGNAL ANALYSIS AND DEVICE, METHOD, AND PROGRAM

APPLICABLE FIELD IN THE INDUSTRY

The present invention relates to a multipoint control unit, a signal analysis and a device, and a method and a program thereof.

BACKGROUND ART

A multipoint control system, which connects a plurality of points to each other, and enables participants in a remote site to participates in and hold a conference, is widely utilized, for example, as a remote conference system.

One example of the multipoint control system is disclosed in Patent document 1 (hereinafter, referred to as a prior art 1). The multipoint control system, as shown in FIG. 74, includes terminals 9000, 9001, and 9002 being dispersively arranged in respective points, and a multipoint control unit (MCU) 9005 for controlling data exchange between the terminals. The multipoint control unit 9005 mixes signals outputted from respective terminals, and distributes it to all terminals. The multipoint control unit 9005 excludes only the signal outputted from the terminal of a distribution destination when mixing the signals. For example, the signal being distributed to the terminal 9000 is one obtained by mixing the signals outputted from the terminals 9001 and 9002.

A configuration example of the multipoint control unit 9005 is shown in FIG. 75. While an example of connecting three points is shown in FIG. 75, the multipoint control unit 9005 can be configured to connect the points of which the number is arbitrary. In FIG. 75, transmission signals received from the terminals arranged in a first point to a third point are outputted to decoding units 9020, 9030, and 9040 via an input terminal, and decoded in the decoding units 9020, 9030, and 9040, respectively. The decoded signals are further outputted to mixing units 9021, 9031, and 9041. The mixing unit 9021 mixes the decoded signals coming from the second point and the third point, generates a mixed signal being sent to the first point, and outputs the mixed signal to an encoding unit 9022. The mixing unit 9031 mixes the decoded signals coming from the first point and the third point, generates the mixed signal being sent to the second point, and outputs the mixed signal to an encoding unit 9032. The mixing unit 9041 mixes the decoded signals coming from the first point and the second point, generates the mixed signal being sent to the third point, and outputs the mixed signal to an encoding unit 9042. Each of the encoding units 9022, 9032, and 9042 encodes the mixed signal, and outputs it to an output terminal via each terminal. Additionally, not each of the mixing units 9021, 9031, and 9041 mixes a plurality of the signals simply, but also pre-decided various media processes (an image process, a sound process, a data process, etc.) are applicable hereto.

A first configuration example of the terminals 9000, 9001, and 9002 is shown in FIG. 74. Additionally, each of these terminals can assume an identical configuration, so the configuration of only the terminal 9000 is shown. From now on, the terminal 9000 is exemplified for explanation. The terminal 9000 is configured of a transmission unit 9006 including a noise suppression unit 9010 and an encoding unit 9011, and a receiving unit 9007 including a decoding unit 9012. The input signal is inputted into the noise suppression unit 9010 of the transmission unit 9006 via the input terminal. For example, with general mobile telephones, the signal caught by a microphone (a microphone signal) becomes an input signal. The microphone signal is configured of desired sound and background noise (hereinafter, referred to as noise), and the noise suppression unit 9010 suppresses only the noise with the desired sound kept as it stands, if possible, and outputs it as noise-suppressed sound to the encoding unit 9011. The encoding unit 9011 encodes the noise-suppressed sound outputted from the noise suppression unit 9010 based upon the encoding technique such as CELP. After the encoded information is outputted via the output terminal, and subjected to modulation/amplitude etc., it is outputted to a transmission path. That is, the transmission unit 9006 performs the process such as sound encoding after performing the noise suppression process, and output the signal to the transmission path. The receiving unit 9007, after demodulating and digitalizing the signal received from the transmission path, outputs it to the decoding unit 9012. The decoding unit 9012 decodes the inputted signal, and outputs it as an output signal. The output signal is inputted into a loudspeaker, and reproduced as an audible signal.

The noise suppression unit 9010, which is generally known as a noise suppressor (noise suppression system), suppresses the noise superposed upon a desired sound signal. The noise suppressor operates so as to suppress the noise coexisting in the desired sound signal by, as a rule, estimating a power spectrum of a noise component by employing the input signal converted into a frequency region, and subtracting this estimated power spectrum from the input signal. Successively estimating the power spectrum of the noise component makes it possible to apply the noise suppressor also for the suppression of non-constant noise. One example of the technology of the noise suppressor is disclosed in Patent document 2 (hereinafter, referred to as a prior art 2).

In addition, the technology of curtailing an arithmetic quantity for suppression of the noise is disclosed in Non-patent document 1 (hereinafter, referred to as a prior art 3).

These techniques are identical to each other in a basic operation. That is, the above technique is for converting the input signal into the frequency region with a linear transform, extracting an amplitude component, and calculating a suppression coefficient frequency component by frequency component. Combining a product of the above suppression coefficient and amplitude in each frequency component, and a phase of each frequency component, and subjecting it to an inverse conversion allows a noise-suppressed output to be obtained. At this time, the suppression coefficient is a value ranging from zero to one (1), the output is completely suppressed, namely, the output is zero when the suppression coefficient is zero, and the input is outputted as it stands without suppression when the suppression coefficient is one (1).

As a second configuration example of the terminals 9000, 9001, and 9002, the case that the noise suppression unit 9010 is excluded from a first configuration example of FIG. 74 and does not exist can be listed. This configuration is equivalent to not only the case that the terminal is not provided with the noise suppression unit 9010, but also the case that a user switches off its function, or the case that a suppression degree of the noise suppression unit 9010 is not sufficient. In such a terminal, the noise etc. getting mixed with the desired sound signal is not suppressed sufficiently, and is transmitted to other terminals as it stands. In this case, the noise gets mixed with the mixed signal that a participant of the conference hears, and hence, a sound quality declines. This causes a problem that the participant hears important phrases by mistake, or his/her fatigue augments due to long-time utilization of the above terminal. The similar problem arises in the case that a suppression degree of the noise suppression unit 9010 is not sufficient, or the function of the noise suppression unit 9010 is invalidly set even though the terminal of the first configuration example having the noise suppression unit 9010 is employed.

Herein, as a rule, residual noise, which stays as a result of being not suppressed, and distortion of the noise-suppressed sound, which is outputted, are in a relation of trade-off. Reducing the residual noise leads to an increase in the distortion, and reducing the distortion leads to an increase in the residual noise. In the prior art 1, the noise suppression unit of the transmission unit adjusts a balance between the residual noise and the distortion, namely, controls the desired sound and the noise.

Patent document 1: JP-P2000-83229A
Patent document 2: JP-P2002-204175A
Non-patent document 1: PROCEEDINGS OF ICASSP, Vol. 1, pp. 473-476, May 2006

DISCLOSURE OF THE INVENTION

Problems to be Solved by the Invention

The prior art 1, however, has a point at issue that the receiving unit cannot control the input signal for each component element (for example, for each desired sound and for each noise) corresponding to each sound source of the input signal of each point. For example, while the best status of a balance between the residual noise and the distortion differs dependent upon environments of the receiving unit side, the receiving unit side cannot adjust it. Further, the receiving unit side cannot take a control for each signal coming from each point.

Thereupon, the present invention has been accomplished in consideration of the above-mentioned problems, and an object thereof is to provide a technology that enables the receiving unit to control the input signal for each component element corresponding to each sound source of the input signal of each point.

Means to Solve the Problem

The present invention for solving the above-mentioned problem is a multipoint control unit, comprising: a first signal receiving unit for receiving a first signal including a plurality of component elements, and first analysis information indicative of a relation between the plurality of component elements being included in said first signal; a second signal receiving unit for receiving a second signal including a plurality of component elements, and second analysis information indicative of a relation between the plurality of component elements being included in said second signal; a signal mixing unit for mixing said first signal and said second signal; and an analysis information mixing unit for mixing said first analysis information and said second analysis information.

The present invention for solving the above-mentioned problem is a signal analysis device, comprising: a signal receiving unit for receiving an input signal including a plurality of component elements; a signal analysis unit for generating analysis information indicative of a relation between said plurality of component elements from said input signal; and an object information extraction unit for generating object information indicative of a characteristic of said input signal for frequency component.

The present invention for solving the above-mentioned problem is a signal control device, comprising: a signal receiving unit for receiving an input signal including a plurality of component elements, analysis information indicative of a relation between said plurality of component elements, and object information indicative of a characteristic of said input signal for each frequency component; and an output signal generation unit for receiving component element rendering information for controlling an output of said component element, and generating an output signal in which said component element has been controlled, based upon said analysis information, said object information, and said component element rendering information.

The present invention for solving the above-mentioned problem is a signal control device, comprising: a signal receiving unit for receiving an input signal including a plurality of component elements, analysis information indicative of a relation between said plurality of component elements, and object information indicative of a characteristic of said input signal for each frequency component; and an output signal generation unit for receiving object rendering information indicative of a relation between said input signal and an output signal for each frequency component, and signal control information for controlling a specific component element, and generating an output signal in which said component element has been controlled, based upon said analysis information, said object information, said object rendering information, and said signal control information.

The present invention for solving the above-mentioned problem is a multipoint control method, comprising: receiving a first signal including a plurality of component elements, and first analysis information indicative of a relation between the plurality of component elements being included in said first signal; receiving a second signal including a plurality of component elements, and second analysis information indicative of a relation between the plurality of component elements being included in said second signal; mixing said first signal and said second signal; and mixing said first analysis information and said second analysis information.

The present invention for solving the above-mentioned problem is a signal analysis method, comprising: from an input signal including a plurality of component elements, generating analysis information indicative of a relation between said plurality of component elements; and generating object information indicative of a characteristic of said input signal for each frequency component.

The present invention for solving the above-mentioned problem is a signal control method, comprising: receiving an input signal including a plurality of component elements, analysis information indicative of a relation between said plurality of component elements, and object information indicative of a characteristic of said input signal for each frequency component; and receiving component element rendering information for controlling an output of said component element, and generating an output signal in which said component element has been controlled, based upon said analysis information, said object information, and said component element rendering information.

The present invention for solving the above-mentioned problem is a signal control method, comprising: receiving an input signal including a plurality of component elements, analysis information indicative of a relation between said plurality of component elements, and object information indicative of a characteristic of said input signal for each frequency component; and receiving object rendering information indicative of a relation between said input signal and an output signal for each frequency component, and signal control information for controlling a specific component element, and generating an output signal in which said component element has been controlled, based upon said analysis information, said object information, said object rendering information, and said signal control information.

The present invention for solving the above-mentioned problem is a program for causing an information processing device to execute the processes of: receiving a first signal including a plurality of component elements, and first analysis information indicative of a relation between the plurality of component elements being included in said first signal; receiving a second signal including a plurality of component elements, and second analysis information indicative of a relation between the plurality of component elements being included in said second signal; mixing said first signal and said second signal; and mixing said first analysis information and said second analysis information.

The present invention for solving the above-mentioned problem is a program for causing an information processing device to execute the processes of: receiving an input signal including a plurality of component elements, generating analysis information indicative of a relation between said plurality of component elements from said input signal; and generating object information indicative of a characteristic of said input signal for each frequency component.

The present invention for solving the above-mentioned problem is a program for causing an information processing device to execute the processes of: receiving an input signal including a plurality of component elements, analysis information indicative of a relation between said plurality of component elements, and object information indicative of a characteristic of said input signal for each frequency component; and receiving component element rendering information for controlling an output of said component element, and generating an output signal in which said component element has been controlled, based upon said analysis information, said object information, and said component element rendering information.

The present invention for solving the above-mentioned problem is a program for causing an information processing device to execute the processes of: receiving an input signal including a plurality of component elements, analysis information indicative of a relation between said plurality of component elements, and object information indicative of a characteristic of said input signal for each frequency component; and receiving object rendering information indicative of a relation between said input signal and an output signal for each frequency component, and signal control information for controlling a specific component element, and generating an output signal in which said component element has been controlled, based upon said analysis information, said object information, said object rendering information, and said signal control information.

An Advantageous Effect of the Invention

In the present invention, the transmission unit analyzes the signal, and calculates analysis information, the multipoint control unit mixes the analysis information, and the receiving unit controls the input signal based upon the mixed analysis information.

Thus, the receiving unit can control the input signal for each component element corresponding to each sound source of the input signal of each point. For example, the receiving unit side can make the adjustment such that the sound coming from a main site is allowed to be incorporated into the noise, but the noise is excluded from the sound coming from a sub site.

In addition, the receiving unit can curtail the arithmetic quantity relating to the calculation of the signal analysis because the transmission unit calculates the analysis information.

BRIEF DESCRIPTION OF THE DRAWINGS

FIG. 75 shows a configuration example of a multipoint control unit 9005.

Figure 1:
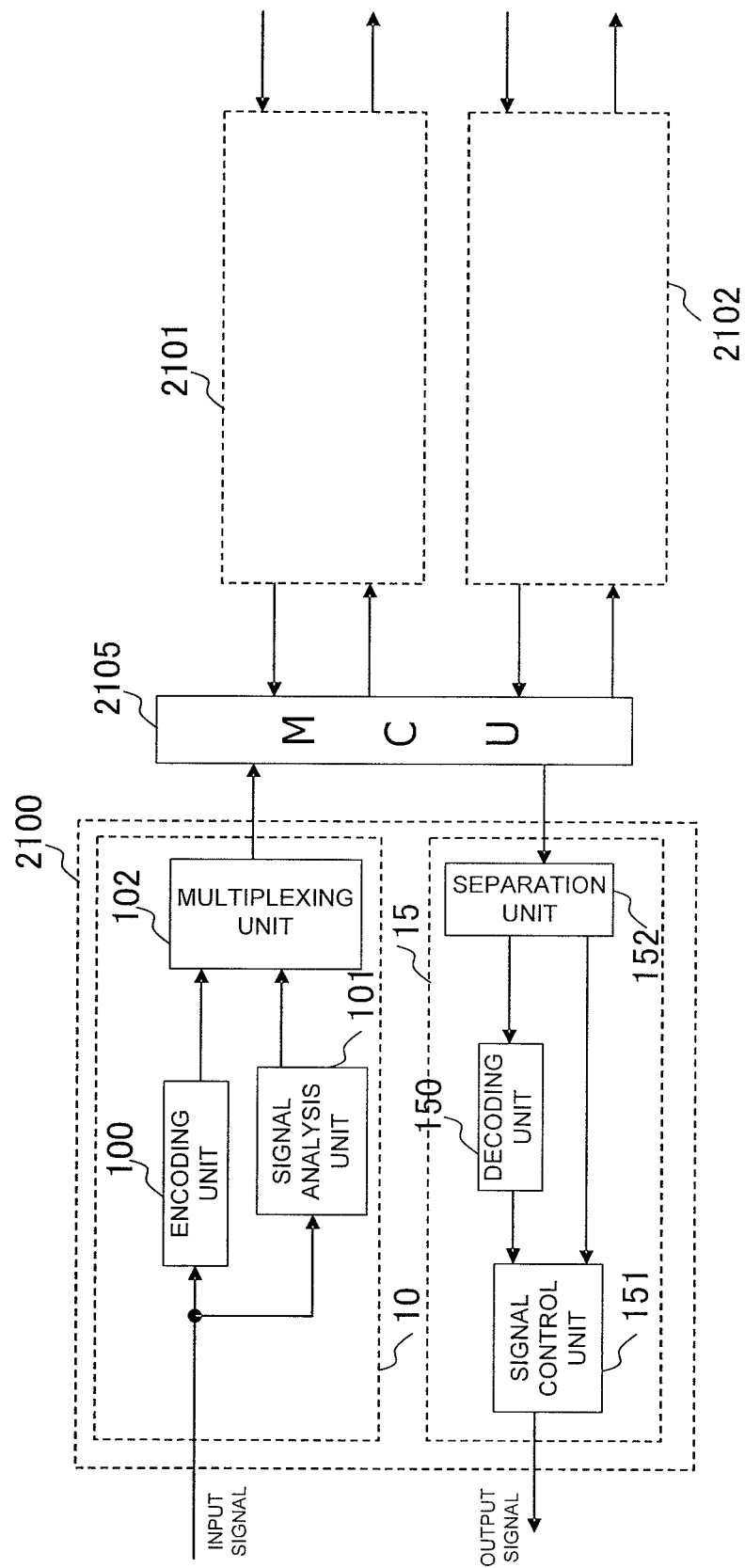
FIG. 1 is a block diagram illustrating a first embodiment of the present invention.

DESCRIPTION OF NUMERALS 10, 2506, and 90 transmission units
15, 35, and 2507 receiving units
100, 1100, 2113, 2123, 2133, 2513, 9011, 9022, 9032, and 9042 encoding units
101, 900, and 1101 signal analysis units
102, 2115, 2125, 2135, 2511, and 2514 multiplexing units
110, 120, 171, and 920 conversion units
111 quantization unit
121, 911, 912, and 121 analysis information calculation units
150, 1150, 2111, 2121, 2131, 2511, 2521, 2531, 9012, 9020, 9030, and 9040 decoding units
151, 2560, and 2760 signal control units
152, 2110, 2120, 2130, 2510, 2520, 2530, and 2551 separation units
160 inverse quantization unit
161 and 173 inverse conversion units
172 and 360 signal processing units
200 background sound estimation unit
201, 252, and 452 suppression coefficient calculation units
201 suppression coefficient calculation unit
202 background sound information generation unit
203 and 207 signal versus background sound ratio calculation units
204 signal versus background sound ratio encoding unit
205 background sound encoding unit
250 and 450 suppression coefficient re-configuration units
251, 451, and 470 multipliers
253 subtracter
260 suppression coefficient decoding unit
261 signal versus background sound ratio decoding unit
262 suppression coefficient conversion unit
263 background sound decoding unit
264 suppression coefficient generation unit
460 suppression coefficient modification unit
461 signal versus background sound ratio modification unit
464 background sound modification unit
471 comparison unit
472 designated suppression coefficient control unit 473 switch 651 and 653 component element parameter generation units 910 quantizing distortion calculation unit 1020 background sound estimation unit 1200 signal separation analysis unit 1201 separation filter encoding unit 1202 separation filter decoding unit 1203 filter 1210 sound environment analysis unit 1211 sound environment information encoding unit 1212 sound environment information decoding unit 1213 sound environment information processing unit 2021 suppression coefficient encoding unit 2100, 2101, 2102, 2300, 2301, 2302, 2500, 2501, 2502, 3000, 3001, 3002, 3300, 3301, 3302, 3401, 3402, 3403, 3404, 3405, 9001, 9002, 9006, and 9007 terminals 2105, 2505, 3410, 3411, and 9005 multipoint control units (MCU)

2112, 2122, 2132, 2116, 2126, 2136, 2512, 9021, 9031, and 9041 mixing units 2114, 2117, 2124, 2127, 2134, 2137, and 2516 analysis information mixing units 2150 and 2160 analysis information decoding units 2151 and 2153 analysis parameter mixing units 2152 analysis information encoding unit 2201 and 2231 background sound mixing units 2202, 2232, 2200, and 2230 selection units 2203 and 2233 suppression coefficient mixing units 2204 and 2214 suppression coefficient conversion units 2205 suppression coefficient inverse-conversion unit 2510 object information extraction unit 2515 object information mixing unit 2550, 2700, and 2900 output signal generation units 2561 and 2564 rendering information generation units 2563 rendering unit 2565 and 2566 component element information conversion units 2611 object rendering information generation unit 2770 and 2780 object rendering information modification units 2810 object rendering information change unit 2910 and 3001 component element information conversion units 3000 and 3002 component element parameter generation units 3500, 3501, 3502, and 3503 computers 9010 noise suppression unit

BEST MODE FOR CARRYING OUT THE INVENTION

A first embodiment of the present invention will be explained in details by employing FIG. 1. This embodiment is characterized in that the receiving side terminal controls the input signal for each component element corresponding to each sound source of the input signal of each point based upon the analysis information.

The multipoint control system of this embodiment, as shown in FIG. 1, includes terminals 2100, 2101, and 2102 being dispersively arranged in respective points, and a multipoint control unit (MCU) 2105 for controlling data exchange between the terminals. The multipoint control unit 2105 mixes the signals outputted from respective terminals, and distributes it to all terminals. The multipoint control unit 2105 excludes only the signal outputted from the terminal of a distribution destination when mixing the signals. For example, the signal being distributed to the terminal 2100 is one obtained by mixing the signals outputted from the terminals 2101 and 2102, respectively. While an example of connecting three points is shown in FIG. 1, the multipoint control unit 2105 can be configured to connect the points of which the number is arbitrary.

A configuration example of the terminals 2100, 2101, and 2102 will be explained by making a reference to FIG. 1 to FIG. 5. Additionally, each of these terminals can assume an identical configuration, so the configuration example of only the terminal 2100 is shown. Hereinafter, the terminal 2100 is exemplified for explanation.

Upon making a reference to FIG. 1, the terminal 2100 is configured of a transmission unit 10 including an encoding unit 100, a signal analysis unit 101, and a multiplexing unit 102, and a receiving unit 15 including a decoding unit 150, a signal control unit 151, and a separation unit 152. The input signal is inputted into the encoding unit 100 and the signal analysis unit 101 each of which exists in the transmission unit 10. The encoding unit 100 encodes the input signal, and outputs the encoded signal to the multiplexing unit 102. The signal analysis unit 101 calculates the analysis information of the component element corresponding to each sound source being included in the input signal, and outputs it to the multiplexing unit 102. The multiplexing unit 102 multiplexes the encoded signal being inputted from the encoding unit 100, and the analysis information being inputted from the signal analysis unit 101, and outputs it to the transmission path as a transmission signal. The transmission signal is inputted into the separation unit 152 existing in the receiving unit 15. The separation unit 152 separates the transmission signal into the encoded signal and the analysis information, and outputs the encoded signal to the decoding unit 150, and the analysis information to the signal control unit 151. The decoding unit 150 decodes the encoded signal, generates the decoded signal, and outputs it to the signal control unit 151. Herein, the decoded signal is one that is configured of general plural sound sources. The signal control unit 151 manipulates the decoded signal outputted from the decoding unit 150 for each component element that corresponds to each sound source, based upon the analysis information outputted from the separation unit 152, and outputs it as an output signal. The signal control unit 151 may manipulate the decoded signal with the component element group, which is configured of a plurality of the component elements, defined as a unit instead of the component element corresponding to each sound source.

A configuration example of the encoding unit 100 will be explained in details by making a reference to FIG. 2. The encoding unit 100 receives the input signal, and outputs the encoded signal. The encoding unit 100 is configured of a conversion unit 110 and a quantization unit 111. At first, the input signal is inputted into the conversion unit 110. Next, the conversion unit 110 decomposes the input signal into frequency components, and generates a first converted signal. The conversion unit 110 outputs the first converted signal to the quantization unit 111. And, the quantization unit 111 quantizes the first converted signal, and outputs it as an encoded signal.

The conversion unit 110 configures one block by collecting a plurality of input signal samples, and applies a frequency conversion for this block. As an example of the frequency conversion, a Fourier transform, a cosine transform, a KL (Karhunen Loeve) transform, etc. are known. The technology related to a specific arithmetic operation of these transforms, and its properties are disclosed in Non-patent document 2

(DIGITAL CODING OF WAVEFORMS, PRINCIPLES AND APPLICATIONS TO SPEECH AND VIDEO, PRENTICE-HALL, 1990).

The conversion unit 110 can apply the foregoing transforms for a result obtained by weighting one block of the input signal samples with a window function. As such a window function, the window functions such as a Hamming window, a Hanning (Hann) window, a Kaiser window, and a Blackman window are known. Further, more complicated window functions can be employed. The technology related to these window functions is disclosed in Non-patent document 3 (DIGITAL SIGNAL PROCESSING, PRENTICE-HALL, 1975) and Non-patent document 4 (MULTIRATE SYSTEMS AND FILTER BANKS, PRENTICE-HALL, 1993).

An overlap of each block may be permitted at the moment that the conversion unit 110 configures one block from a plurality of the input signal samples. For example, with the case of applying an overlap of 30% of a block length, the last 30% of the signal sample belonging to a certain block is repeatedly employed in a plurality of the blocks as the first 30% of the signal sample belonging to the next block. The technology relating to the blocking involving the overlap and the conversion is disclosed in the Non-patent document 2.

In addition, the conversion unit 110 may be configured of a band-analysis filter bank. The band-analysis filter bank is configured of a plurality of band-pass filters. The band-analysis filter bank divides the received input signal into a plurality of frequency bands, and outputs them to the quantization unit 111. An interval of each frequency band of the band-analysis filter bank could be equal in some cases, and unequal in some cases. Band-dividing the input signal at an unequal interval makes it possible to lower/raise a time resolution, that is, the time resolution can be lowered by dividing the input signal into narrows bands with regard to a low-frequency area, and the time resolution can be raised by dividing the input signal into wide bands with regard to a high-frequency area. As a typified example of the unequal-interval division, there exists an octave division in which the band gradually halves toward the low-frequency area, a critical band division that corresponds to an auditory feature of a human being, or the like. The technology relating to the band-analysis filter bank and its design method is disclosed in the Non-patent document 4.

The quantization unit 111 removes redundancy of the inputted signal, and outputs the encoded signal. As a method of removing redundancy, there exists the method of taking a control such that a correlation between the inputted signals is minimized. In addition, the signal component that is not auditorily recognized may be removed by utilizing the auditory feature such as a masking effect. As a quantization method, the quantization methods such as a linear quantization method and a non-linear quantization method are known. The redundancy of the quantized signal can be furthermore removed by employing Huffman coding etc.

A configuration example of the decoding unit 150 will be explained in details by making a reference to FIG. 3. The decoding unit 150 receives a main signal, and outputs the decoded signal. The decoding unit 150 is configured of an inverse quantization unit 160 and an inverse conversion unit 161. The inverse quantization unit 160 inverse-quantizes the received main signal of each frequency, and generates the first converted signal that is configured of a plurality of the frequency components. And, the inverse quantization unit 160 outputs the first converted signal to the inverse conversion unit 161. The inverse conversion unit 161 inverse-converts the first converted signal, and generates the decoded signal. And, the inverse conversion unit 161 outputs the decoded signal.

As an inverse conversion that the inverse conversion unit 161 applies, the inverse conversion corresponding to the conversion that the conversion unit 110 applies is preferably selected. For example, when the conversion unit 110 configures one block by collecting a plurality of the input signal samples, and applies the frequency conversion for this block, the inverse conversion unit 161 applies the corresponding inverse conversion for the samples of which number is identical. Further, when an overlap of each block is permitted at the moment that the conversion unit 110 configures one block by collecting a plurality of the input signal samples, the inverse conversion unit 161, responding to this, applies an identical overlap for the inverse-converted signal. In addition, when the conversion unit 110 is configured of the band-analysis filter bank, the inverse conversion unit 161 is configured of a band-composition filter bank. The technology relating to the band-composition filter bank and its design method is disclosed in the Non-patent document 4.

Figure 2:
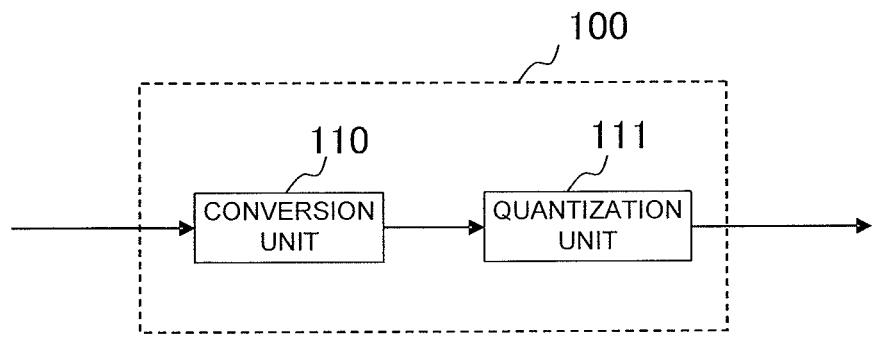
FIG. 2 shows a configuration example of an encoding unit 100.
Figure 3:
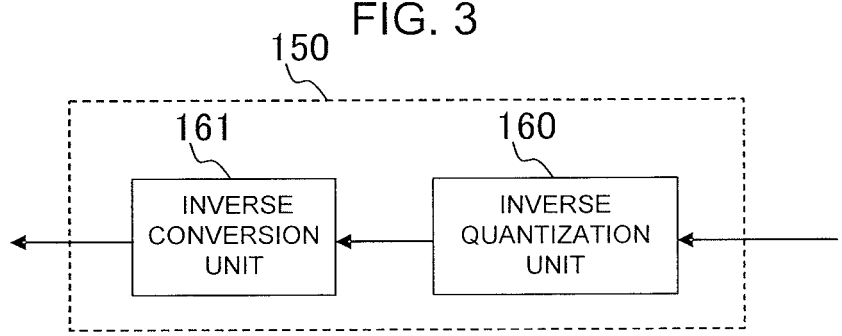
FIG. 3 shows a configuration example of a decoding unit 150.

While the encoding unit 100 of FIG. 2 and the decoding unit 150 of FIG. 3 were explained on the assumption that conversion/encoding having the conversion unit included therein was applied, a pulse code modulation (PCM), an adaptive differential pulse code modulation (ADPCM), and analysis composition coding, which is typified by CELP etc., in addition hereto may be applied. The technology relating to the PCM/ADPCM is disclosed in the Non-patent document 2. Further, the technology relating to the CELP is disclosed in Non-patent document 5 (IEEE INTERNATIONAL CONFERENCE ON ACOUSTIC, SPEECH, AND SIGNAL PROCESSING, 25.1.1, March 1985, pp. 937-940)

Further, the encoding unit 100 may output the input signal as it stands to the multiplexing unit 102 without performing the encoding process therefor, and the decoding unit 150 may input the main signal as it stands into the signal control unit 151 without performing the decoding process therefor. This configuration makes it possible to eliminate the distortion of the signal accompanied by the encoding/decoding process. In addition, a configuration may be made so that the encoding unit 100 and the decoding unit 150 perform a distortion-less compression/expansion process. This configuration enables the signal control unit 151 to receive the decoded signal without distorting the input signal.

A configuration example of the signal analysis unit 101 will be explained in details by making a reference to FIG. 4. The signal analysis unit 101 receives the input signal, and outputs the analysis information. The signal analysis unit 101 is configured of a conversion unit 120 and an analysis information calculation unit 121. The conversion unit 120 decomposes the received input signal into the frequency components, and generates the second converted signal. The conversion unit 120 outputs the second converted signal to the analysis information calculation unit 121. The analysis information calculation unit 121 decomposes the second converted signal into the component elements that correspond to the sound sources, and generates the analysis information indicative of a relation between a plurality of the component elements. And, the analysis information calculation unit 121 outputs the analysis information. Further, the analysis information calculation unit 121 may decompose the second converted signal into component element groups each of which is configured of a plurality of the component elements, and calculate the analysis information. The signal analysis unit 101 may encode the analysis information when the redundancy exists in the analysis information. This makes it possible to minimize the redundancy of the analysis information.

The technique of the conversion in the conversion unit 110 may be employed for the technique of the conversion in the conversion unit 120.

A configuration example of the signal control unit 151 will be explained in details by making a reference to FIG. 5. The signal control unit 151 receives the decoded signal and the analysis information, and outputs the output signal. The signal control unit 151 is configured of a conversion unit 171, a signal processing unit 172, and an inverse conversion unit 173. The conversion unit 171 decomposes the received decoded signal into the frequency components, and generates the second converted signal. The signal control unit 151 outputs the second converted signal to the signal processing unit 172. The signal processing unit 172 decomposes the second converted signal into the component elements that correspond to the sound sources by employing the analysis information, changes a relation between a plurality of the component elements, and generates the modified decoded signal. And, the signal processing unit 172 outputs the modified decoded signal to the inverse conversion unit 173. Further, the signal processing unit 172 may decompose the second converted signal into component element groups each of which is configured of a plurality of the component elements, and change a relation between a plurality of the component elements. The signal processing unit 172 performs the above-mentioned process after performing the decoding process in the case that the analysis information has been encoded in the analysis information calculation unit 121. The inverse conversion unit 173 inverse-converts the modified decoded signal, and generates the output signal. And, the inverse conversion unit 173 outputs the output signal. The technique of the inverse conversion in the inverse conversion unit 161 can be employed for the technique of the inverse conversion in the inverse conversion unit 173.

Next, a first configuration example and a second configuration example of the multipoint control unit 2105 will be explained.

At first, a first configuration example will be explained by employing FIG. 6 and FIG. 7.

Figure 6:
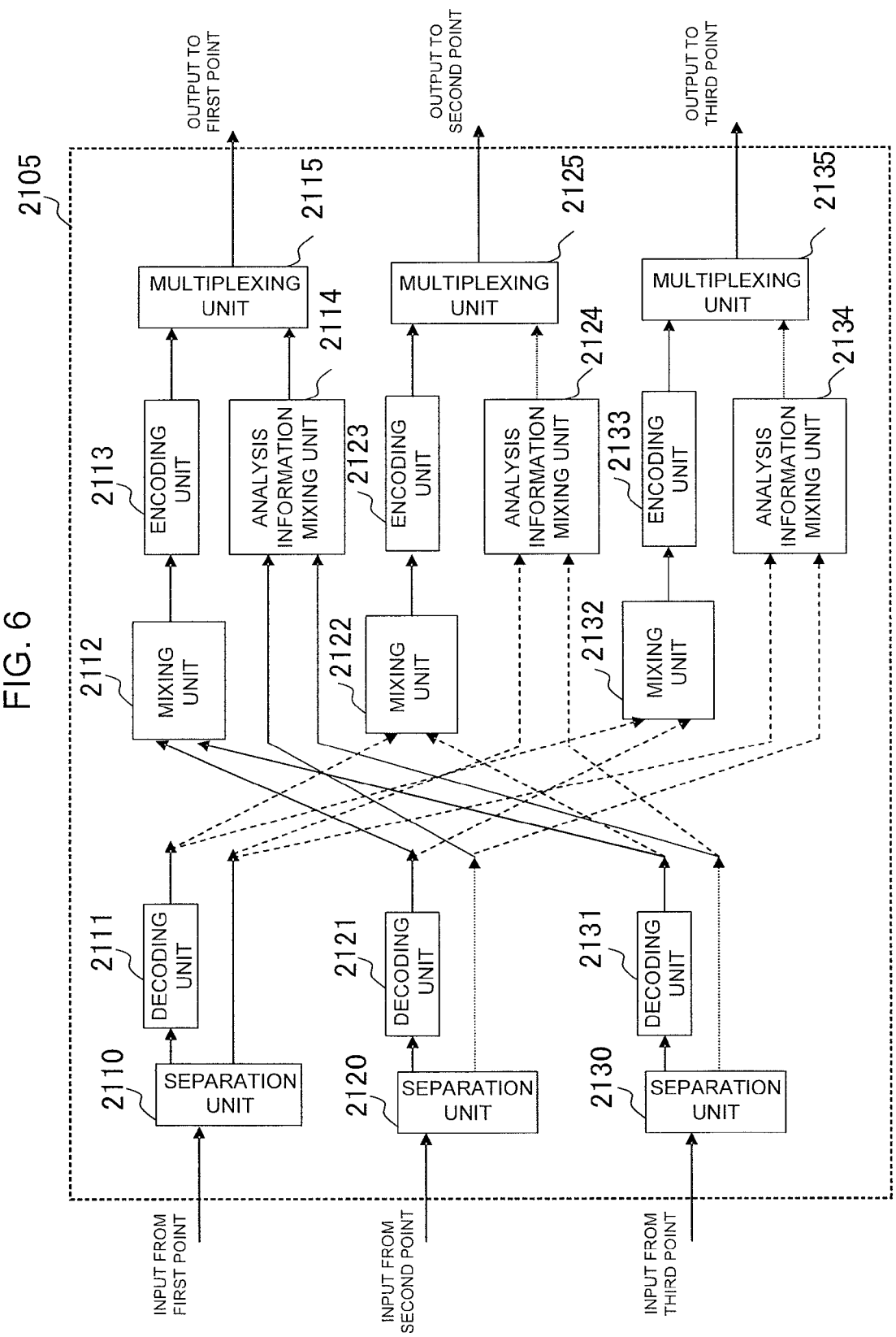
FIG. 6 shows a configuration example of a multipoint control unit (MCU) 2105.

A first configuration example of the multipoint control unit 2105 is shown in FIG. 6. While an example of connecting three points is shown in FIG. 6, the multipoint control unit 2105 can be configured to connect the points of which the number is arbitrary. The multipoint control unit 2105 is configured of separation units 2110, 2120, and 2130, decoding units 2111, 2121, and 2131, mixing units 2112, 2122, and 2132, encoding units 2113, 2123, and 2133, analysis information mixing units 2114, 2124, and 2134, and multiplexing units 2115, 2125, and 2135.

Upon making a reference to FIG. 6, the transmission signals outputted from the terminals installed in the first point to the third point are inputted into the separation units 2110, 2120, and 2130 via the input terminal, respectively. The separation units 2110, 2120, and 2130 separate the transmission signal into the encoded signal and the analysis information, and outputs the encoded signal to the decoding codes 2111, 2121, and 2131, and the analysis information to the analysis information mixing units 2114, 2124, and 2134, respectively. The decoding codes 2111, 2121, and 2131 generate the decoded signal by decoding the encoded signal, and outputs it to the mixing units 2112, 2122, and 2132, respectively.

The analysis information mixing unit 2114 generates the mixed analysis information by mixing the analysis information coming from the second point and the third point, and outputs the mixed analysis information to the multiplexing unit 2115. The analysis information mixing units 2124 generates the mixed analysis information by mixing the analysis information coming from the first point and the third point, and outputs the mixed analysis information to the multiplexing unit 2125. The analysis information mixing units 2134 generates mixed analysis information by mixing the analysis information coming from the first point and the second point, and outputs mixed analysis information to the multiplexing unit 2135.

The mixing unit 2112 generates the mixed signal by mixing the decoded signals coming from the second point and the third point, and outputs the mixed signal to the encoding unit 2113. The mixing unit 2122 generates the mixed signal by mixing the decoded signals coming from the first point and the third point, and outputs mixed signal to the encoding unit 2123. The mixing unit 2132 generates the mixed signal by mixing the decoded signals coming from the first point and the second point, and outputs the mixed signal to the encoding unit 2133. The encoding unit 2113, 2123, and 2133 encodes the mixed signal, and outputs the mixed encoded signal to the multiplexing units 2115, 2125, and 2135, respectively.

The multiplexing units 2115, 2125, and 2135 multiplex the mixed encoded signals outputted from the encoding unit 2113, 2123, and 2133, respectively, and the mixed analysis information outputted from the analysis information mixing units 2114, 2124, and 2134, respectively, and output it as a transmission signal to the transmission path of each point.

Additionally, the mixed analysis information and the mixed encoded signal explained above are identical to the analysis information and the encoded signal explained in the terminals 2100, 2101, and 2102 of FIG. 1, respectively. At the moment that the mixed analysis information and the mixed encoded signal haven been outputted as a transmission signal from the multiplexing units 2115, 2125, and 2135, and have been separated by the separation unit 152 of the terminals 2100, 2101, and 2102, they are handled as analysis information and an encoded signal, respectively. Herein, so as to clarify that the analysis information and the signals of the multi points have been mixed, the above analysis information and signal were explained as the mixed analysis information and the mixed encoded signal. The situation is similar in the following description as well.

Further, a detailed operation of each of the decoding units 2111, 2121, and 2131 is identical to that of the decoding unit 150, and a detailed operation of each of the encoding units 2113, 2123, and 2133 is identical to that of the encoding unit 100, so its explanation is omitted.

Figure 7:
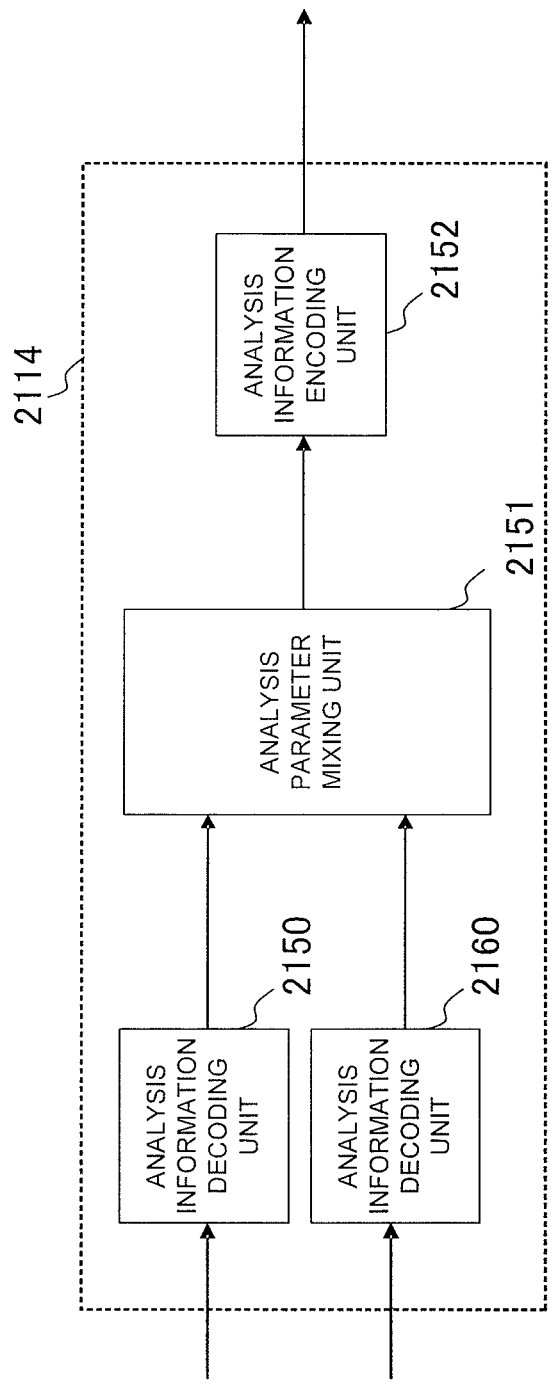
FIG. 7 shows a configuration example of an analysis information mixing unit 2114.

FIG. 7 shows a configuration example of the analysis information mixing units 2114, 2124, and 2134 of FIG. 6. Additionally, each of these terminals can assume an identical configuration, so the analysis information mixing unit 2114 is exemplified for explanation from now on.

The analysis information mixing unit 2114 is configured of analysis information decoding units 2150 and 2160, an analysis parameter mixing unit 2151, and an analysis information encoding unit 2152. The analysis information decoding unit 2150 has the analysis information outputted from the separation unit 2120 as an input, and the analysis information decoding unit 2160 has the analysis information outputted from the separation unit 2130 as an input. Each of the analysis information decoding units 2150 and 2160 decodes the inputted analysis information, converts it into an analysis parameter, and outputs the analysis parameter to the analysis parameter mixing unit 2151. The analysis parameter mixing unit 2151 mixes the analysis parameters outputted from the analysis information decoding units 2150 and 2160, respectively, for each frequency component, and outputs the mixed analysis parameter to the analysis information encoding unit 2152. As a method of mixing the parameters, all of the inputted analysis parameters may be mixed, and the analysis parameters may be selected responding to an importance degree thereof to mix only selected analysis parameters. As another method of mixing the parameters, a plurality of the inputted analysis parameters may be multiplexed to define it as one analysis parameter group. The analysis information encoding unit 2152 encodes the mixed analysis parameter, and outputs it as mixed analysis information.

Next, a second configuration example will be explained by employing FIG. 8 and FIG. 9.

Figure 8:
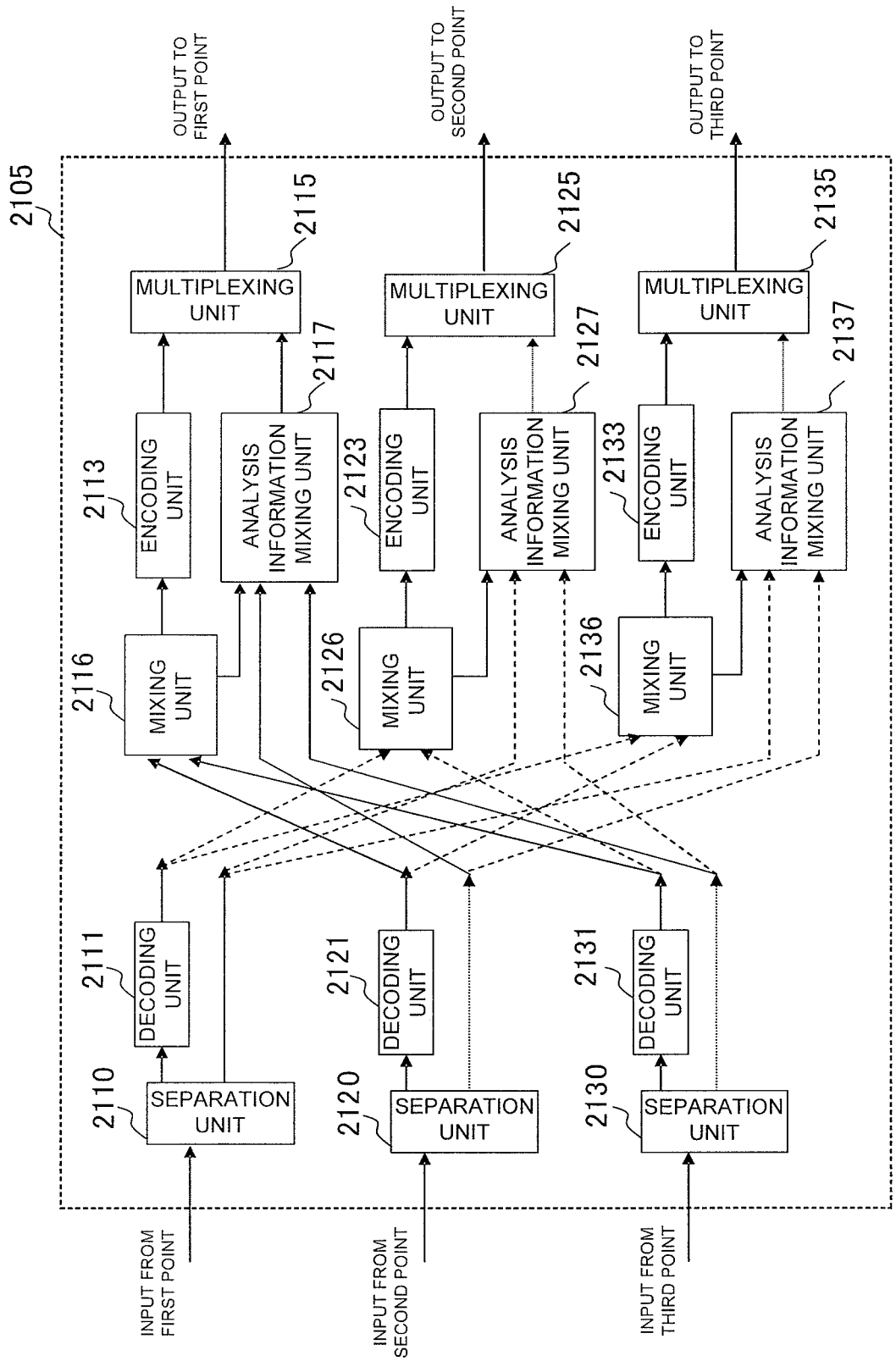
FIG. 8 shows a second configuration example of the multipoint control unit (MCU) 2105.

A second configuration example of the multipoint control unit 2105 is shown in FIG. 8. While an example of connecting three points is shown in FIG. 8, the multipoint control unit 2105 can be configured to connect the points of which the number is arbitrary. This configuration example, as compared with the first configuration example shown in FIG. 6, differs in a configuration of the mixing units 2116, 2126, and 2136, and a configuration of the analysis information mixing units 2117, 2127, and 2137. Specifically, it differs in a point that the mixing units 2116, 2126, and 2136 output the mixed information, which is generated at the moment of generating the mixed signal, to the analysis information mixing units 2117, 2127, and 2137, respectively. The analysis information mixing units 2117, 2127, and 2137, responding to this, mix a plurality of items of the analysis information by utilizing the mixed information, and output the mixed analysis information to the multiplexing units 2115, 2125, and 2135, respectively.

Herein, when the mixed signal is prepared by performing a weighted addition for the decoded signal of each terminal, the mixed information could be a weighting coefficient thereof. For example, there is almost no possibility that speakers of all terminals make an announcement simultaneously in a normal conversation, and only the speakers of one part of the terminals make an announcement in most cases. In such a case, it is enough for the mixing units 2116, 2126, and 2136 to make the weighting coefficient for the decoded signal coming from the terminal, which is uttering, larger than the weighting coefficient for the decoded signal coming from the terminal other than it. More effectively, defining the weighting coefficient for the decoded signal coming from the terminal, which is uttering, as 1 (one), and the weighting coefficient for the decoded signal coming from the terminal other than it as 0 (zero) makes it possible to curtail the processing quantity of the weighted addition process being performed by the mixing unit. Further, this scheme can be also utilized for selecting the process of mixing the analysis parameters being performed by the analysis information mixing unit, which is later described.

Figure 9:
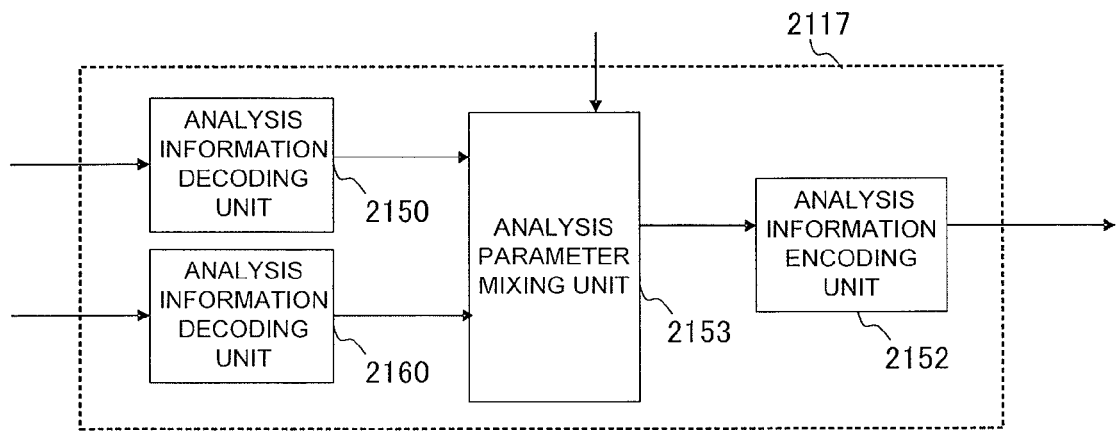
FIG. 9 shows a configuration example of an analysis information mixing unit 2117.

FIG. 9 shows a configuration example of the analysis information mixing units 2117, 2127, and 2137 of FIG. 8. Additionally, each of these terminals can assume an identical configuration, so the analysis information mixing unit 2117 is exemplified for explanation hereinafter.

Upon making a reference to FIG. 9, the analysis information mixing unit 2117 is configured of analysis information decoding units 2150 and 2160, an analysis parameter mixing unit 2153, and an analysis information encoding unit 2152. The analysis information mixing unit 2117, as compared with the analysis information mixing unit 2114 of FIG. 7, differs in a point that the analysis parameter mixing unit 2151 is replaced with the analysis parameter mixing unit 2153, and a point that the mixed information is inputted into the analysis parameter mixing unit 2153. Hereinafter, the analysis parameter mixing unit 2153 will be explained.

The analysis parameter mixing unit 2153 mixes the analysis parameters outputted from the analysis information decoding units 2150 and 2160 for each frequency component by utilizing the inputted mixed information, and outputs it to the analysis information encoding unit 2152. As a method of mixing the analysis parameters, all of the inputted analysis parameters may be mixed, and the analysis parameters may be selected responding to an importance degree thereof to mix only selected analysis parameters. As another method of mixing the analysis parameters, a plurality of the inputted analysis parameters may be multiplexed to define it as one analysis parameter group.

As explained above, the first embodiment of the present invention enables the receiving unit to control the input signal for each component element corresponding to each sound source of the input signal of each point based upon the analysis information in which the analysis information of each point has been mixed.

In addition, the receiving unit can curtail the arithmetic quantity relating to the calculation of the analysis information because the transmission unit calculates the analysis information. Further, the transmission quantity can be curtailed because the multipoint control unit mixes a plurality of the input signals, and mixes the analysis information of a plurality of the input signals. In addition, the receiving unit does not need to generate the mixed analysis information because the multipoint control unit generates the mixed analysis information corresponding to the mixed input signal, which makes it possible to further curtail the arithmetic quantity relating to the calculation of the analysis information in the receiving unit.

A second embodiment of the present invention will be explained. This embodiment is characterized in controlling the objective sound and the background sound based upon the analysis information with the input signal, in which desired sound (hereinafter, objective sound) and noise (hereinafter, background sound) coexist, targeted as a sound source.

A configuration of this embodiment is represented in FIG. 1. Upon making a reference to FIG. 1, each of the terminals 2100, 2101, and 2102 can assume an identical configuration, so a configuration example of only the terminal 2100 is shown. From now on, with regard to the terminal, the terminal 2100 is exemplified for explanation. This embodiment, as compared with the first embodiment, differs in configurations of the signal analysis unit 101 and the signal control unit 151 of the terminal 2100, and in a configuration of the multipoint control unit 2105. Hereinafter, for each example, the signal analysis unit 101 and the signal control unit 151 of the terminal 2100, and the multipoint control unit 2105 will be explained in details.

A first example of this embodiment relates to the case that the analysis information is a suppression coefficient (the analysis information is explained as an encoded suppression coefficient. Hereinafter, likewise, the analysis information as well in all embodiments is defined as encoded analysis information). The signal analysis unit 101 calculates the suppression coefficient as analysis information, and outputs the analysis information. Responding to this, the multipoint control unit 2105 mixes and outputs the analysis information outputted from each terminal, and the signal control unit 151 controls the decoded signal by employing the analysis information outputted from the multipoint control unit 2105.

At first, the signal analysis unit 101 and the signal control unit 151 of the terminal 2100 will be explained.

Figure 4:
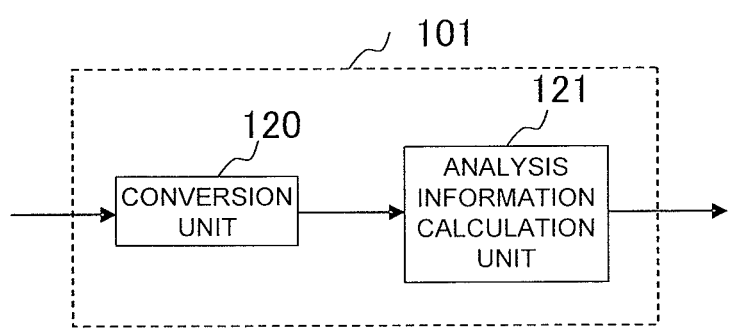
FIG. 4 shows a configuration example of a signal analysis unit 101.

Upon making a reference to FIG. 4, the signal analysis unit 101 includes a conversion unit 120 and an analysis information calculation unit 121. This embodiment, as compared with the first embodiment, differs in a configuration of the analysis information calculation unit 121, so the analysis information calculation unit 121 will be explained hereinafter.

Figure 10:
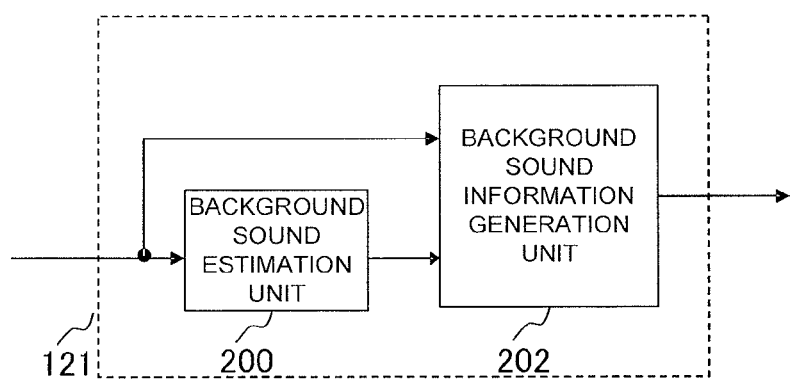
FIG. 10 shows a configuration example of an analysis information calculation unit 121.

A configuration example of the analysis information calculation unit 121 will be explained in details by making a reference to FIG. 10. The analysis information calculation unit 121 receives the second converted signal, and outputs the suppression coefficient as analysis information. The analysis information calculation unit 121 is configured of a background sound estimation unit 200 and a background sound information generation unit 202. The background sound estimation unit 200 receives the second converted signal, estimates the background sound, and generates information of the background sound. The background sound estimation unit 200 outputs the information of the background sound to the background sound information generation unit 202. As information of the background sound, there exist an amplitude absolute value and an energy value of the background sound, an amplitude ratio and an energy ratio of the background sound and the input signal, an average value thereof, and so on. The background sound information generation unit 202 receives the second converted signal and the information of the background sound. The background sound information generation unit 202 calculates the suppression coefficient based upon the second converted signal and the information of the background sound. And, the background sound information generation unit 202 outputs the suppression coefficient or the encoded suppression coefficient as analysis information.

A configuration example of the background sound information generation unit 202 will be explained in details by making a reference to FIG. 11. The background sound information generation unit 202 receives the second converted signal and the information of the background sound, and outputs the suppression coefficient as analysis information. The background sound information generation unit 202 is configured of a suppression coefficient calculation unit 201 and a suppression coefficient encoding unit 2021. The suppression coefficient calculation unit 201 calculates an appropriate suppression coefficient for suppressing the background sound by employing the second converted signal and the information of the background sound. And, the suppression coefficient calculation unit 201 outputs the suppression coefficient to the suppression coefficient encoding unit 2021. As a technology relating to the method of calculating the suppression coefficient, the method founded upon minimum mean square error short-time spectral amplitude (MMSE STSA) is disclosed in Non-patent document 6 (IEEE TRANSACTIONS ON ACOUSTICS, SPEECH, AND SIGNAL PROCESSING, VOL. 32, NO. 6, pp. 1109-1121, December 1984), the method founded upon minimum mean square error log spectral amplitude (MMSE LSA) is disclosed in Non-patent document 7 (IEEE TRANSACTIONS ON ACOUSTICS, SPEECH, AND SIGNAL PROCESSING, VOL. 33, NO. 2, pp. 443-445, April 1985, and the method founded upon minimum mean square error short-time spectral amplitude (MMSE STSA), or the like is disclosed in Non-patent document 8 (EURASIP JOURNAL ON ADVANCES IN SIGNAL PROCESSING, VOLUME 2005, Issue 7, July 2005, pp. 1110-1126).

The suppression coefficient encoding unit 2021 receives and encodes the suppression coefficient. The suppression coefficient encoding unit 2021 outputs the encoded suppression coefficient as analysis information. The suppression coefficient encoding unit 2021 subjects the suppression coefficient to the quantization such as linear quantization and non-linear quantization, and outputs the suppression coefficient encoded with the Huffman coding etc. This makes it possible to remove the redundancy of the suppression coefficient. Further, when the information quantity does not need to be curtailed, the suppression coefficient encoding unit 2021 may output the suppression coefficient as analysis information without performing these encoding processes.

Next, a configuration example of the signal processing unit 172 will be explained in details by making a reference to FIG. 12. The signal processing unit 172 receives the second converted signal and the analysis information, and outputs the modified decoded signal. The signal processing unit 172 is configured of a suppression coefficient re-configuration unit 250 and a multiplier 251. The second converted signal is inputted into the multiplier 251, and the analysis information is inputted into the suppression coefficient re-configuration unit 250. The suppression coefficient re-configuration unit 250 re-configures the suppression coefficient by employing the inputted analysis information, and outputs the suppression coefficient to the multiplier 251. The multiplier 251 multiplies the second converted signal by the suppression coefficient, and generates the modified decoded signal. The multiplier 251 outputs the modified decoded signal to the inverse conversion unit 173.

Figure 13:
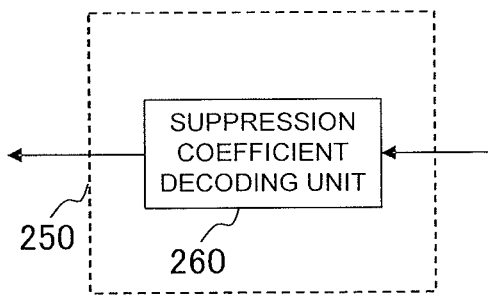
FIG. 13 shows a configuration example of a suppression coefficient decoding unit 260.

A configuration example of the suppression coefficient re-configuration unit 250 will be explained in details by making a reference to FIG. 13. The suppression coefficient re-configuration unit 250 receives the encoded suppression coefficient as analysis information, and outputs the suppression coefficient. The suppression coefficient re-configuration unit 250 is configured of a suppression coefficient decoding unit 260. The suppression coefficient decoding unit 260 decodes the received suppression coefficient. The suppression coefficient decoding unit 260 outputs the suppression coefficient without performing the decoding process when the suppression coefficient has not been encoded.

Next, a first configuration example and a second configuration example of the multipoint control unit 2105 will be explained.

A first configuration example is shown in FIG. 6. This embodiment differs from the first embodiment in a configuration of the analysis information mixing units 2114, 2124, and 2134. Hereinafter, the analysis information mixing units 2114, 2124, and 2134 of this example will be explained by employing FIG. 7 and FIG. 14. Additionally, each of them can assume an identical configuration, so the analysis information mixing unit 2114 is exemplified for explanation.

Upon making a reference to FIG. 7, the analysis information mixing unit 2114 is configured of analysis information decoding units 2150 and 2160, an analysis parameter mixing unit 2151, and an analysis information encoding unit 2152. The analysis information decoding unit 2150 has the analysis information outputted from the separation unit 2120 as an input, and the analysis information decoding unit 2160 has the analysis information outputted from the separation unit 2130 as an input. Each of the analysis information decoding units 2150 and 2160 calculates the suppression coefficient by decoding the analysis information, and outputs the suppression coefficient to the analysis parameter mixing unit 2151. The analysis parameter mixing unit 2151 mixes the suppression coefficients outputted from the analysis information decoding units 2150 and 2160 for each frequency component, and outputs it to the analysis information encoding unit 2152. The analysis information encoding unit 2152 generates the analysis information by encoding the mixed suppression coefficient, and outputs the analysis information.

Figure 14:
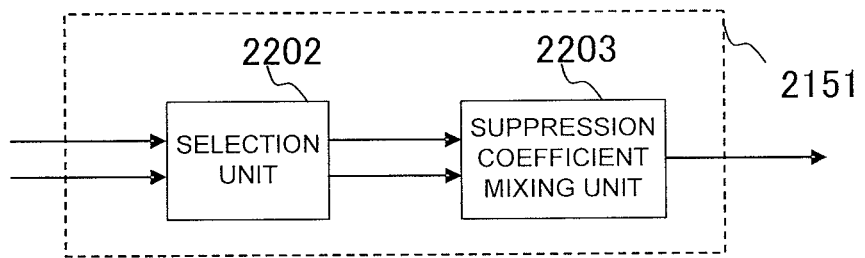
FIG. 14 shows a configuration example of an analysis parameter mixing unit 2151.

Upon making a reference to FIG. 14, the analysis parameter mixing unit 2151 is configured of a selection unit 2202 and a suppression coefficient mixing unit 2203.

The selection unit 2202 selects a predetermined suppression coefficient from among the suppression coefficients outputted from the analysis information decoding units 2150 and 2160, and outputs it to the suppression coefficient mixing unit 2203. As a method of selecting the suppression coefficient, for example, the method of selecting only the suppression coefficient being outputted from the terminal in which the energy of the decoded signal is more than a threshold can be listed. Herein, the signal analysis unit 101 may pre-multiplex the analysis information indicative of the energy of the input signal to employ it instead of the energy of the decoded signal. As another method, the method of outputting all suppression coefficients to the suppression coefficient mixing unit 2203 without selection may be employed.

The suppression coefficient mixing unit 2203 mixes the suppression coefficients outputted from the selection unit 2202. As a method of mixing the suppression coefficients, for example, the suppression coefficients can be mixed responding to a ratio of the energy. When the number of the suppression coefficients outputted from the selection unit 2202 is L', an after-mixture suppression coefficient g can be calculated with the following equation.

$$g = \sqrt{\frac{\sum_{i=1}^{L'} E_i \cdot g_i^2}{\sum_{i=1}^{L'} E_i}} \qquad \text{[Numerical equation 1]}$$

Where, $E_i$ indicates the energy of the decoded signal corresponding to a suppression coefficient $g_i$. Herein, the signal analysis unit 101 may pre-multiplex the analysis information indicative of the energy of the input signal to employ it instead of the energy of the decoded signal. As another method, all suppression coefficients may be multiplexed and outputted.

Figure 11:
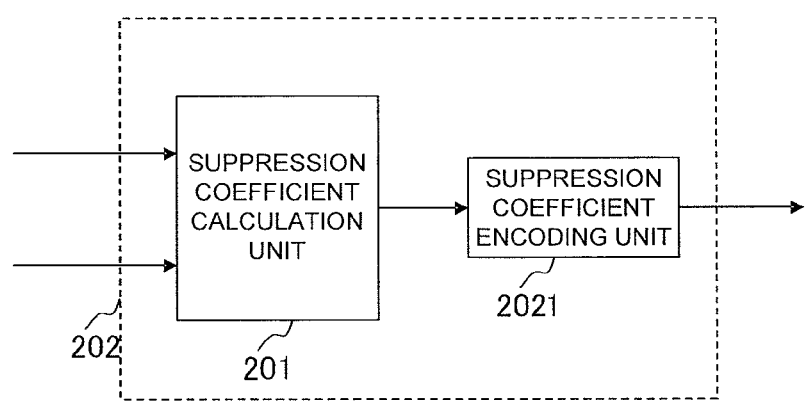
FIG. 11 shows a configuration example of a background sound information generation unit 202.

The analysis information encoding unit 2152 assumes a configuration identical to that of the suppression coefficient encoding unit 2021 of FIG. 11, so its explanation is omitted.

Next, a second configuration example will be explained. The second configuration example is shown in FIG. 8. This configuration example differs in a configuration of the mixing units 2116, 2126, and 2136, and a configuration of the analysis information mixing units 2117, 2127, and 2137 as compared with the first configuration example shown in FIG. 6. Specifically, it differs in a point that the mixing units 2116, 2126, and 2136 output the mixed information, which is generated at the moment of generating the mixed signal, to the analysis information mixing units 2117, 2127, and 2137, respectively. Thus, hereinafter, the analysis information mixing units 2117, 2127, and 2137 will be explained by employing FIG. 9 and FIG. 15.

A configuration example of the analysis information mixing units 2117, 2127, and 2137 is shown in FIG. 9. Additionally, each of them can assume an identical configuration, so the analysis information mixing unit 2117 is exemplified for explanation.

Upon making a reference to FIG. 9, the analysis information mixing unit 2117 is configured of analysis information decoding units 2150 and 2160, an analysis parameter mixing unit 2153, and an analysis information encoding unit 2152. It differs in a point that the analysis parameter mixing unit 2151 is replaced with the analysis parameter mixing unit 2153, and a point that the mixed information is inputted into the analysis parameter mixing unit 2153 as compared with the analysis information mixing unit 2114 of FIG. 7. Thus, hereinafter, the analysis parameter mixing unit 2153 will be explained.

Figure 15:
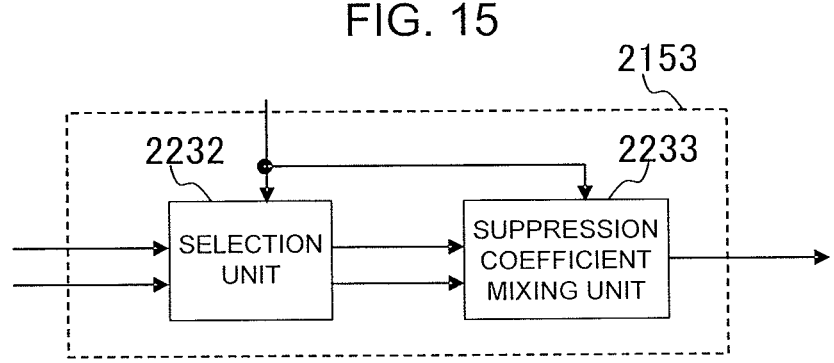
FIG. 15 shows a configuration example of an analysis parameter mixing unit 2153.

A configuration example of the analysis parameter mixing unit 2153 is shown in FIG. 15. The analysis parameter mixing unit 2153 is configured of a selection unit 2232 and a suppression coefficient mixing unit 2233.

The selection unit 2232 selects a predetermined suppression coefficient from among the suppression coefficients outputted from the analysis information decoding units 2150 and 2160 by utilizing the mixed information being outputted from the mixing unit 2116, and outputs it to the suppression coefficient mixing unit 2233. As a method of selecting the suppression coefficient, for example, when the mixed information is a weighting coefficient for the decoded signal of each terminal, the method of selecting the suppression coefficient of the terminal in which the weighting coefficient is more than a threshold can be listed. As another method, the method of outputting all suppression coefficients to the suppression coefficient mixing unit 2233 without selection may be employed.

The suppression coefficient mixing unit 2233 mixes the suppression coefficients outputted from the selection unit 2232 by utilizing the mixed information being outputted from the mixing unit 2116. As a method of mixing the suppression coefficients, for example, the suppression coefficients can be mixed responding to a ratio of the energy. When the number of the suppression coefficients inputted into the selection unit is L', upon defining an after-mixture suppression coefficient as g, the after-mixture suppression coefficient g can be calculated with the following equation.

$$g = \sqrt{\frac{\sum_{i=1}^{L'} m_i^2 \cdot E_i \cdot g_i^2}{\sum_{i=1}^{L'} m_i^2 \cdot E_i}} \qquad \text{[Numerical equation 2]}$$

Where, $E_i$ indicates the energy of the encoded signal corresponding to a suppression coefficient $g_i$. The signal analysis unit 101 may pre-multiplex the analysis information indicative of the energy of the input signal to employ it instead of the energy of the decoded signal. $m_i$ indicates the mixed information being outputted from the mixing unit corresponding to the suppression coefficient $g_i$. As another method, all suppression coefficients may be multiplexed and outputted.

A second example of this embodiment relates to the case that the analysis information is a signal versus background sound ratio. In the second example, upon making a reference to FIG. 1, the signal analysis unit 101 outputs the signal versus background sound ratio, being a ratio of the objective sound and the background sound, as analysis information. Responding to this, the multipoint control unit 2105 mixes the signal versus background sound ratios outputted from respective terminals, and the signal control unit 151 controls the decoded signal by employing the signal versus background sound ratio outputted from the multipoint control unit 2105. This example differs from the first example in configurations of the signal analysis unit 101 and the signal control unit 151 of the terminal 2100, and a configuration of the multipoint control unit 2105.

Firstly, the terminal 2100 will be explained.

At first, the signal analysis unit 101 will be explained. The signal analysis unit 101, similarly to the case of the first example, is represented in FIG. 4. Upon comparing this example with the first example, the former differs from the latter in a configuration of the background sound information generation unit 202 being included in the analysis information calculation unit 121 shown in FIG. 10.

Figure 16:
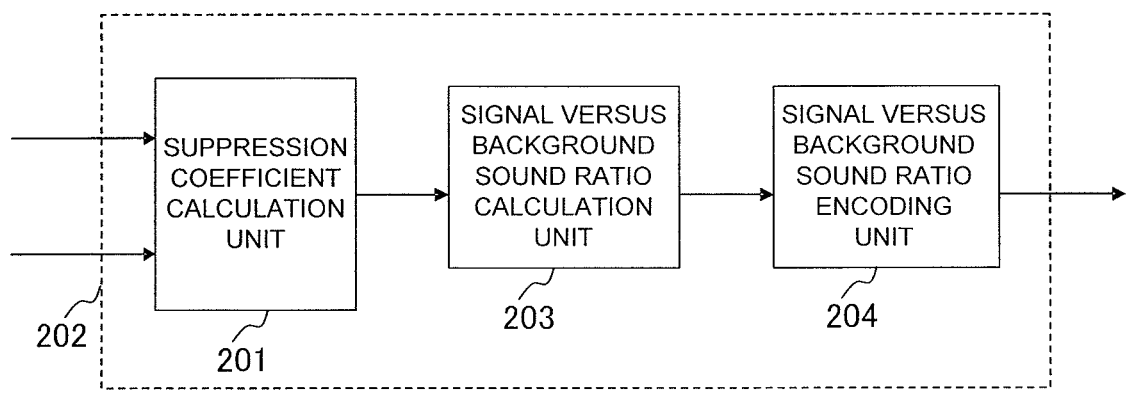
FIG. 16 shows a second configuration example of the background sound information generation unit 202.

The background sound information generation unit 202 of this example will be explained in details by making a reference to FIG. 16. The background sound information generation unit 202 receives the second converted signal and the information of the background sound, and outputs the encoded signal versus background sound ratio as analysis information. The background sound information generation unit 202 is configured of a suppression coefficient calculation unit 201, a signal versus background sound ratio calculation unit 203, and a signal versus background sound ratio encoding unit 204. The suppression coefficient calculation unit 201 calculates an appropriate suppression coefficient for suppressing the background sound by employing the second converted signal and the information of the background sound. And, the suppression coefficient calculation unit 201 outputs the suppression coefficient to the signal versus background sound ratio calculation unit 203. As a method of calculating the suppression coefficient, the calculation method of the suppression coefficient calculation unit 201 of the first example shown in FIG. 11 can be employed. The signal versus background sound ratio calculation unit 203 calculates a signal versus background sound ratio R by employing an inputted suppression coefficient G. Upon defining the input signal as X, the objective sound as S, and the background sound as N, the following relation holds.

$$X = S + N \quad \text{[Numerical equation 3]}$$

$$S = G \times X \quad \text{[Numerical equation 4]}$$

$$R = \frac{S^2}{N^2} \quad \text{[Numerical equation 5]}$$

R based upon this definition is known as a prior signal-to noise ratio (prior SNR) when the background sound is noise.

Upon substituting [Numerical equation 3] and [Numerical equation 4] into [Numerical equation 5], the following equation is yielded.

$$R = \frac{S^2}{(X-S)^2} = \frac{G^2}{1-G^2} \quad \text{[Numerical equation 6]}$$

The signal versus background sound ratio calculation unit 203 outputs the calculated signal versus background sound ratio R to the signal versus background sound ratio encoding unit 204. The signal versus background sound ratio encoding unit 204 encodes the inputted signal versus background sound ratio R. The signal versus background sound ratio encoding unit 204 outputs the encoded signal versus background sound ratio R as analysis information. With regard to the details of the encoding process, an encoding process similar to the encoding process being performed in the suppression coefficient encoding unit 2021 can be employed. This makes it possible to remove the redundancy of the signal versus background sound ratio R. Further, when the information quantity does not need to be curtailed, the signal versus background sound ratio encoding unit 204 may output the signal versus background sound ratio as analysis information without performing the encoding process for the signal versus background sound ratio R.

Next, the signal control unit 151 of this example will be explained in details. The signal control unit 151, similarly to the case of the first example, is represented in FIG. 5. This example differs from the first example in a configuration of the suppression coefficient re-configuration unit 250 being included in the signal processing unit 172 shown in FIG. 12.

A configuration example of the suppression coefficient re-configuration unit 250 will be explained in details by making a reference to FIG. 17. The suppression coefficient re-configuration unit 250 receives the encoded signal versus background sound ratio R as an analysis signal, and outputs the suppression coefficient G. The suppression coefficient re-configuration unit 250 is configured of a signal versus background sound ratio decoding unit 261 and a suppression coefficient conversion unit 262. The signal versus background sound ratio decoding unit 261 decodes the encoded signal versus background sound ratio R that has been received, and outputs the signal versus background sound ratio R to the suppression coefficient conversion unit 262. The signal versus background sound ratio decoding unit 261 outputs the signal versus background sound ratio without performing the decoding operation when the signal versus background sound ratio R has not been encoded. The suppression coefficient conversion unit 262 converts the signal versus background sound ratio R into the suppression coefficient G. And, the suppression coefficient conversion unit 262 has the suppression coefficient G as an output. The conversion from R to G is made based upon [Numerical equation 6]. Upon solving [Numerical equation 6] for G, the following equation is yielded.

$$G = \sqrt{\frac{R}{1+R}} \quad \text{[Numerical equation 7]}$$

The multiplier 251 multiplies G by the decoded signal, thereby allowing the background sound to be suppressed.

Figure 18:
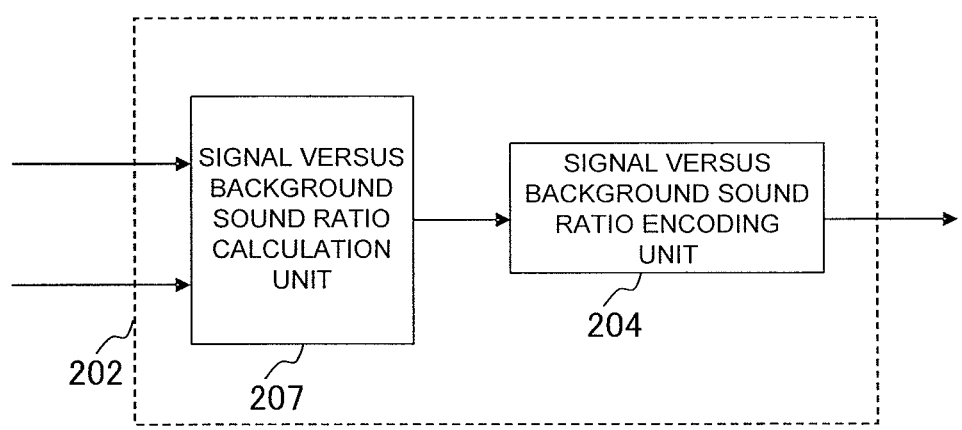
FIG. 18 shows a second configuration example of the background sound information generation unit 202.

Further, another configuration example of the background sound information generation unit 202 will be explained in details by making a reference to FIG. 18. The background sound information generation unit 202 of this configuration example, as compared with the background sound information generation unit 202 shown in FIG. 16, differs in a point of not including the suppression coefficient calculation unit 201. In the configuration of the background sound information generation unit 202 shown in FIG. 18, [Numerical equation 8] is employed as a definition of the signal versus background sound ratio R instead of [Numerical equation 5]. R based upon this definition is known as a posterior signal-to noise ratio (posterior SNR) when the background sound is noise.

$$R = \frac{X^2}{N^2} \quad \text{[Numerical equation 8]}$$

That is, this configuration example is configured to employ the posterior SNR as analysis information instead of the prior SNR when the background sound is noise. R of [Numerical equation 8], which does not demand the suppression coefficient G, is calculated from the input signal and the background sound. This enables the signal versus background sound ratio calculation unit 207 to calculate the signal versus background sound ratio based upon the second converted signal and the information of the background sound. And, the signal versus background sound ratio calculation unit 207 outputs the signal versus background sound ratio to the signal versus background sound ratio encoding unit 204. An operation of the signal versus background sound ratio encoding unit 204 is similar to that of the signal versus background sound ratio encoding unit 204 shown in FIG. 16, so its explanation is omitted.

On the other hand, [Numerical equation 3] and [Numerical equation 4] are substituted into [Numerical equation 8], and upon assuming that S and N have no correlation to each other, the following equation is yielded.

$$R = \frac{1}{1-G^2}$$ [Numerical equation 9]

That is, the signal versus background sound ratio calculation unit 203 may calculate the signal versus background sound ratio R by employing [Numerical equation 9].

Figure 12:
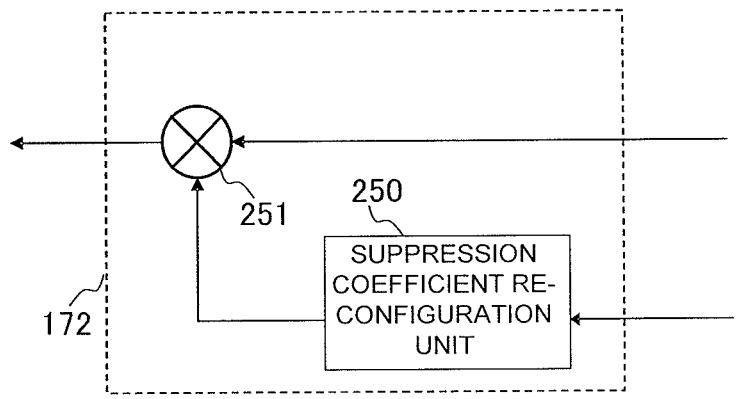
FIG. 12 shows a configuration example of a signal processing unit 172.
Figure 17:
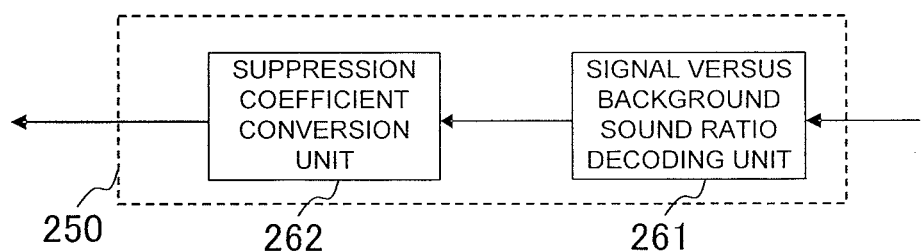
FIG. 17 is a configuration example of a suppression coefficient re-configuration unit 250.

In this configuration example, the suppression coefficient re-configuration unit 250 shown in FIG. 12 of the receiving side is represented in FIG. 17 similarly to the case of the foregoing configuration example. The signal versus background sound ratio decoding unit 261 decodes the encoded signal versus background sound ratio R that has been received, and outputs the signal versus background sound ratio R to the suppression coefficient conversion unit 262. The suppression coefficient conversion unit 262 converts the signal versus background sound ratio R into the suppression coefficient G, and outputs the suppression coefficient G. The conversion from R to G is made based upon [Numerical equation 10]. That is, upon solving [Numerical equation 9] for G, the following equation is yielded.

$$G = \sqrt{\frac{R-1}{R}}$$ [Numerical equation 10]

The multiplier 251 multiplies G by the decoded signal, thereby allowing the background sound to be suppressed.

Next, a first configuration example and a second configuration example of the multipoint control unit 2105 will be explained.

A first configuration example is shown in FIG. 6. This example differs from the first example in a configuration of the analysis information mixing units 2114, 2124, and 2134. A configuration example of the analysis information mixing units 2114, 2124, and 2134 is shown in FIG. 7. Additionally, each of them can assume an identical configuration, so the analysis information mixing unit 2114 is exemplified for explanation by employing FIG. 7 and FIG. 19.

Upon making a reference to FIG. 7, the analysis information mixing unit 2114 is configured of analysis information decoding units 2150 and 2160, an analysis parameter mixing unit 2151, and an analysis information encoding unit 2152. The analysis information decoding unit 2150 has the analysis information outputted from the separation unit 2120 as an input, and the analysis information decoding unit 2160 has the analysis information outputted from the separation unit 2130 as an input. Each of the analysis information decoding units 2150 and 2160 decodes the analysis information, calculates the signal versus background sound ratio, and outputs the signal versus background sound ratio to the analysis parameter mixing unit 2151. The analysis parameter mixing unit 2151 mixes the signal versus background sound ratios outputted from the analysis information decoding units 2150 and 2160 for each frequency component, and outputs it to the analysis information encoding unit 2152. The analysis information encoding unit 2152 is identical to the signal versus background sound ratio encoding unit 204 of FIG. 18, so it was already explained.

Figure 19:
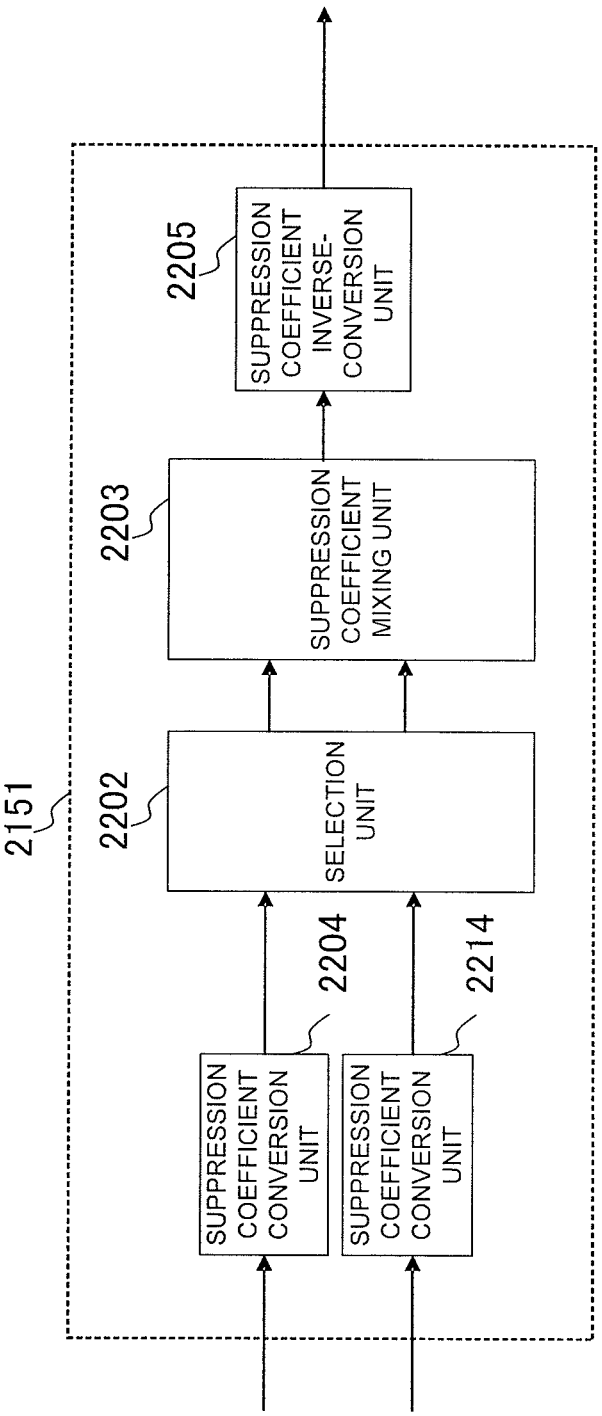
FIG. 19 shows a second configuration example of the analysis parameter mixing unit 2151.

A configuration example of the analysis parameter mixing unit 2151 is shown in FIG. 19. The analysis parameter mixing unit 2151 is configured of suppression coefficient conversion units 2204 and 2214, a selection unit 2202, a suppression coefficient mixing unit 2203, and a suppression coefficient inverse-conversion unit 2205. The suppression coefficient conversion unit 2204 has the signal versus background sound ratio outputted from the analysis information decoding unit 2150 as an input, and the suppression coefficient conversion unit 2214 has the signal versus background sound ratio outputted from the analysis information decoding unit 2160 as an input. Each of the suppression coefficient conversion units 2204 and 2214 calculates the suppression coefficient from the signal versus background sound ratio by employing [Numerical equation 7] or [Numerical equation 10]. The calculated suppression coefficient is outputted to the selection unit 2202. The selection unit 2202 and the suppression coefficient mixing unit 2203 operate similarly to the selection unit 2202 and the suppression coefficient mixing unit 2203 of the first example shown in FIG. 14, respectively, so detailed explanation thereof is mitted. The selection unit 2202 selects a predetermined suppression coefficient from among the inputted suppression coefficients, and outputs the selected suppression coefficient to the suppression coefficient mixing unit 2203. The suppression coefficient mixing unit 2203 mixes the suppression coefficients outputted from the selection unit 2202, and outputs it to the suppression coefficient inverse-conversion unit 2205. The suppression coefficient inverse-conversion unit 2205 converts the suppression coefficient into the signal versus background sound ratio by employing [Numerical equation 6] or [Numerical equation 9], and outputs the mixed signal versus background sound ratios.

Next, a second configuration example will be explained. The second configuration example is shown in FIG. 8. This configuration example differs in a configuration of the mixing units 2116, 2126, and 2136, and a configuration of analysis information mixing units 2117, 2127, and 2137 as compared with the first configuration example shown in FIG. 6. Specifically, it differs in a point that the mixing units 2116, 2126, and 2136 output the mixed information, which is generated at the moment of generating the mixed signal, to the analysis information mixing units 2117, 2127, and 2137, respectively. Thus, hereinafter, the analysis information mixing units 2117, 2127, and 2137 will be explained by employing FIG. 9 and FIG. 20.

A configuration example of the analysis information mixing units 2117, 2127, and 2137 is shown in FIG. 9. Additionally, each of them can assume an identical configuration, so the analysis information mixing unit 2117 is exemplified for explanation hereinafter.

Upon making a reference to FIG. 9, the analysis information mixing unit 2117 is configured of analysis information decoding units 2150 and 2160, an analysis parameter mixing unit 2153, and an analysis information encoding unit 2152. The analysis information mixing unit 2117 differs in a point that the analysis parameter mixing unit 2151 is replaced with the analysis parameter mixing unit 2153, and the mixed information is inputted into the analysis parameter mixing unit 2153 as compared with the analysis information mixing unit 2114 of FIG. 7. Thus, hereinafter, the analysis parameter mixing unit 2153 will be explained.

Figure 20:
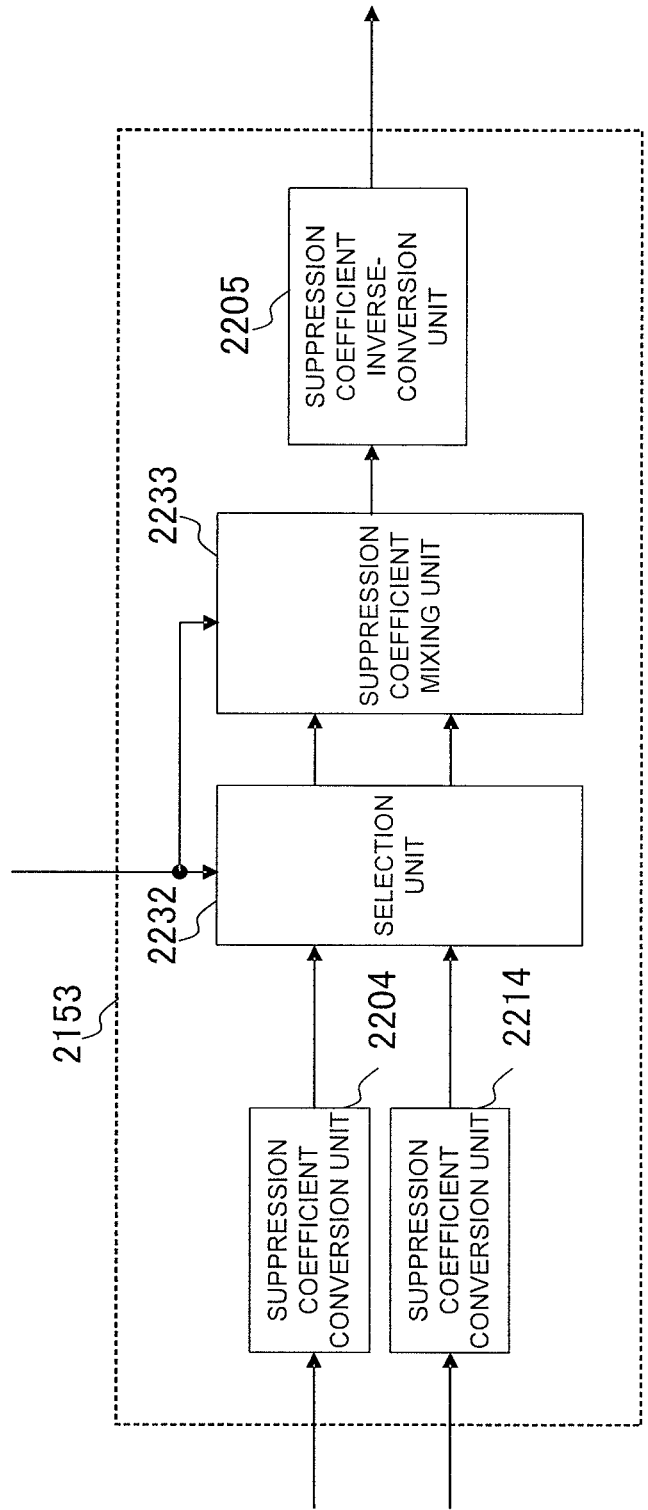
FIG. 20 shows a second configuration example of the analysis parameter mixing unit 2153.

A configuration example of the analysis parameter mixing unit 2153 is shown in FIG. 20. The analysis parameter mixing unit 2153 is configured of suppression coefficient conversion units 2204 and 2214, a selection unit 2232, a suppression coefficient mixing unit 2233, and a suppression coefficient inverse-conversion unit 2205. The analysis parameter mixing unit 2153 differs in a point that the selection unit 2002 is replaced with the selection unit 2232, and the suppression coefficient mixing unit 2203 is replaced with the suppression coefficient mixing unit 2233 as compared with the analysis parameter mixing unit 2151 of the first example shown in FIG. 19.

Herein, a configuration example of the selection unit 2232 and the suppression coefficient mixing unit 2233 is identical to the second configuration example of the multipoint control unit 2105 in the first example of this embodiment. It was already explained by employing FIG. 15, so its explanation is omitted.

A third example relates to the case that the analysis information is background sound. Upon making a reference to FIG. 1, the signal analysis unit 101 calculates the background sound itself as analysis information. Responding to this, the multipoint control unit 2105 mixes the background sound outputted from respective terminals, and the signal control unit 151 controls the decoded signal by employing the background sound outputted from the multipoint control unit 2105. The third example differs from the first example in configurations of the signal analysis unit 101 and the signal control unit 151 of the terminal 2100, and a configuration of the multipoint control unit 2105.

Firstly, the terminal 2100 will be explained.

At first, the signal analysis unit 101 will be explained. The signal analysis unit 101, similarly to the case of the first example, is represented in FIG. 4. A configuration of the analysis information calculation unit 121 of this example differs from that of the analysis information calculation unit 121 of the first example shown in FIG. 10.

Figure 21:
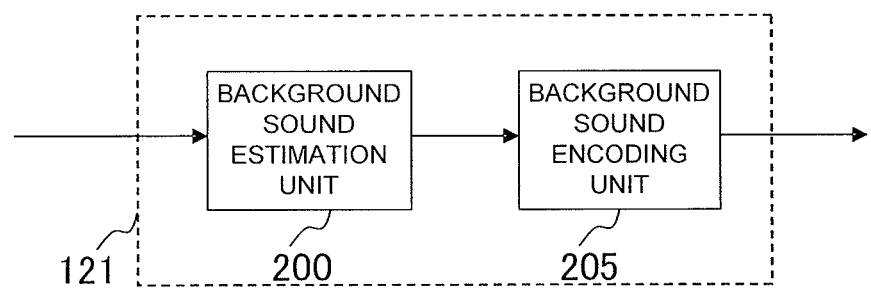
FIG. 21 shows a second configuration example of the analysis information calculation unit 121.

A configuration example of the analysis information calculation unit 121 of this example will be explained in details by making a reference to FIG. 21. Upon making a comparison with the configuration example of the analysis information calculation unit 121 of the first example shown in FIG. 10, the background sound information generation unit 202 is replaced with a background sound encoding unit 205. The analysis information calculation unit 121 of this configuration example receives the second converted signal, and outputs the encoded background sound as analysis information. The analysis information calculation unit 121 of this configuration example is configured of a background sound estimation unit 200 and a background sound encoding unit 205. The background sound estimation unit 200 of this configuration example outputs the background sound itself to the background sound information generation unit 202. The background sound encoding unit 205 encodes and outputs the inputted background sound. This makes it possible to remove redundancy of the background sound. Further, when the information quantity does not need to be curtailed, the background sound encoding unit 205 may output the background sound as analysis information without performing the encoding process therefor.

With regard to the encoding process, an encoding process similar to that of the suppression coefficient encoding unit 2021 can be employed.

Next, the signal control unit 151 will be explained. The signal control unit 151 is represented in FIG. 5 similarly to the case of the first example. A configuration of the signal processing unit 172 differs from that of the signal processing unit 172 of the first example shown in FIG. 12.

Figure 22:
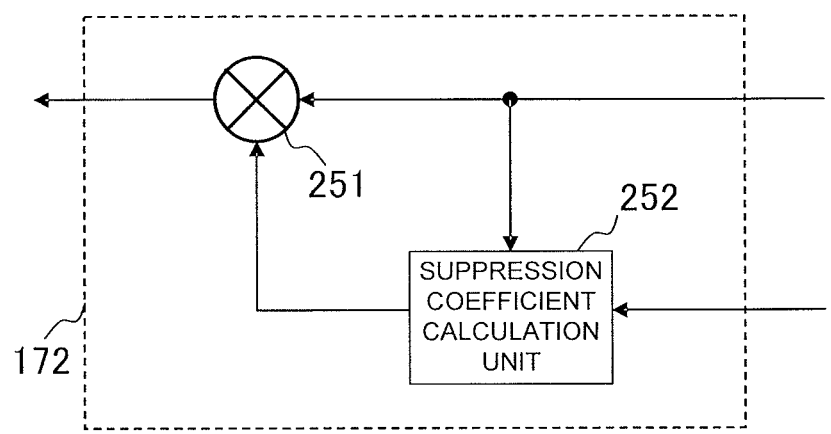
FIG. 22 shows a second configuration example of the signal processing unit 172.

A configuration example of the signal processing unit 172 of this example will be explained in details by making a reference to FIG. 22. Upon making a comparison with the configuration example of the signal processing unit 172 of the first example shown in FIG. 12, the suppression coefficient re-configuration unit 250 is replaced with a suppression coefficient calculation unit 252. The signal processing unit 172 receives the second converted signal and the encoded background sound as analysis information, and outputs the modified decoded signal. The signal processing unit 172 is configured of a suppression coefficient calculation unit 252 and a multiplier 251. The second converted signal is inputted into suppression coefficient calculation unit 252 and the multiplier 251, and the encoded background sound is inputted into the suppression coefficient calculation unit 252 as analysis information. The suppression coefficient calculation unit 252 calculates the suppression coefficient based upon the background sound and the second converted signal. And, the suppression coefficient calculation unit 252 outputs the suppression coefficient to the multiplier 251. The multiplier 251 multiplies the second converted signal by the suppression coefficient, and outputs the modified decoded signal to the inverse conversion unit 173.

Figure 23:
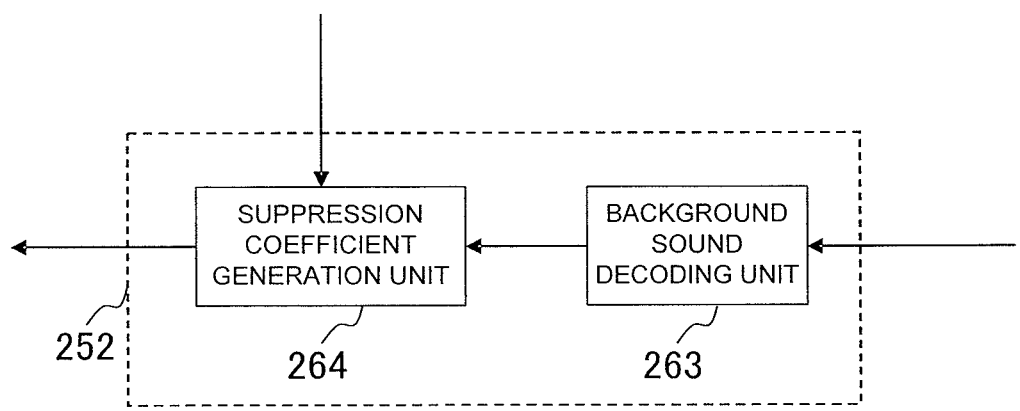
FIG. 23 shows a configuration example of the suppression coefficient calculation unit 252.

In addition, a configuration of the suppression coefficient calculation unit 252 will be explained in details by making a reference to FIG. 23. The suppression coefficient calculation unit 252 is configured of a background sound decoding unit 263 and a suppression coefficient generation unit 264. The background sound decoding unit 263 receives the encoded background sound as analysis information. And, the background sound decoding unit 263 decodes the encoded background sound, and outputs the background sound to the suppression coefficient generation unit 264. The background sound decoding unit 263 outputs the background sound without performing the decoding process when the background sound has not been encoded. The suppression coefficient generation unit 264 receives the background sound and the second converted signal. And, the suppression coefficient generation unit 264 calculates an appropriate suppression coefficient for suppressing the background sound based upon the background sound and the second converted signal. As a method of calculating this suppression coefficient, a calculation method similar to that of the suppression coefficient calculation unit 201 shown in FIG. 11 may be employed. The suppression coefficient generation unit 264 outputs the suppression coefficient. There exists the technology disclosed in the foregoing non-Patent document 6, non-Patent document 7, or non-Patent document 8 as a technology relating to the method of calculating the suppression coefficient.

Figure 24:
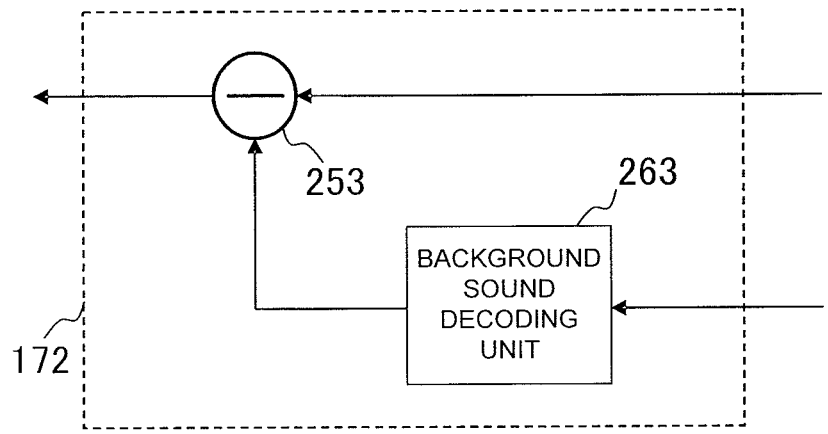
FIG. 24 shows a third configuration example of the signal processing unit 172.

In addition, another configuration example of the signal processing unit 172 will be explained in details by making a reference to FIG. 24. The signal processing unit 172 receives the second converted signal and the encoded background sound, and outputs the signal of which the background sound has been removed as a modified decoded signal. The signal processing unit 172 of this configuration example is configured of a background sound decoding unit 263 and a subtracter 253. The second converted signal is inputted into the subtracter 253, and the encoded background sound is inputted into the background sound decoding unit 263 as analysis information. The background sound decoding unit 263 decodes the encoded background sound, and outputs the background sound to the subtracter 253. The background sound decoding unit 263 is useless when the analysis information is not-encoded background sound. The subtracter 253 subtracts the background sound from the second converted signal. And, the subtracter 253 outputs the signal of which the background sound has been removed as a modified decoded signal. This subtraction is known as spectral subtraction when the background sound is noise. The technology relating to the spectral subtraction is disclosed in Non-patent document 9 (IEEE TRANSACTION ON ACOUSTICS, SPEECH, AND SIGNAL PROCESSING, VOL. 27, NO. 2, pp. 113-120, April 1979).

Further, an addition function besides the subtraction can be incorporated into the subtracter 253. For example, as an addition function, the function of, when the subtraction result indicates a negative value, correcting this value to zero or a minute positive value, a limiter function of setting a minimum value of the subtraction result to a positive value, or the function of, after correcting the subtraction result by multiplying the background sound information by the coefficient or adding a constant hereto, subtracting the background sound can be listed.

Next, a first configuration example and a second configuration example of the multipoint control unit 2105 will be explained.

A first configuration example is shown in FIG. 6. This example differs from that of the first example in a configuration of the analysis information mixing units 2114, 2124, and 2134. A configuration example of the analysis information mixing units 2114, 2124, and 2134 is shown in FIG. 7. Additionally, each of them can assume an identical configuration, so the analysis information mixing unit 2114 is exemplified for explanation by employing FIG. 7 and FIG. 25.

Upon making a reference to FIG. 7, the analysis information mixing unit 2114 is configured of analysis information decoding units 2150 and 2160, an analysis parameter mixing unit 2151, and an analysis information encoding unit 2152. The analysis information decoding unit 2150 has the analysis information outputted from the separation unit 2120 as an input, and the analysis information decoding unit 2160 has the analysis information outputted from the separation unit 2130 as an input. Each of the analysis information decoding units 2150 and 2160 calculates the background sound by decoding the inputted analysis information, and outputs the background sound to the analysis parameter mixing unit 2151. The analysis parameter mixing unit 2151 mixes the background sound outputted from the analysis information decoding units 2150 and 2160 for each frequency component, and outputs it to the analysis information encoding unit 2152. The analysis information encoding unit 2152 is identical to the background sound encoding unit 205 of FIG. 21, so it was already explained.

Figure 25:
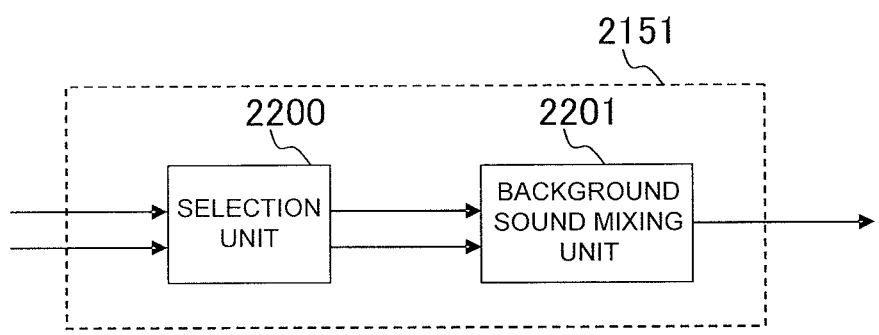
FIG. 25 shows a third configuration example of the analysis parameter mixing unit 2151.

A configuration example of the analysis parameter mixing unit 2151 is shown in FIG. 25. The analysis parameter mixing unit 2151 is configured of a selection unit 2200 and a background sound mixing unit 2201.

The selection unit 2200 selects predetermined background sound from among the background sound outputted from the analysis information decoding units 2150 and 2160, and outputs it to the background sound mixing unit 2201. As a method of selecting the background sound, for example, the selection unit 2200 selects only the background sound equal to or more than a threshold. Further, it can select only the background sound that causes an auditory sound quality to decline. The selection unit 2200 may output all of the background sound to the background sound mixing unit 2201 without selection.

The background sound mixing unit 2201 mixes the background sound outputted from the selection unit 2200, and outputs the mixed background sound. As a method of mixing the background sound, for example, a sum of all of the inputted background sound can be employed. Further, the method of calculating a compensation coefficient for compensating a correlation by taking a correlation of the background sound into consideration, and mixing the background sound by employing the compensation coefficient may be employed. As another method, all of the inputted background sound may be multiplexed and outputted.

Next, a second configuration example is shown in FIG. 6. This configuration example differs from the first configuration example in a configuration of the analysis information mixing units 2117, 2127, and 2137. The configuration example of the analysis information mixing units 2117, 2127, and 2137 is shown in FIG. 9. Additionally, each of them can assume an identical configuration, so the analysis information mixing unit 2117 is exemplified for explanation from now on.

Next, a second configuration example will be explained. The second configuration example is shown in FIG. 8. The second configuration example differs in a configuration of the mixing units 2116, 2126, and 2136, and a configuration of the analysis information mixing units 2117, 2127, and 2137 as compared with the first configuration example shown in FIG. 6. Specifically, it differs in a point that the mixing units 2116, 2126, and 2136 output the mixed information, which is generated at the moment of generating the mixed signal, to the analysis information mixing units 2117, 2127, and 2137, respectively. Thus, hereinafter, the analysis information mixing units 2117, 2127, and 2137 will be explained.

A configuration example of the analysis information mixing units 2117, 2127, and 2137 is shown in FIG. 9. Additionally, each of them can assume an identical configuration, so the analysis information mixing unit 2117 is exemplified for explanation below.

Upon making a reference to FIG. 9, the analysis information mixing unit 2117 is configured of analysis information decoding units 2150 and 2160, an analysis parameter mixing unit 2153, and an analysis information encoding unit 2152. The analysis information mixing unit 2117, as compared with the analysis information mixing unit 2114 of FIG. 7, differs in a point that the analysis parameter mixing unit 2151 is replaced with the analysis parameter mixing unit 2153, and a point that the mixed information is inputted into the analysis parameter mixing unit 2153. Thus, hereinafter, the analysis parameter mixing unit 2153 will be explained.

Figure 26:
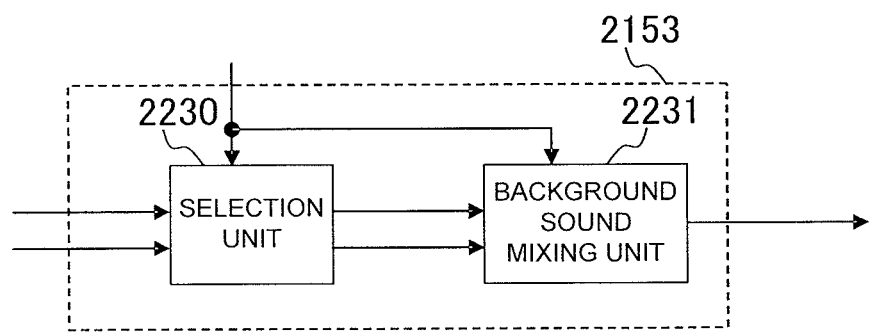
FIG. 26 shows a third configuration example of the analysis parameter mixing unit 2153.

A configuration example of the analysis parameter mixing unit 2153 is shown in FIG. 26. The analysis parameter mixing unit 2153 is configured of a selection unit 2230 and a background sound mixing unit 2231. This configuration example, as compared with the first configuration example of FIG. 25, differs in a point that the selection unit 2000 is replaced with the selection unit 2230, and the background sound mixing unit 2201 is replaced with the background sound mixing unit 2231.

The selection unit 2230 selects predetermined background sound from among the background sound outputted from the analysis information decoding units 2150 and 2160 by utilizing the mixed information being outputted from the mixing unit 2116, and outputs it to the background sound mixing unit 2231. As a method of selecting the background sound, for example, when the mixed information is a weighting coefficient for the decoded signal of each terminal, the selection unit 2230 selects the background sound of the terminal in which the background sound weighted by employing the weighting coefficient becomes equal to or more than the threshold. As another method, the selection unit 2230 can select the background sound of the terminal in which the weighting coefficient becomes equal to or more than the threshold. In addition, it may select only the background sound that causes an auditory sound quality to decline. Additionally, the selection unit 2230 may output all of the background sound without selection to the background sound mixing unit 2231.

The background sound mixing unit 2231 mixes the background sound supplied from the selection unit 2230 by utilizing the mixed information being outputted from the mixing unit 2116. As a method of mixing the background sound, for example, when the mixed information is a weighting coefficient for the decoded signal of each terminal, the mixed information can be expressed as the background sound subjected to the weighted addition by employing the weighting coefficient. Further, the method of calculating a compensation coefficient for compensating a correlation by taking a correlation of the weighted background sound into consideration, correcting the weighted background sound by employing the compensation coefficient, and thereafter, mixing the background sound may be employed. As another method, all of the background sound of each terminal configuring the mixed signal, being an output signal of the mixing unit 2116, may be multiplexed and outputted.

Above, explanation of the third example is finished.

In addition, in this embodiment, the transmission unit 10 may calculate the analysis information of the above-mentioned first to third examples independently channel by channel when the input signal is configured of a plurality of channels. Further, the transmission unit 10 may calculate a sum of all channels of the input signal, and calculate the analysis information common to all channels from the summed signals. Or, the transmission unit 10 may divide the input signal into a plurality of groups, calculate a sum of the input signals of respective groups, and calculate the analysis information common to the group from the above summed signals. The receiving unit 15, responding to this, controls the decoded signal by employing the analysis information corresponding to each channel.

Further, the analysis information explained in the above-mentioned first to third examples may be calculated as analysis information common to a plurality of the frequency bands. For example, the transmission unit 10 may divide the frequency band at an equal interval, and calculate the analysis information for each divided frequency band. In addition, the transmission unit 10 may divide the input signal into fine frequency bands with regard to the low-frequency area, and the input signal into rough frequency bands with regard to the high-frequency area to an auditory feature of a human being, and calculate the analysis information in a divided unit. This makes it possible to curtail the information quantity of the analysis information.

As explained above, the second embodiment of the present invention enables the receiving unit to control the input signal, which is configured of the objective sound and the background sound of each point, for each objective sound and for each background sound of each point independently based upon the analysis information in which the analysis information of each point has been mixed. For example, the second embodiment makes it possible to make an adjustment to a personal taste at each point in such a manner that the quantity of the background sound of each of the points is made identical to that of the other in some cases, and is matched to the quantity of the background sound of the main site in some cases.

In addition, the receiving unit can curtail the arithmetic quantity relating to the calculation of the analysis information because the transmission unit calculates the analysis information.

Further, the multipoint control unit mixes a plurality of the input signals, and mixes the analysis information of a plurality of the input signals, whereby the transmission quantity can be reduced. In addition, the receiving unit does not need to generate the mixed analysis information, and hence, the arithmetic quantity relating to the calculation of the analysis information in the receiving unit can be further curtailed because the multipoint control unit generates the mixed analysis information corresponding to the mixed input signal.

Next, a third embodiment of the present invention will be explained. This embodiment is characterized in that the receiving side terminal controls the input signal for each component element corresponding to each sound source of the input signal of each point based upon the analysis information and the signal control information.

Figure 27:
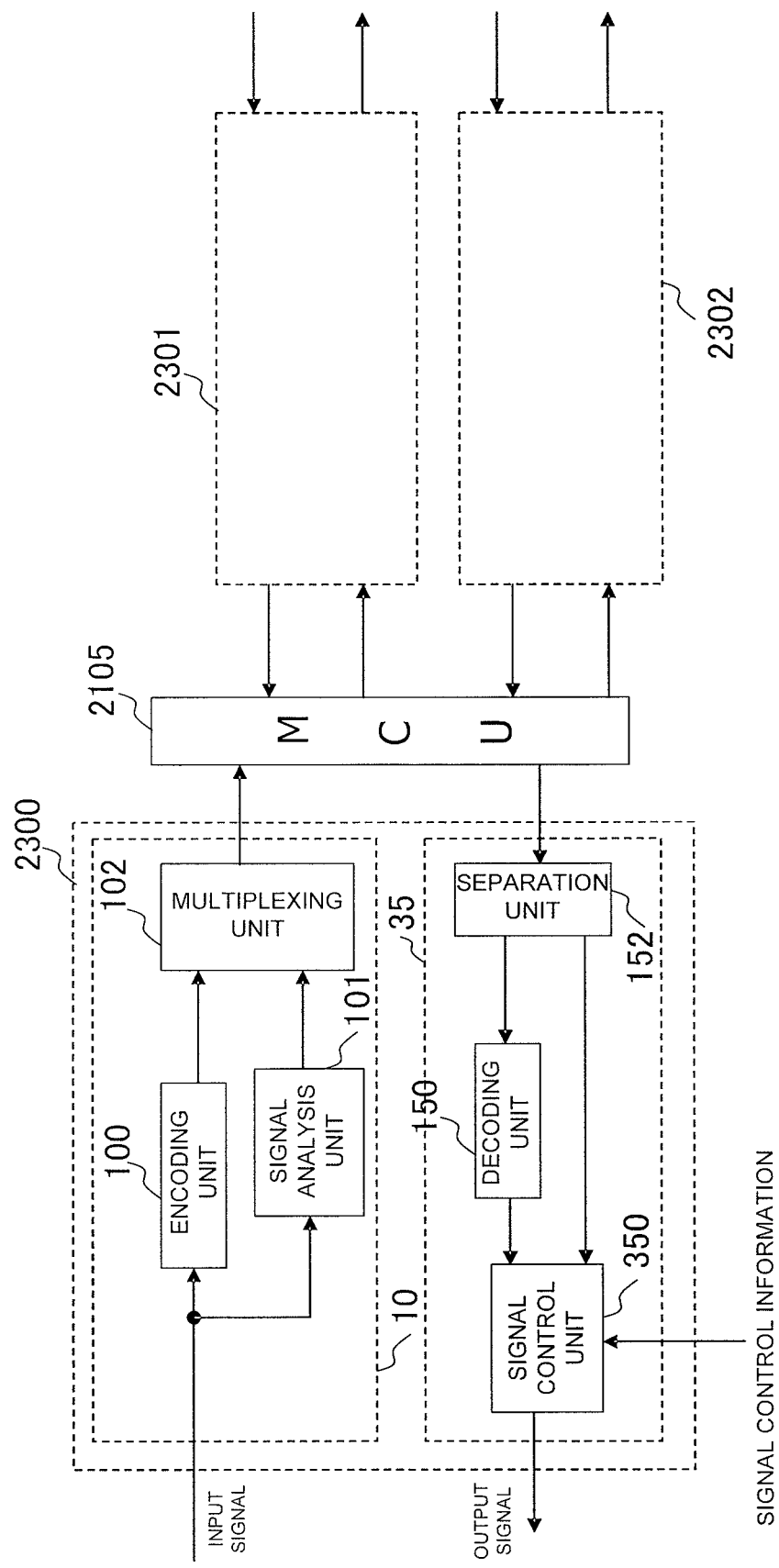
FIG. 27 is a block diagram illustrating a third embodiment of the present invention.

FIG. 27 is a block diagram illustrating the third embodiment of the present invention. FIG. 27, as compared with FIG. 1 indicative of the first embodiment, differs in a point that the terminals 2100, 2101, and 2102 are replaced with terminals 2300, 2301, and 2302, the receiving unit 15 is replaced with a receiving unit 35, and the signal control unit 151 is replaced with a signal control unit 350. That is, this embodiment differs in a configuration of the signal control unit 350, which utilizes not only the analysis information but also the signal control information at the moment of controlling the input signal for each component element corresponding to each sound source of the input signal of each point in the receiving side terminal. Thus, hereinafter, the signal control unit 350, which is characteristic of this embodiment, will be explained.

Figure 28:
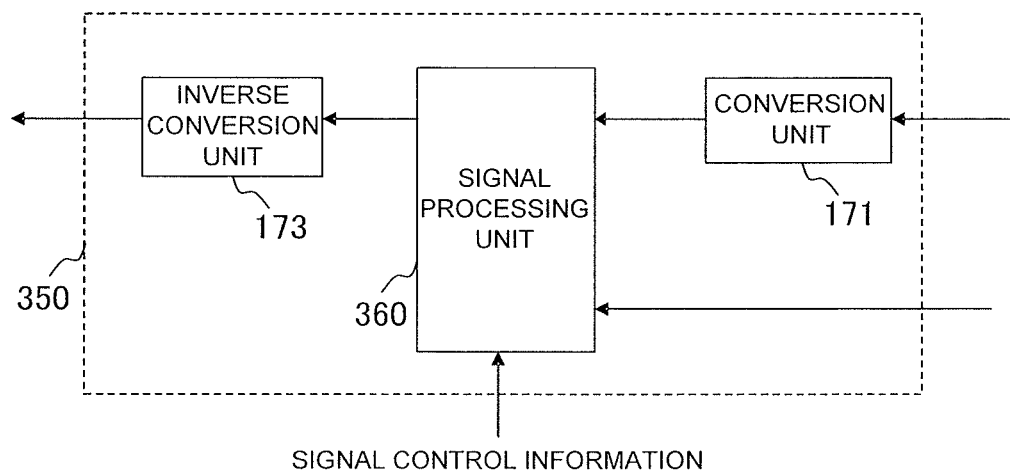
FIG. 28 shows a configuration example of a signal control unit 350.

A configuration example of the signal control unit 350 will be explained in details by making a reference to FIG. 28. The signal control unit 350 is configured of a conversion unit 171, a signal processing unit 360, and an inverse conversion unit 173. Upon making a comparison with the first embodiment, the signal processing unit 172 being included in the signal control unit 151 is replaced with a signal processing unit 360 in this embodiment. The signal control unit 350 receives the analysis information and the signal control information, and outputs the output signal. The signal control unit 350 manipulates the decoded signal received from the decoding unit 150 for each component element corresponding to each sound source, based upon the signal control information and the analysis information. Further, the signal control unit 350 also can manipulate the decoded signal with the component element group, which is configured of a plurality of the component elements, defined as a unit instead of the component element corresponding to each sound source. The signal processing unit 360 receives the second converted signal and the signal control information from the conversion unit 171. The signal processing unit 360 controls the component element of the frequency component of the second converted signal based upon the analysis information and the signal control information, and generates the modified decoded signal. The signal processing unit 360 outputs the modified decoded signal to the inverse conversion unit 173.

In addition, specifically, the signal processing unit 360 derives a by-frequency analysis parameter based upon the analysis information. And, the signal processing unit 360 decomposes the second converted signal into the component elements corresponding to the sound resources based upon the analysis parameter. In addition, the signal processing unit 360 prepares the modified decoded signal in which a relation between of a plurality of the component elements has been changed, responding to the by-frequency parameter based upon the signal control information. The signal processing unit 360 outputs the modified decoded signal to the inverse conversion unit 173. Further, the signal processing unit 360 may decompose the second converted signal into the component element groups each of which is configured of a plurality of the component elements based upon the analysis parameter.

A configuration may be made so that the signal control information is inputted from the outside by a user. For example, as signal control information being inputted from the outside, there exists personal information such as a taste of the user pre-registered into the receiving unit, an operational status of the receiving unit (including external environment information such as a switched-off loudspeaker), a format or a kind of the receiving unit, a use status of a power source and a cell or its residual quantity, and a kind and a status of an antenna (a shape of being folded in, its direction, etc.). Further, a configuration may be made so that the signal control information is automatically captured in the other formats. A configuration may be made so that the signal control information is automatically captured via a sensor installed inside or near to the receiving unit. For example, as signal control information being automatically captured, there exists a quantity of the external noise, brightness, a time band, a geometric position, a temperature, information synchronous with video, barcode information captured through a camera, and so on.

As explained above, the third embodiment of the present invention enables the receiving unit to control the input signal for each component element corresponding to each sound source of the input signal of each point based upon the analysis information in which the analysis information of each point has been mixed. Further, only a specific sound source can be controlled independently based upon the signal control information.

Further, the receiving unit can curtail the arithmetic quantity relating to the calculation of the analysis information because the transmission unit analyzes the analysis information.

A fourth embodiment of the present invention will be explained. This embodiment is characterized in controlling the objective sound and the background sound based upon the analysis information and the signal control information with the input signal, in which the objective sound and the background sound coexist, targeted as a sound source.

This embodiment will be explained in details by making a reference to FIG. 27. Upon comparing this embodiment with the second embodiment, while the receiving unit 15 shown in FIG. 1 is configured of the signal control unit 151, the receiving unit 35 shown in FIG. 27 is configured of a signal control unit 350. Further, in this embodiment, the signal control information is inputted into the signal control unit 350. Signal control information is similar to the signal control information employed in the third embodiment, so its explanation is omitted. In addition, a configuration of the signal control unit 350 will be explained by making a reference to FIG. 28. The signal control unit 350 is configured of a conversion unit 171, a signal processing unit 360, and an inverse conversion unit 173. Upon making a comparison with the second embodiment, the signal processing unit 172 being included in the signal control unit 151 shown in FIG. 5 is replaced with the signal processing unit 360 in this embodiment.

Continuously, a first example will be explained. In the first example, the suppression coefficient is employed as analysis information.

Figure 29:
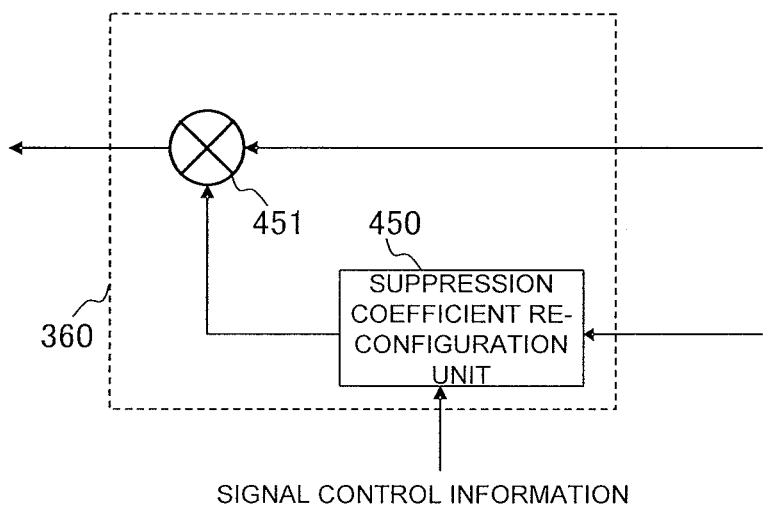
FIG. 29 shows a configuration example of a signal processing unit 360.

A configuration example of the signal processing unit 360 will be explained in details by making a reference to FIG. 29. Upon making a comparison with the second embodiment, the suppression coefficient re-configuration unit 250 being included in the signal processing unit 172 shown in FIG. 12 is replaced with a suppression coefficient re-configuration unit 450 in the signal processing unit 360. The suppression coefficient re-configuration unit 450 receives the signal control information from the outside. The above signal control information is similar to the signal control information employed in the third embodiment, so its explanation is omitted.

The signal processing unit 360 receives the second converted signal, the analysis information, and the signal control information, and outputs the modified decoded signal. The signal processing unit 360 is configured of a suppression coefficient re-configuration unit 450 and a multiplier 451. The second converted signal is inputted into the multiplier 451, and the analysis information and the signal control information are inputted into the suppression coefficient re-configuration unit 450. The suppression coefficient re-configuration unit 450 generates the modified suppression coefficient by employing the inputted analysis information and signal control information. The modified suppression coefficient is one obtained by modifying the suppression coefficient received as analysis information by employing the signal control information. The suppression coefficient re-configuration unit 450 outputs the modified suppression coefficient to the multiplier 451. The multiplier 451 multiplies the second converted signal by the modified suppression coefficient, and generates the modified decoded signal. The multiplier 451 outputs the modified decoded signal to the inverse conversion unit 173.

Figure 30:
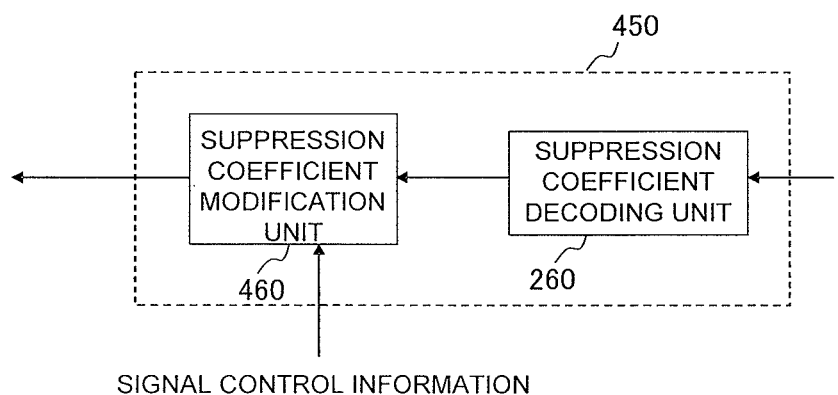
FIG. 30 is a configuration example of a suppression coefficient re-configuration unit 450.

A configuration of the suppression coefficient re-configuration unit 450 of the first example will be explained in details by making a reference to FIG. 30. The suppression coefficient re-configuration unit 450 includes a suppression coefficient modification unit 460. The suppression coefficient re-configuration unit 250 of the second embodiment shown in FIG. 14 does not include the suppression coefficient modification unit 460. The suppression coefficient modification unit 460 modifies the suppression coefficient by employing the signal control information inputted from the outside. This signal control information is similar to the signal control information already employed in the third embodiment, so its explanation is omitted.

The suppression coefficient re-configuration unit 450 receives the encoded suppression coefficient as analysis information, and the signal control information, and outputs the modified suppression coefficient. The suppression coefficient re-configuration unit 450 is configured of a suppression coefficient decoding unit 260 and a suppression coefficient modification unit 460. The suppression coefficient decoding unit 260 decodes the received suppression coefficient. The suppression coefficient decoding unit 260 outputs the suppression coefficient to the suppression coefficient modification unit 460 without performing the decoding operation when the suppression coefficient has not been encoded. The suppression coefficient modification unit 460 modifies the inputted suppression coefficient by employing the signal control information inputted from the outside. The suppression coefficient modification unit 460 outputs the modified suppression coefficient.

Figure 31:
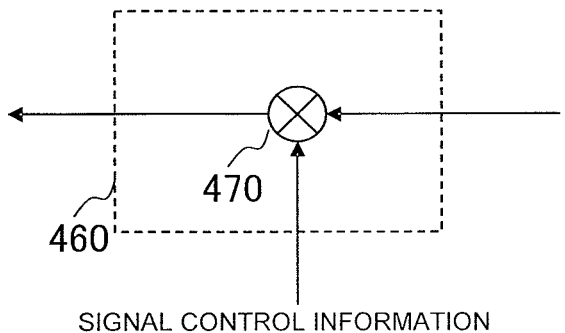
FIG. 31 shows a configuration example of a suppression coefficient modification unit 460.

A first configuration example of the suppression coefficient modification unit 460 will be explained in details by making a reference to FIG. 31. The suppression coefficient modification unit 460 receives the suppression coefficient and the signal control information, and outputs the modified suppression coefficient. The suppression coefficient modification unit 460 of this configuration example is configured of a multiplier 470. The multiplier 470 calculates a product of the suppression coefficient and the signal control information, and outputs the modified suppression coefficient. In this configuration example, a magnification for the suppression coefficient is inputted as the signal control information. Such a configuration makes it possible to control the suppression coefficient with the simple signal control information.

Figure 32:
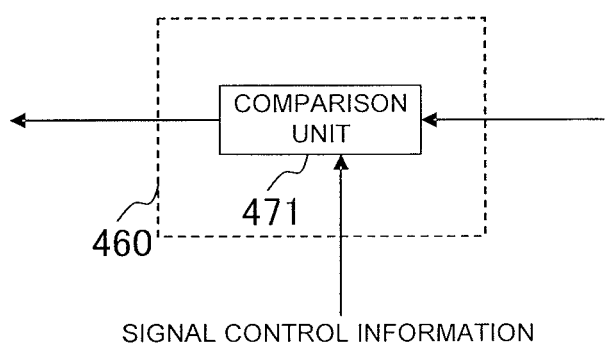
FIG. 32 shows a second configuration example of the suppression coefficient modification unit 460.

A second configuration example of the suppression coefficient modification unit 460 will be explained in details by making a reference to FIG. 32. The suppression coefficient modification unit 460 receives the suppression coefficient and the signal control information, and outputs the modified suppression coefficient. The suppression coefficient modification unit 460 of this configuration example is configured of a comparison unit 471. The comparison unit 471 compares the suppression coefficient with the signal control information, and outputs the signal responding to its comparison result. For example, the comparison unit 471 outputs the suppression coefficient or the signal control information, which is larger, when making a maximum comparison. Further, the comparison unit 471 may make a minimum comparison. In these cases, the maximum value or the minimum value of the suppression coefficient is inputted as the signal control information. Such a configuration makes it possible to pre-specify a range of the output signal, and to avoid a decline in the sound quality due to the output of the unexpected signal.

Figure 33:
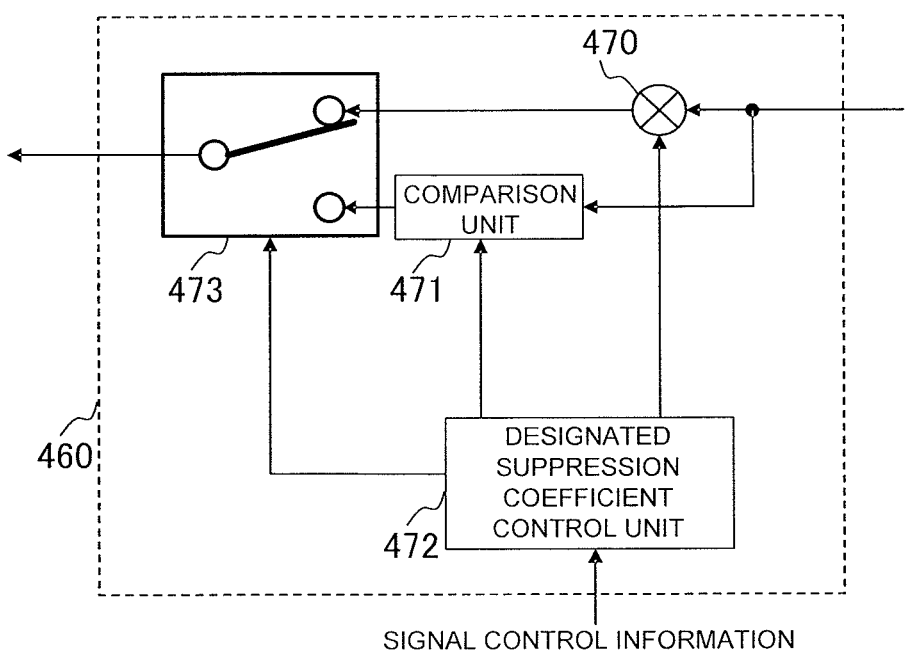
FIG. 33 shows a third configuration example of the suppression coefficient modification unit 460.

A third configuration example of the suppression coefficient modification unit 460 will be explained in details by making a reference to FIG. 33. The third configuration example of the suppression coefficient modification unit 460 is one obtained by combining the foregoing first configuration example and second configuration example. The suppression coefficient modification unit 460 receives the suppression coefficient and the signal control information, and outputs the modified suppression coefficient. The suppression coefficient modification unit 460 of this configuration example is configured of a multiplier 470, a comparison unit 471, a designated suppression coefficient control unit 472, and a switch 473. The designated suppression coefficient control unit 472 outputs the signal control information to the multiplier 470, the comparison unit 471, or the switch 473. Herein, the signal control information includes at least a magnification of the suppression coefficient being used in the multiplier 470 and the maximum value or the minimum value of the suppression coefficient being used in the comparison unit 471. In addition, the signal control information may include the control information for selection being made by the switch 473. The designated suppression coefficient control unit 472 outputs a magnification of the suppression coefficient to the multiplier 470 when receiving a magnification of the suppression coefficient as signal control information. The multiplier 470 calculates a product of the suppression coefficient and a magnification of the suppression coefficient, and outputs the modified suppression coefficient to the switch 473. The designated suppression coefficient control unit 472 outputs the maximum value or the minimum value of the suppression coefficient to the comparison unit 471 when receiving the maximum value or the minimum value of the suppression coefficient as signal control information. The comparison unit 471 compares the suppression coefficient with the maximum value or the minimum value of the suppression coefficient, and outputs the signal responding to its comparison result as a modified suppression coefficient to the switch 473. The designated suppression coefficient control unit 472 outputs the control information to the switch 473 when receiving the control information for the selection. When the control information is inputted from the designated suppression coefficient control unit 472, the switch 473 selects and outputs one of an output of the multiplier 470 and an output of the comparison unit 471 responding to the above signal control information.

Next, a second example will be explained. In the second example, the signal versus background sound ratio, being a configuration ratio of the objective sound and the background sound, is employed as analysis information. The signal processing unit 360 of the second example, which is similar to the signal processing unit of the first example shown in FIG. 29, differs in a configuration of a suppression coefficient re-configuration unit 450.

Figure 34:
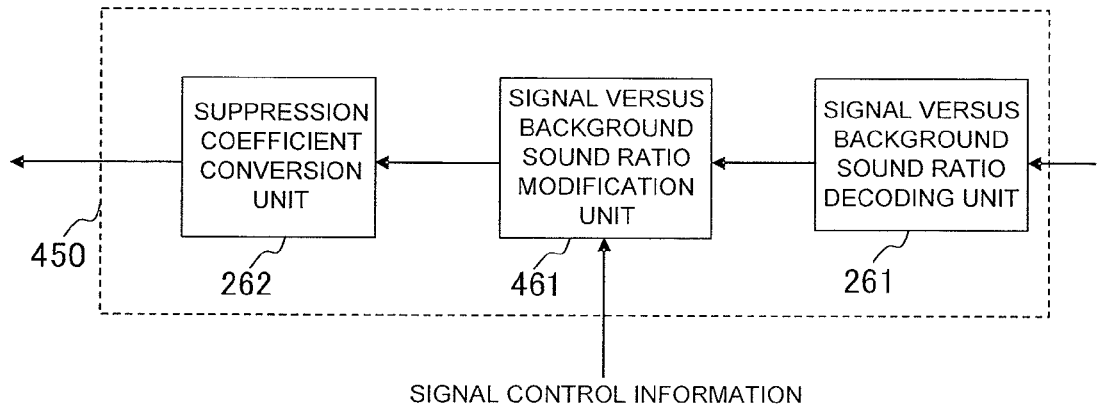
FIG. 34 shows a second configuration example of the suppression coefficient re-configuration unit 450.

A configuration example of the suppression coefficient re-configuration unit 450 of the second example will be explained in details by making a reference to FIG. 34. Upon making a comparison with the suppression coefficient re-configuration unit 250 of the second embodiment shown in FIG. 17, the suppression coefficient re-configuration unit 450 of this configuration example further includes a signal versus background sound ratio modification unit 461.

The suppression coefficient re-configuration unit 450 receives the encoded signal versus background sound ratio and the signal control information, and outputs the modified suppression coefficient. The suppression coefficient re-configuration unit 450 is configured of a signal versus background sound ratio decoding unit 261, the signal versus background sound ratio modification unit 461, and a suppression coefficient conversion unit 262. The signal versus background sound ratio decoding unit 261 decodes the received signal versus background sound ratio, which has been encoded, and outputs the signal versus background sound ratio to the signal versus background sound ratio modification unit 461. The signal versus background sound ratio decoding unit 261 outputs the signal versus background sound ratio without performing the decoding operation when the signal versus background sound ratio has not been encoded. The signal versus background sound ratio modification unit 461 modifies the inputted signal versus background sound ratio by employing the signal control information received from the outside, and generates the modified signal versus background sound ratio. A modification method similar to that of the suppression coefficient modification unit 460 in the first example may be applied for modifying the signal versus background sound ratio. That is, the signal versus background sound ratio may be modified by inputting a magnification of the signal versus background sound ratio as signal control information. Further, the signal versus background sound ratio may be modified by inputting the maximum value or the minimum value of the signal versus background sound ratio as signal control information. In addition, the signal versus background sound ratio may be modified by inputting the signal control information for selecting one of the signal versus background sound ratio modified with a magnification of the signal versus background sound ratio and the signal versus background sound ratio modified with the maximum value or the minimum value of the signal versus background sound ratio as signal control information. The signal versus background sound ratio modification unit 461 outputs the modified signal versus background sound ratio to the suppression coefficient conversion unit 262. The suppression coefficient conversion unit 262 converts the modified signal versus background sound ratio into the suppression coefficient, and outputs the modified suppression coefficient. As a method of converting the signal versus background sound ratio into the suppression coefficient, a conversion method similar to that of the suppression coefficient conversion unit 262 shown in FIG. 11 may be employed. In the second example, after the signal versus background sound ratio is modified with the signal control information, it is converted into the modified signal versus background sound ratio suppression coefficient. The above signal control information is similar to the signal control information employed in the third embodiment, so its explanation is omitted.

In addition, a third example will be explained. Upon making a comparison with the foregoing second example, the third example assumes a configuration in which after the signal versus background sound ratio is converted into the suppression coefficient, the suppression coefficient is modified with the signal control information.

Figure 35:
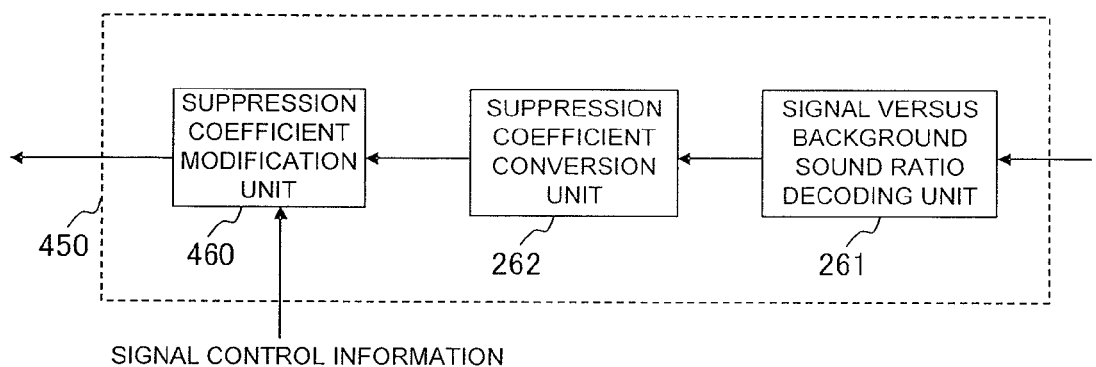
FIG. 35 shows a third configuration example of the suppression coefficient re-configuration unit 450.

The suppression coefficient re-configuration unit 450 of the third example will be explained in details by making a reference to FIG. 35. Upon making a comparison with the suppression coefficient re-configuration unit 250 of the second example shown in FIG. 17, the suppression coefficient re-configuration unit 450 of this example further includes a suppression coefficient modification unit 460.

The suppression coefficient re-configuration unit 450 receives the encoded signal versus background sound ratio and the signal control information, and outputs the modified suppression coefficient. The suppression coefficient re-configuration unit 450 is configured of a signal versus background sound ratio decoding unit 261, a suppression coefficient conversion unit 262, and a suppression coefficient modification unit 460. The signal versus background sound ratio decoding unit 261 receives and decodes the encoded signal versus background sound ratio. The signal versus background sound ratio decoding unit 261 outputs the signal versus background sound ratio to the suppression coefficient conversion unit 262. The suppression coefficient conversion unit 262 converts the decoded signal versus background sound ratio into the suppression coefficient. The suppression coefficient conversion unit 262 outputs the suppression coefficient to the suppression coefficient modification unit 460. The suppression coefficient modification unit 460 modifies the suppression coefficient inputted from the suppression coefficient conversion unit 262 by employing the signal control information received from the outside. The suppression coefficient modification unit 460 outputs the modified suppression coefficient. The above signal control information is similar to the signal control information employed in the third embodiment, so its explanation is omitted. A configuration of the suppression coefficient modification unit 460 is similar to that of the suppression coefficient modification unit 460 of the first example shown in FIG. 30, so its explanation is omitted.

Figure 36:
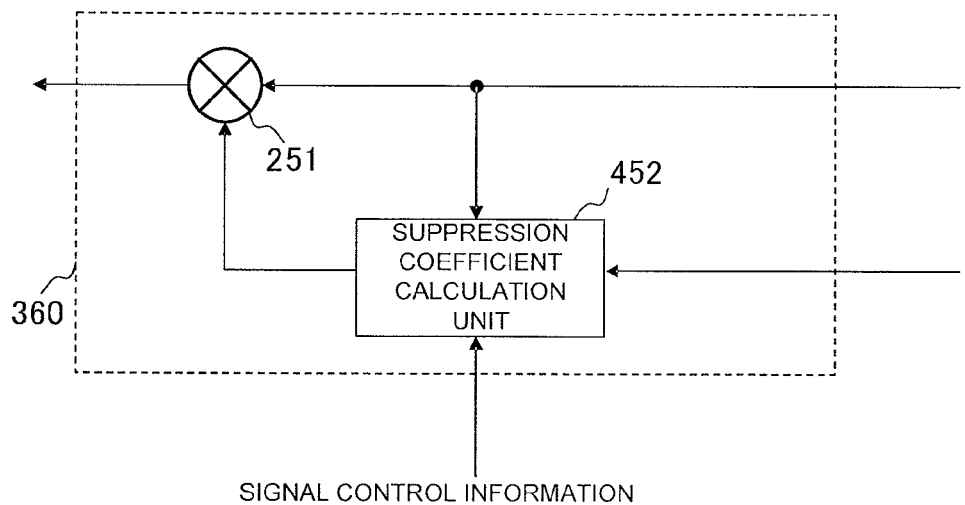
FIG. 36 shows a second configuration example of the signal processing unit 360.

Continuously, a fourth example will be explained. The fourth example is a configuration example of the case of employing the background sound itself as analysis information. A first configuration example of the signal processing unit 360 of the fourth example will be explained in details by making a reference to FIG. 36. The suppression coefficient calculation unit 252 of the signal processing unit 172 of the second example shown in FIG. 22 is replaced with a suppression coefficient calculation unit 452 in the signal processing unit 360 of this example. The suppression coefficient calculation unit 452 receives the signal control information from the outside.

The signal processing unit 360 receives the second converted signal, the encoded background sound, and the signal control information, and outputs the modified decoded signal. The signal processing unit 360 is configured of the suppression coefficient calculation unit 452 and a multiplier 251. The second converted signal is inputted into the suppression coefficient calculation unit 452 and the multiplier 251, and the encoded background sound is inputted as analysis information into the suppression coefficient calculation unit 452. The suppression coefficient calculation unit 452 calculates the modified suppression coefficient based upon the encoded background sound, the second converted signal, and the signal control information. And, the suppression coefficient calculation unit 452 outputs the modified suppression coefficient to the multiplier 251. The multiplier 251 multiplies the second converted signal by the suppression coefficient, and outputs the modified decoded signal to the inverse conversion unit 173. The above signal control information is similar to the signal control information employed in the third embodiment, so its explanation is omitted.

Figure 37:
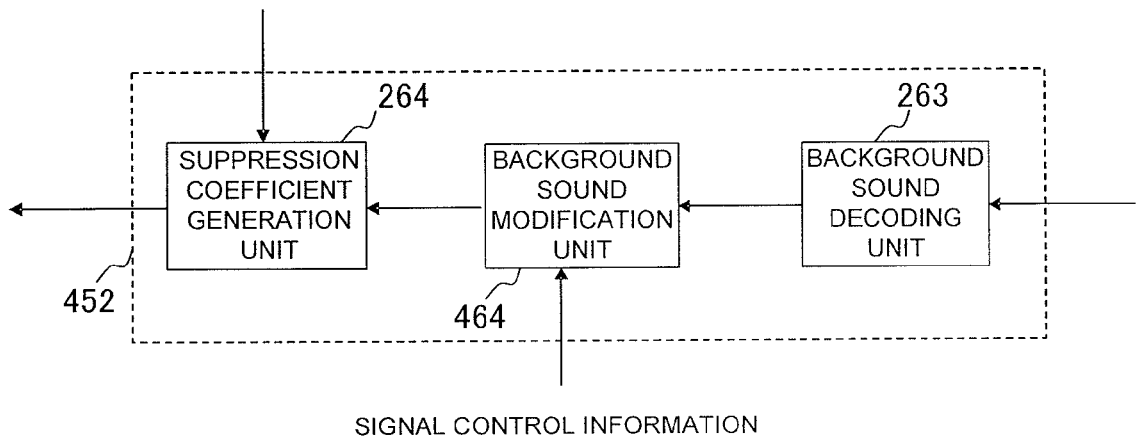
FIG. 37 shows a configuration example of a suppression coefficient calculation unit 452.

A configuration example of the suppression coefficient calculation unit 452 will be explained in details by making a reference to FIG. 37. The suppression coefficient calculation unit 452 receives the second converted signal, the encoded background sound, and the signal control information, and outputs the suppression coefficient. The suppression coefficient calculation unit 452 is configured of a background sound decoding unit 263, a background sound modification unit 464, and a suppression coefficient generation unit 264.

The background sound decoding unit 263 receives and decodes the encoded background sound. The background sound decoding unit 263 outputs the decoded background sound to the background sound modification unit 464. The background sound decoding unit 263 outputs the background sound to the background sound modification unit 464 without performing the decoding operation when the background sound has not been encoded. The background sound modification unit 464 modifies the background sound by employing the signal control information inputted from the outside. A modification method similar to that of the suppression coefficient modification unit 460 in the first example may be applied for modifying the background sound. That is, the background sound may be modified by inputting a magnification of the background sound as signal control information. Further, the background sound may be modified by inputting the maximum value or the minimum value of the background sound as signal control information. In addition, the background sound may be modified by inputting the signal control information for selecting one of the background sound modified with a magnification of the background sound and the background sound modified with the maximum value or the minimum value of the background sound as signal control information. The background sound modification unit 464 outputs the modified background sound to the suppression coefficient generation unit 264. The suppression coefficient generation unit 264 calculates an appropriate suppression coefficient for suppressing the background sound by employing the second converted signal and the modified background sound. As a method of calculating this suppression coefficient, a calculation method similar to that of the suppression coefficient calculation unit 201 shown in FIG. 10 may be employed. The suppression coefficient generation unit 264 outputs the suppression coefficient. The above signal control information is similar to the signal control information employed in the third embodiment, so its explanation is omitted.

Figure 38:
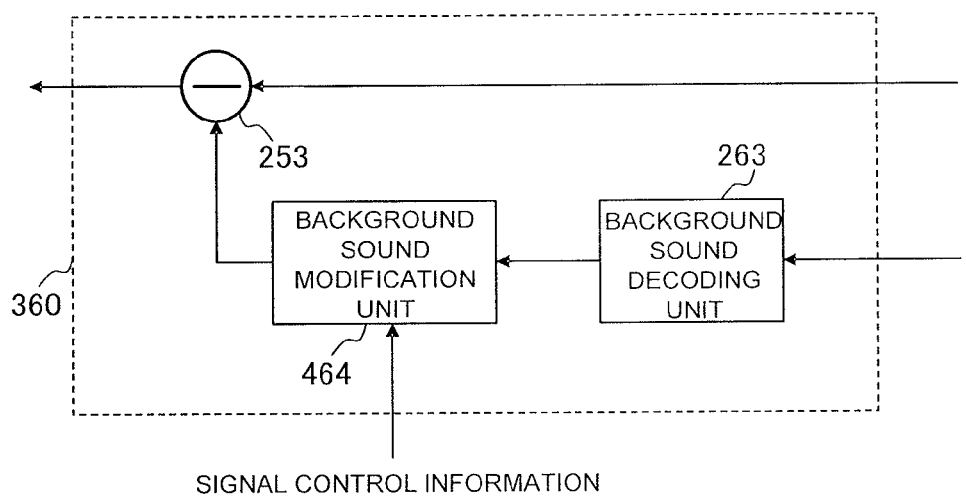
FIG. 38 shows a third configuration example of the signal processing unit 360.

A second configuration example of the signal processing unit 360 will be explained in details by making a reference to FIG. 38. The signal processing unit 360 of this configuration example is configured of a background sound decoding unit 263, a background sound modification unit 464, and a subtracter 253. The signal processing unit 360 receives the second converted signal, the encoded background sound, and the signal control information, and outputs the signal of which the background sound has been controlled.

The second converted signal is inputted into the subtracter 253. Further, the encoded background sound is inputted into the background sound decoding unit 263 as analysis information. The background sound decoding unit 263 decodes the encoded background sound that has been inputted. And, the background sound decoding unit 263 outputs the decoded background sound to the background sound modification unit 464. The background sound decoding unit 263 outputs the background sound without performing the decoding operation therefor when the background sound has not been encoded. The background sound modification unit 464 modifies the background sound information by employing the signal control information, and generates the modified background sound. The background sound modification unit 464 outputs the modified background sound to the subtracter 253. The subtracter 253 subtracts the modified background sound from the second converted signal, and outputs a subtraction result.

Figure 39:
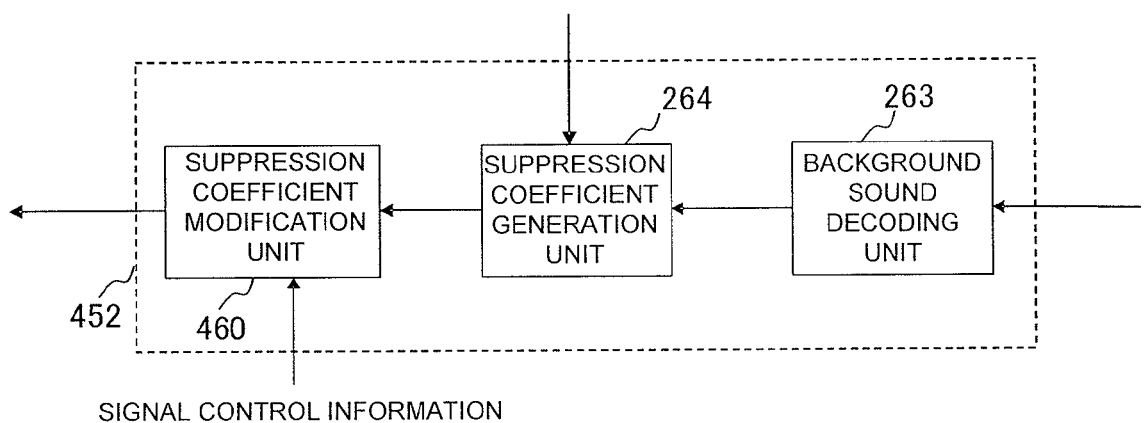
FIG. 39 shows a second configuration example of the suppression coefficient calculation unit 452.

A fifth example, contrary to the fourth example, decodes the background sound, generates the suppression coefficient, and thereafter, modifies the suppression coefficient by use of the signal control information. At this time, the suppression coefficient calculation unit 452, as shown in FIG. 39, is configured of a background sound decoding unit 263, a suppression coefficient generation unit 264, and a suppression coefficient modification unit 460. The background sound decoding unit 263 receives the analysis information as encoded background sound, and decoding it, thereby to obtain the decoded analysis information. The suppression coefficient generation unit 264 generates the suppression coefficient by employing the decoded signal and the decoded analysis information (decoded background sound) outputted from the background sound decoding unit 263. The suppression coefficient modification unit 460 modifies the suppression coefficient received from suppression coefficient generation unit 264 by employing the signal control information received from the outside, and outputs it. Explanation of the signal control information was already made in the third embodiment, so its explanation is omitted herein. Next, the fifth example will be explained. Upon making a comparison with the fourth example, this example assumes a configuration in which after the suppression coefficient is generated from the decoded background sound, the suppression coefficient is modified with the signal control information.

The suppression coefficient calculation unit 452 will be explained in details by making a reference to FIG. 39. The suppression coefficient calculation unit 452 receives the second converted signal, the encoded background sound, and the signal control information, and outputs the modified suppression coefficient. The suppression coefficient calculation unit 452 is configured of a background sound decoding unit 263, a suppression coefficient generation unit 264, and a suppression coefficient modification unit 460.

The background sound decoding unit 263 receives and decodes the encoded background sound. And, the background sound decoding unit 263 outputs the decoded background sound to the suppression coefficient generation unit 264. The suppression coefficient generation unit 264 generates the suppression coefficient from the second converted signal and the decoded background sound. As a calculation of this suppression coefficient, a calculation method similar to that of the suppression coefficient calculation unit 201 shown in FIG. 27 may be employed. And, the suppression coefficient generation unit 264 outputs the suppression coefficient to the suppression coefficient modification unit 460. The suppression coefficient modification unit 460 modifies the suppression coefficient by employing the received signal control information, and generates the modified suppression coefficient. A modification method similar to that of the suppression coefficient modification unit 460 shown in FIG. 33 may be applied for modifying the suppression coefficient. That is, the suppression coefficient may be modified by inputting a magnification of the suppression coefficient as signal control information. Further, the suppression coefficient may be modified by inputting the maximum value or the minimum value of the suppression coefficient as signal control information. In addition, the suppression coefficient may be modified by inputting the signal control information for selecting a magnification of the suppression coefficient, or the maximum value or the minimum value of the suppression coefficient as signal control information. The suppression coefficient modification unit 460 outputs the modified suppression coefficient. The above signal control information is similar to the signal control information employed in the third embodiment, so its explanation is omitted.

As explained above, the fourth embodiment of the present invention enables the receiving unit to control the input signal, which is configured of the objective sound and the background sound of each point, for each objective sound and for each background sound of each point independently based upon the analysis information in which the analysis information of each point has been mixed. Further, only a specific sound source can be controlled independently based upon the signal control information.

In addition, the receiving unit can curtail the arithmetic quantity relating to the calculation of the analysis information because the transmission unit calculates the analysis information such as the suppression coefficient and the signal versus background sound ratio.

A fifth embodiment of the present invention will be explained. This embodiment is characterized in that the receiving side terminal controls the input signal for each component element corresponding to each sound source of the input signal of each point based upon the analysis information, the object information, the signal control information, and the component element rendering information.

Figure 40:
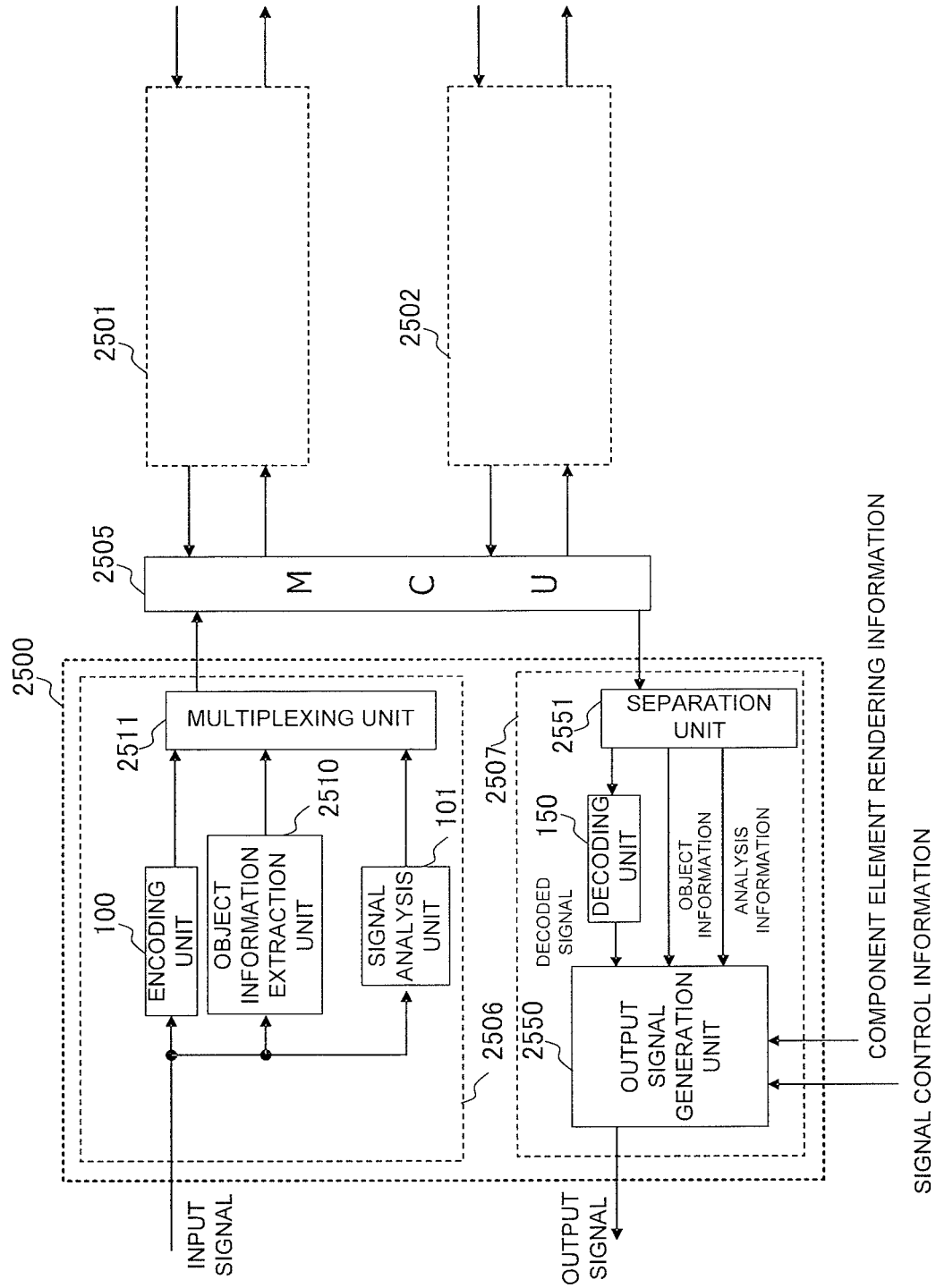
FIG. 40 is a block diagram illustrating a fifth embodiment of the present invention.

Upon making a reference to FIG. 40, the multipoint control system of this embodiment includes conference terminals 2500, 2501, and 2502 being dispersively arranged in each point, and a multipoint control unit (MCU) 2505 for controlling data exchange between the conference terminals. The multipoint control unit 2505 mixes the transmission signals outputted from each terminal, and distributes the identical mixed signal to each terminal. While an example of connecting three points was shown in FIG. 40, the multipoint control unit 2505 can be configured to connect the points of which the number is arbitrary.

A configuration example of the terminals 2500, 2501, and 2502 will be explained by employing FIG. 40 similarly to the foregoing. Additionally, each of these terminals can assume an identical configuration, so a configuration example of only the terminal 2500 is shown. Hereinafter, the terminal 2500 is exemplified for explanation.

The terminal 2500 is configured of a transmission unit 2506 including an encoding unit 100, a signal analysis unit 101, an object information extraction unit 2510, and a multiplexing unit 2511, and a receiving unit 2507 including a decoding unit 150, an output signal generation unit 2550, and a separation unit 2551.

The input signal is inputted into the encoding unit 100, the signal analysis unit 101, and the object information extraction unit 2510 each of which exists in the transmission unit 2506.

The encoding unit 100 encodes the input signal and outputs the encoded signal to the multiplexing unit 2511. The signal analysis unit 101 calculates the analysis information of the component element corresponding to each sound source being included in the input signal, and outputs the analysis information to the multiplexing unit 2511. The object information extraction unit 2510 seizes the input signal as one object signal, frequency-converts the object signal, extracts an object parameter indicative of a characteristic of the object signal for each frequency component, and outputs the object parameters collected in a lump as object information to the multiplexing unit 2511. The multiplexing unit 2511 multiplexes the encoded signal outputted from the encoding unit 100, the analysis information outputted from the signal analysis unit 101, and the object information outputted from the object information extraction unit 2510, and output them as a transmission signal to the transmission path. Additionally, the detailed operation of the encoding unit 100, the signal analysis unit 101, and the decoding unit 150 was already explained in the first embodiment.

The separation unit 2551 of the receiving unit 2507 separates the transmission signal inputted from the transmission path into the encoded signal, the analysis information, and the object information, outputs the encoded signal to the decoding unit 150, and the analysis information and the object information to the output signal generation unit 2550, respectively. The decoding unit 150 generates the decoded signal by decoding the encoded signal, and outputs it to the output signal generation unit 2550. Herein, the decoded signal is one that is configured of general plural sound sources. The output signal generation unit 2550 manipulates the decoded signal outputted from the decoding unit 150 for each component element corresponding to each sound source, based upon the analysis information and the object information outputted from the separation unit 2551, and the signal control information and the component element rendering information that are inputted via the input terminal, and outputs the output signal. The output signal generation unit 2550 can manipulate the decoded signal with the component element group, which is configured of a plurality of the component element, defined as a unit instead of the component element corresponding to each sound source.

Herein, the above component element rendering information is information indicative of a relation between the component element being included in the decoded signal and the output signal of the receiving unit for each frequency component. For example, the component element rendering information could be information, which indicates sound localization of each component element being mixed in the decoded signal, in an auditory scene in which the output signal is reproduced.

Figure 41:
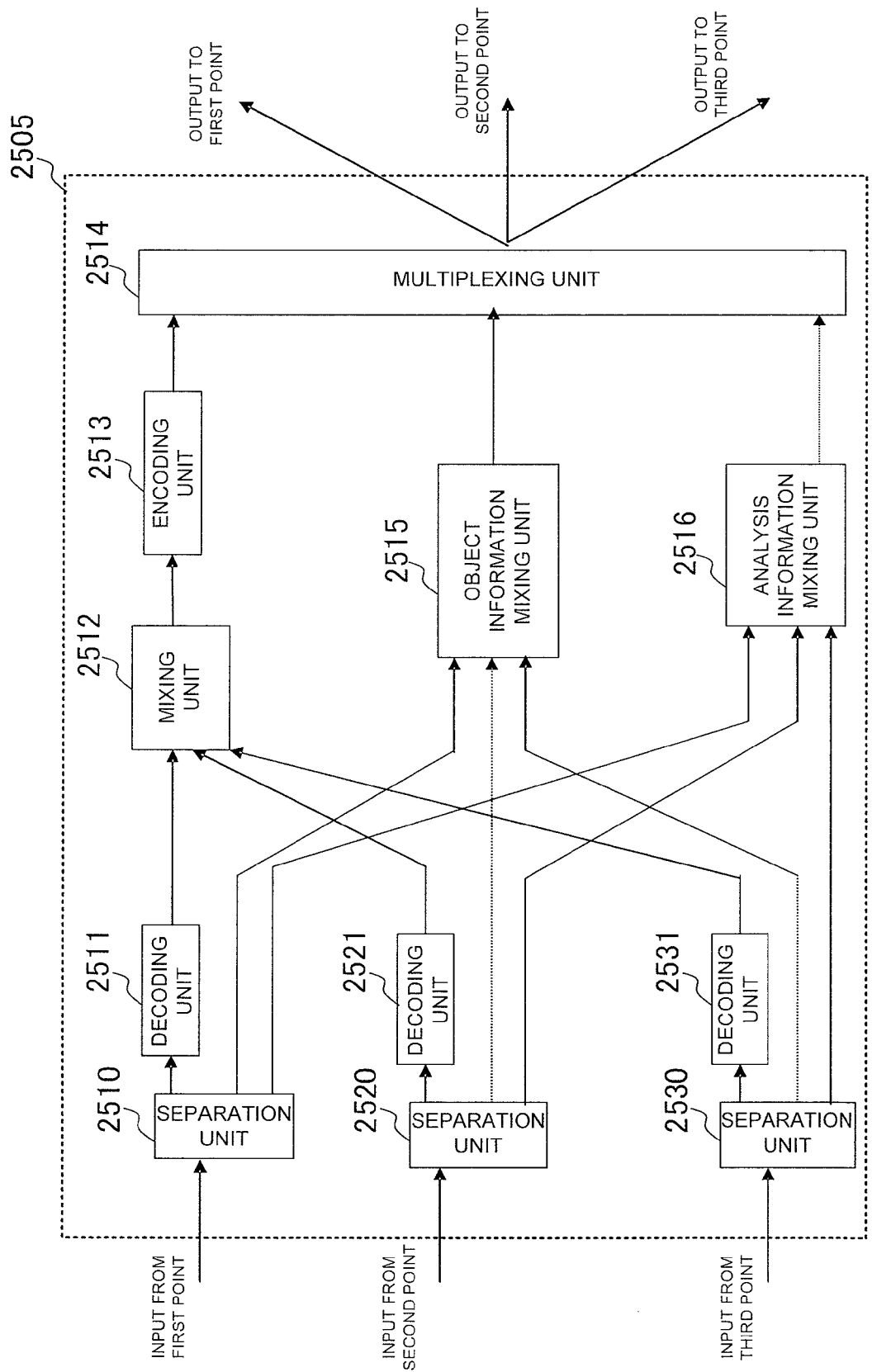
FIG. 41 shows a configuration example of a multipoint control unit (MCU) 2105.

A configuration example of the multipoint control unit 2505 is shown in FIG. 41. While an example of connecting three points was shown in FIG. 41, the multipoint control unit 2505 can be configured to connect the points of which the number is arbitrary. In FIG. 41, the transmission signals received from the terminals installed in the first to third points are inputted into the separation units 2510, 2520, and 2530 via the input terminal, respectively.

The separation units 2510, 2520, and 2530 separate the transmission signal into the encoded signal, the analysis information, and the object information, and output the encoded signal to the decoding units 2511, 2521, and 2531, respectively, the analysis information to the analysis information mixing unit 2516, and the object information to the object information mixing unit 2515. Each of the decoding units 2511, 2521, and 2531 generates the decoded signal by decoding the encoded signal, and outputs it to the mixing unit 2512. The mixing unit 2512 mixes all of the decoded signals coming from each point, generated the mixed signal, and outputs it to the encoding unit 2513. The encoding unit 2513 encodes the mixed signal, and outputs the encoded mixed signal to the multiplexing unit 2514. The analysis information mixing unit 2516 mixes all of the analysis information coming from each point, and outputs the mixed analysis information to the multiplexing unit 2514. The object information mixing unit 2515 mixes all of the object information coming from each point, and outputs the mixed object information to the multiplexing unit 2514.

Herein, the object information is configured of the object parameter indicative of each frequency component of the decoded signal, and as a method of mixing the object parameters, all of the inputted object parameters may be mixed in some cases, and the object parameters may be selected responding to an importance degree thereof to mix only selected object parameters in some cases. As another method of mixing the object parameters, a plurality of the inputted object parameters may be multiplexed to define it as one object parameter group. The object information being outputted from the object information mixing unit 2515 becomes information indicative of a relation between the mixed signal generated by the mixing unit 2512 and each decoded signal, being an input thereof, (hereinafter, referred to as an object signal) for each frequency component.

The multiplexing unit 2514 multiplexes the encoded mixed signal being outputted from the encoding unit 2513, the mixed analysis information being outputted from the analysis information mixing unit 2516, and the mixed object information being outputted from the object information mixing unit 2515, and outputs each of them as a transmission signal to the transmission path of each point. Additionally, a detailed operation of the decoding units 2511, 2521, and 2531 is identical to that of the decoding unit 150 of the first embodiment, and a detailed operation of the encoding unit 2513 is identical to that of the encoding unit 100 of the first embodiment. A detailed operation of the analysis information mixing unit 2516 is identical to that of the analysis information mixing unit 2114 of the first embodiment shown in FIG. 6.

Hereinafter, a first configuration example and a second configuration example of the output signal generation unit 2550 will be explained.

Figure 42:
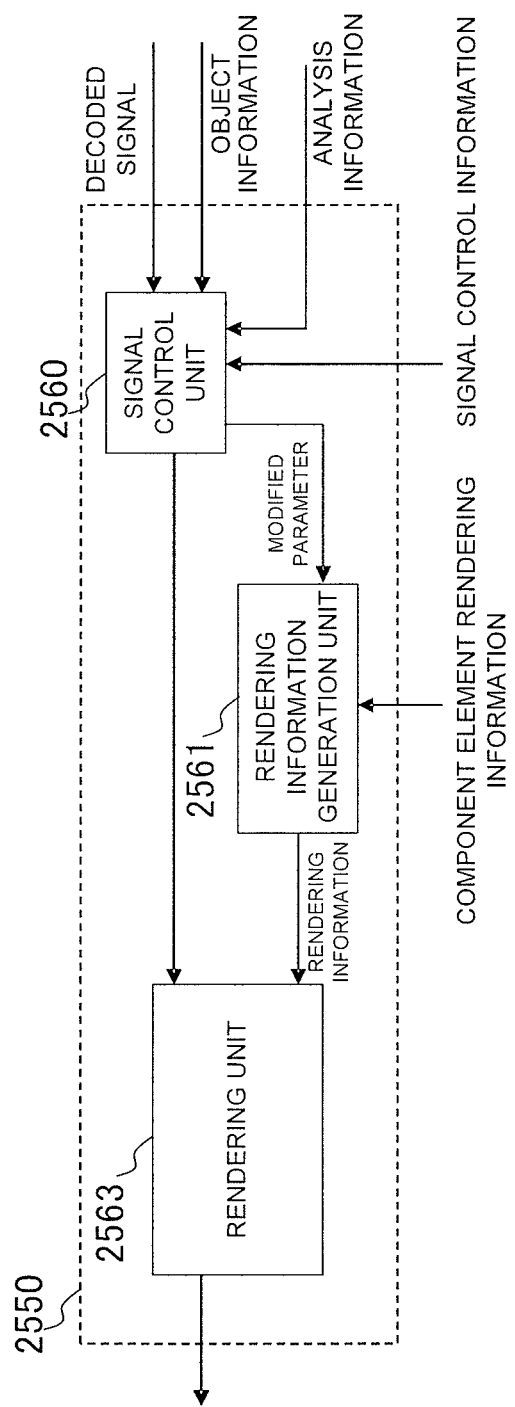
FIG. 42 shows a configuration example of an output signal generation unit 2550.

A first configuration example is shown in FIG. 42. The output signal generation unit 2550 is configured of a signal control unit 2560, a rendering information generation unit 2561, and a rendering unit 2563.

The signal control unit 2560 has the decoded signal, the object information, and the analysis information as an input. The signal control unit 2560 decodes the object information and the analysis information, and generates the object parameter and the analysis parameter, respectively. Next, the signal control unit 2560 decomposes the decoded signal into the object signals (before-mixture signals) by employing the object parameter, and, in addition, decomposes the object signal into the component elements by employing the analysis parameter. In addition, after the signal control unit 2560 generates the modified component element in which the component element has been modified based upon the signal control information, it re-configures the modified decoded signal (after-mixture signal, namely, the signal in which the decoded signal has been modified based upon the signal control information) from the modified component element, and outputs the modified decoded signal to the rendering unit 2563. Further, the signal control unit 2560 generates a modified parameter indicative of a relation between the modified decoded signal and the modified component element for each frequency component, and outputs the modified parameter to the rendering information generation unit 2561.

The signal control unit 2560 may convert the decoded signal into the modified decoded signal by employing the object parameter, the analysis parameter and the signal control information without generating the modified component element as another operation example. In this case, the signal control unit 2560 outputs the modified parameter used at the moment of converting the decoded signal into the modified decoded signal to the rendering information generation unit 2561.

Hereinafter, a specific example of an operation of the signal control unit 2560 will be explained.

Upon defining the frequency component of the decoded signal in a certain frequency band f as $X_k(f)$, k=1, 2, ..., P (P is the number of the channels of the decoded signal), the frequency component of the object signal in the identical frequency band as $Z_{ih}(f)$, i=1, 2, ..., L, h=1, 2, ..., K (L is the number of the objects, namely, the number of the terminals, and K is the number of the channels of the object signal), the frequency component of the component element of the i-th object signal as $Y_{ij}(f)$, j=1, 2, ..., $M_i$ ($M_i$ is the number of the component elements of the i-th object signal), the frequency component of the component element modified based upon the signal control information as $Y'_{ij}(f)$, the modified object signal as $Z'_{ij}(f)$, and the modified decoded signal as $X'(f)$, the following relation holds by employing a conversion function $F_{500}$ being specified with the object parameter, a conversion function $F_{501}$ being specified with the analysis parameter, and a conversion function $F_{502}$ being specified with the signal control information.

$Z_{ih}(f)=F_{500}(X_1(f),X_2(f),\ldots,X_P(f))$  [Numerical equation 11]

$Y_{ij}(f)=F_{501}(Z_{i1}(f),Z_{i2}(f),\ldots,Z_{iK}(f))$  [Numerical equation 12]

$Y'_{ij}(f)=F_{502}(Y_{ij}(f))$  [Numerical equation 13]

$X'(f)=F_{503}(Y'_{ij}(f))$  [Numerical equation 14]

Where, the conversion function $F_{503}$ is a function for converting the modified component element into the modified decoded signal, and the modified parameter becomes a parameter indicative of the inverse function of the conversion function $F_{503}$.

As mentioned as another operation example, by integrating the conversion functions $F_{500}$, $F_{501}$, $F_{502}$, and $F_{503}$, the following equation may be yielded.

$X'(f)=F_{504}(X(f))$  [Numerical equation 15]

At this time, the conversion function $F_{504}$ is specified with the object parameter, the analysis parameter, the signal control information, and the modified parameter.

As a specific example of the above-mentioned conversion, upon expressing an object parameter C(f) of the frequency band f as the following [Numerical equation 16], and an analysis parameter B(f) as the following [Numerical equation 17] by employing an $M_i$-row and K-column zero matrix $Z_{M_iK}$ in which all matrix elements are zero, and a signal control information A(f) as the following [Numerical equation 18], [Numerical equation 11] to [Numerical equation 15] can be expressed by the following [Numerical equation 19].

[Numerical equation 16]

$$C(f) = \begin{bmatrix} C_{1,1}(f) & C_{1,2}(f) & \ldots & C_{1,P}(f) \\ C_{2,1}(f) & C_{2,2}(f) & \ldots & C_{2,P}(f) \\ \vdots & \vdots & \ddots & \vdots \\ C_{L\times K,1}(f) & C_{L\times K,2}(f) & \ldots & C_{L\times K,P}(f) \end{bmatrix}$$

[Numerical equation 17]

$$B(f) = \begin{bmatrix} B_1(f) & z_{M_1K} & \ldots & z_{M_1K} \\ z_{M_2K} & B_2(f) & \ldots & z_{M_2K} \\ \vdots & \vdots & \ddots & \vdots \\ z_{M_NK} & z_{M_NK} & \ldots & B_L(f) \end{bmatrix},$$

$$B_i(f) = \begin{bmatrix} b_{11}(i,f) & b_{12}(i,f) & \ldots & b_{1K}(i,f) \\ b_{21}(i,f) & b_{22}(i,f) & \ldots & b_{2K}(i,f) \\ \vdots & \vdots & \ddots & \vdots \\ b_{M_i1}(i,f) & b_{M_i2}(i,f) & \ldots & b_{M_ik}(i,f) \end{bmatrix},$$

$i = 1, 2, \ldots, L$

[Numerical equation 18]

$$A(f) = \begin{bmatrix} A_1(f) & 0 & \ldots & 0 \\ 0 & A_2(f) & \ldots & 0 \\ \vdots & \vdots & \ddots & \vdots \\ 0 & 0 & \ldots & A_M(f) \end{bmatrix},$$

$$M = \sum_{k=1}^{L} M_i$$

[Numerical equation 19]

$$X(f) = \begin{bmatrix} X_1(f) \\ X_2(f) \\ \vdots \\ X_P(f) \end{bmatrix},$$

$Z(f) = C(f) \cdot X(f),$ $Y(f) = B(f) \cdot Z(f) \cdot = B(f) \cdot C(f) \cdot X(f),$ $Y'(f) = A(f) \cdot Y(f) = A(f) \cdot B(f) \cdot C(f) \cdot X(f),$ $X'(f) = D(f) \cdot Y'(f) = D(f) \cdot A(f) \cdot B(f) \cdot C(f) \cdot X(f)$ That is, a matrix for converting the decoded signal into the modified decoded signal can be calculated as D(f)×A(f)×B(f)×C(f). Herein, D(f) is an arbitrary P-row and M-column matrix, and upon defining the modified parameter as E(f), the following equation is yielded.

$E(f)=D^{-1}(f)$  [Numerical equation 20]

For example, when the inverse matrix of B(f)×C(f) is employed as D(f), the modified parameter behaves like E(f)=B(f)×C(f). Additionally, as apparent from [Numerical equation 19], it is appropriate as a manipulation of converting the modified component element into the modified decoded signal to employ the inverse matrix of B(f)×C(f) as D(f).

The rendering information generation unit 2561 converts the component element rendering information inputted via the input terminal into the rendering information by employing the modified parameter outputted from the signal control unit 2560, and outputs the rendering information to the rendering unit 2563.

As a specific example of converting the component element rendering information into the rendering information, upon expressing the component element rendering information U(f) and the rendering information W(f) as the following equations, respectively, W(f)=U(f)×E(f) can be yielded.

$$U(f) = \begin{bmatrix} U_{11}(f) & U_{12}(f) & \dots & U_{1M}(f) \\ U_{21}(f) & U_{22}(f) & \dots & U_{2M}(f) \\ \vdots & \vdots & \ddots & \vdots \\ U_{Q1}(f) & U_{Q2}(f) & \dots & U_{QM}(f) \end{bmatrix},$$ [Numerical equation 21]

$$W(f) = \begin{bmatrix} W_{11}(f) & W_{12}(f) & \dots & W_{1P}(f) \\ W_{21}(f) & W_{22}(f) & \dots & W_{2P}(f) \\ \vdots & \vdots & \ddots & \vdots \\ W_{Q1}(f) & W_{Q2}(f) & \dots & W_{QP}(f) \end{bmatrix}$$

Where, Q is the number of the channels of the output signal.

Additionally, the rendering information, which is information indicating a relation between the modified decoded signal and the output signal of the output signal generation unit 2550 for each frequency component, can be expressed by employing an energy differences, a time difference, a correlation between the signals, etc.

The rendering unit 2563 converts the modified decoded signal outputted from the signal control unit 2560 and generates the output signal by employing the rendering information outputted from the rendering information generation unit 2561, and outputs it as an output signal of the output signal generation unit 2550.

While, in the foregoing, a configuration was explained in which the modified decoded signal decomposed into the frequency components was outputted to the rendering unit 2563 as an output of the signal control unit 2560, the rendering unit 2563 decomposes the time signal into the frequency components, and then performs a process therefor when the modified decoded signal is inverse-converted and outputted to the rendering unit 2563 as a time signal in the output of the signal control unit 2560. The rendering unit 2563 outputs a signal obtained by inverse-converting the signal decomposed into the frequency components as an output signal.

Upon defining the frequency component of the output signal as $V_k(f)$, k=1, 2, ..., Q (Q is the number of the channels of the output signal), and expressing V(f) by the following equation, an operation of the rendering unit becomes V(f)=W(f)×X'(f).

$$V(f) = \begin{bmatrix} V_1(f) \\ V_2(f) \\ \vdots \\ V_Q(f) \end{bmatrix}$$ [Numerical equation 22]

Additionally, a method of converting the modified decoded signal into the output signal in the rendering unit 2563, and a specific example of the rendering information are disclosed in Non-patent document 10 (ISO/IEC 23003-1: 2007 Part 1 MPEG Surround).

A data stream format disclosed in the Non-patent document 10 may be used as rendering information being inputted into the rendering unit 2563 when the conversion method disclosed in the Non-patent document 10 is employed by the rendering unit 2563. Additionally, the rendering information may be inputted into the processing unit of the conversion disclosed in the Non-patent document 10 without being converted into the data stream format.

Next, a second configuration example will be explained. Upon making a reference to FIG. 43, the output signal generation unit 2550 is configured of a rendering information generation unit 2564, a component element information conversion unit 2565, and a rendering unit 2563.

The component element information conversion unit 2565 has the analysis information, the signal control information, and the component element rendering information as an input. The component element information conversion unit 2565 decodes the analysis information, and generates the analysis parameter. In addition, the component element information conversion unit 2565 converts the component element rendering information into the object rendering information by employing the analysis parameter and the signal control information, and outputs the object rendering information to the rendering information generation unit 2564.

Herein, the object rendering information is information indicative of a relation between the object signal and the output signal of the output signal generation unit 2550 for each frequency component. Specifically, upon defining the object rendering information as T(f), the following equation is yielded.

$$T(f)=U(f) \cdot A(f) \cdot B(f)$$ [Numerical equation 23]

Where, B(f), A(f), and U(f) were already defined in [Numerical equation 17], [Numerical equation 18], and [Numerical equation 21], respectively.

The rendering information generation unit 2564 has the object information and the object rendering information as an input. The rendering information generation unit 2564 decodes the object information, generates the object parameter, generates the rendering information from the object parameter and the object rendering information, and outputs the rendering information to the rendering unit 2563. Specifically, the following equation is yielded.

$$W(f)=T(f) \cdot C(f)$$ [Numerical equation 24]

Where, C(f), W(f), and T(f) were already defined in [Numerical equation 16], [Numerical equation 21], and [Numerical equation 23], respectively.

Additionally, the rendering information, which is information indicating a relation between the decoded signal and the output signal of the output signal generation unit 2550 for each frequency component, can be expressed by employing an energy differences, a time difference, a correlation between the signals, etc. One example of the rendering information is disclosed in the Non-patent document 10.

The rendering unit 2563 was already explained in the first configuration example by employing FIG. 42. In this case, an operation of the rendering unit behaves like V(f)=W(f)×X(f).

As explained above, the fifth embodiment of the present invention enables the receiving unit to control the input signal for each component element corresponding to each sound source of the input signal of each point based upon the analysis information in which the analysis information of each point has been mixed. Further, only a specific sound source can be controlled independently based upon the signal control information. Further, the localization of each sound source can be also controlled based upon the component element rendering information.

In addition, the receiving unit can curtail the arithmetic quantity relating to the calculation of the analysis information because the transmission unit calculates the analysis information.

Further, in this embodiment, the object signals corresponding to respective input signals are mixed, and a control is taken based upon the mixed object signal in the receiving side. This makes it possible to output the identical signal to each of a plurality of the receiving units. With this, the multipoint control unit can mix all of a plurality of the input signals, and hence, the encoding operation does not need to be performed in plural times because it is enough to perform the encoding operation only for one signal. Thus, the multipoint control unit can curtail the arithmetic quantity relating to the encoding.

A sixth embodiment of the present invention will be explained. This embodiment is characterized in controlling the objective sound and the background sound based upon the analysis information, the object information, the signal control information, and the component element rendering information with the input signal, in which the objective sound and the background sound coexist, targeted as a sound source.

Upon making a reference to FIG. 40, the multipoint control system of this embodiment includes conference terminals 2500, 2501, and 2502 being dispersively arranged in respective points, and a multipoint control unit (MCU) 2505 for controlling data exchange between the conference terminals. The multipoint control unit 2505 mixes the signals outputted from respective terminals, generates the mixed signal, and distributes the identical mixed signal to each terminal. While an example of connecting three points is shown in FIG. 40, the multipoint control unit 2505 can be configured to connect the points of which the number is arbitrary. Each of the terminals 2500, 2501, and 2502 can assume an identical configuration, so a configuration example of only the terminal 2500 is shown. Thus, hereinafter, the terminal 2500 is exemplified for explanation with regard to the terminal.

Firstly, a configuration example of the multipoint control unit 2505 is shown in FIG. 41. While this embodiment assumes a configuration similar to that of the fifth embodiment, it differs in an operation of the analysis information mixing unit 2516. An operation of the analysis information mixing unit 2516 in this embodiment is identical to that of the analysis information mixing unit 2114 shown in FIG. 7 explained in the second embodiment. Its detailed explanation is omitted.

Next, a configuration example of the terminal 2500 is shown in FIG. 40. While this embodiment assumes a configuration similar to that of the fifth embodiment, it differs in operations of the signal analysis unit 101 and the output signal generation unit 2550. Thus, hereinafter, the signal analysis unit 101 and the output signal generation unit 2550 will be explained in details.

A first example of this embodiment relates to the case that the analysis information is a suppression coefficient. Upon making a reference to FIG. 40, the signal analysis unit 101 calculates the suppression coefficient as analysis information. Responding to this, the multipoint control unit 2505 mixes the suppression coefficients as explained in the second embodiment, and the output signal generation unit 2550 controls the decoded signal by employing the suppression coefficient based upon the signal control information, the component element rendering information, and the object information. The configuration of the signal analysis unit 101 for calculating the suppression coefficient as analysis information was explained in details in the first example of the second embodiment, so its explanation is omitted. Hereinafter, the output signal generation unit 2550 will be explained in details.

Figure 43:
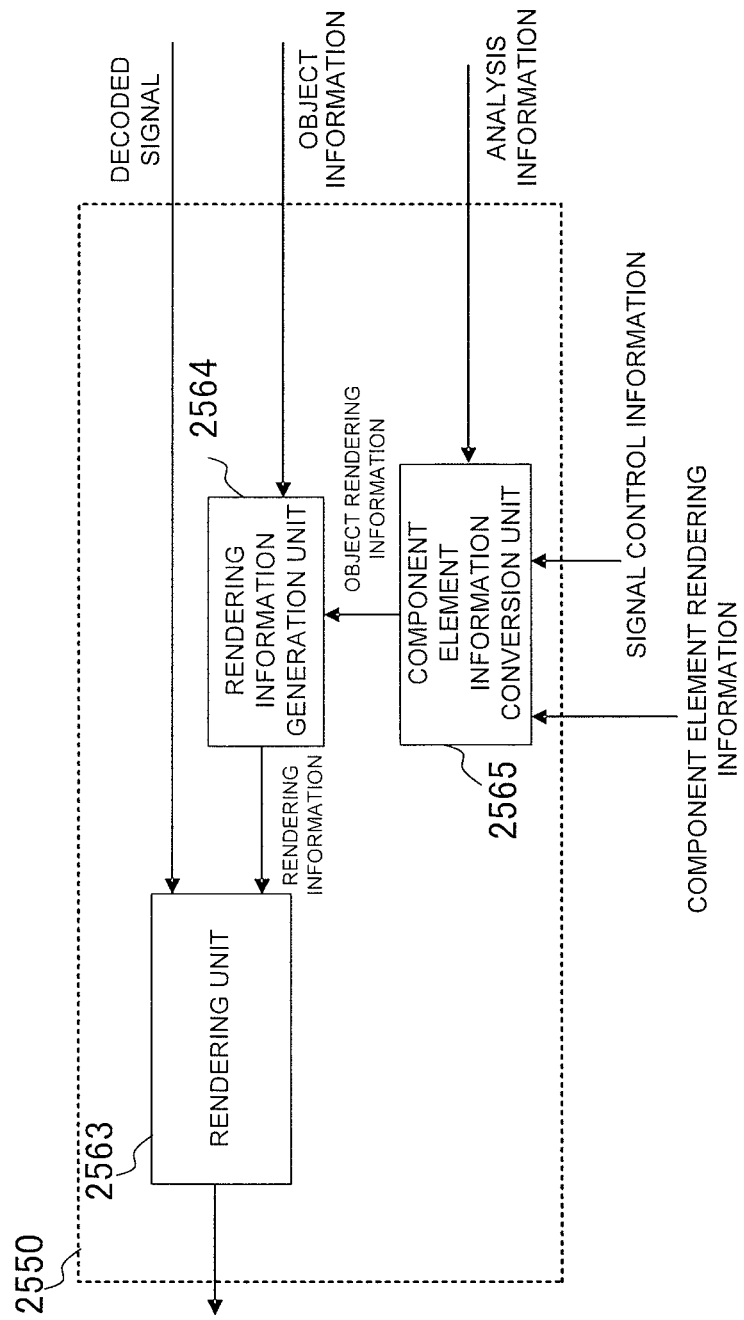
FIG. 43 shows a second configuration example of the output signal generation unit 2550.

While a configuration of the output signal generation unit 2550 of FIG. 40 for controlling the objective sound and the background sound by employing the suppression coefficient is represented in FIG. 43 similarly to case of the second configuration example of the output signal generation unit 2550 in the fifth embodiment, the former differs from the latter in a configuration of a component element information conversion unit 2565. Thereupon, hereinafter, the component element information conversion unit 2565 will be explained.

Figure 44:
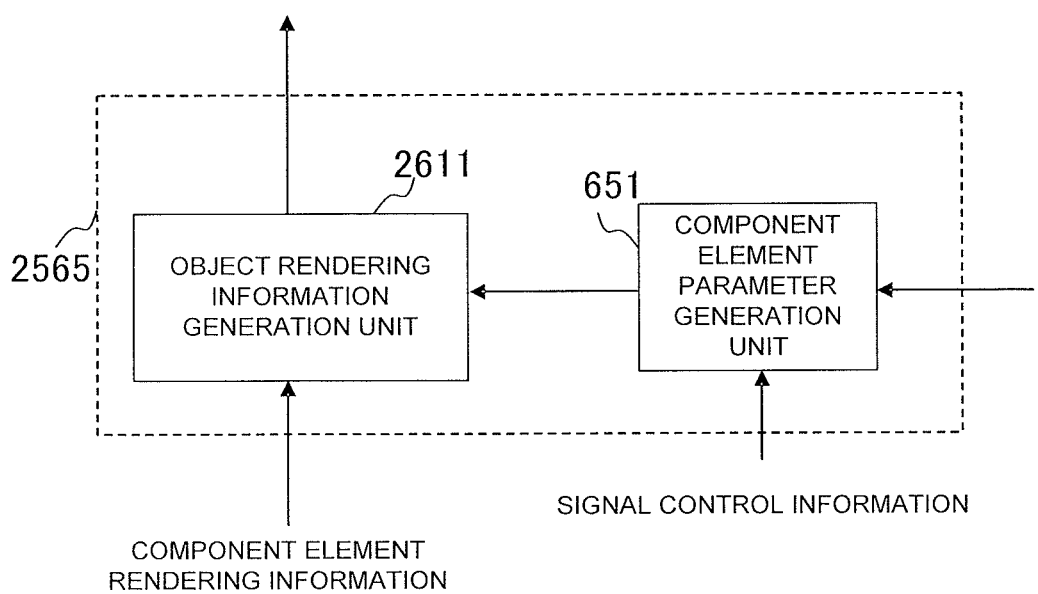
FIG. 44 shows a configuration example of a component element information conversion unit 2565.

A configuration example of the component element information conversion unit 2565 is shown in FIG. 44. The component element information conversion unit 2565 is configured of a component element parameter generation unit 651 and an object rendering information generation unit 2611. The component element parameter generation unit 651 calculates the suppression coefficient from the analysis information, calculates the component element parameter by employing the calculated suppression coefficient and the signal control information, and outputs it to the object rendering information generation unit 2611.

As a specific example of the above-mentioned conversion, upon defining the suppression coefficient of an object signal i of a frequency band f as $g_{ih}(f)$, i=1, 2, ..., L, h=1, 2, ..., K (L is the number of the objects, and K is the number of the channels of the object signal), and the number of the component element of the object signal i as $M_i=2$, the analysis parameter B(f) of [Numerical equation 17] can be expressed by the following equation.

$$B(f) = \begin{bmatrix} B_1(f) & z_{M_1K} & \cdots & z_{M_1K} \\ z_{M_2K} & B_2(f) & \cdots & z_{M_2K} \\ \vdots & \vdots & \ddots & \vdots \\ z_{M_NK} & z_{M_NK} & \cdots & B_L(f) \end{bmatrix},$$

[Numerical equation 25]

$$B_i(f) = \begin{bmatrix} g_{i1}(f) & \cdots & g_{iK}(f) \\ 1 - g_{i1}(f) & \cdots & 1 - g_{iK}(f) \end{bmatrix},$$

$$i = 1, 2, \ldots, L$$

The signal control information A(f) of [Numerical equation 18], upon defining the signal control information for controlling the objective sound of the object signal i as $A_{main}^i(f)$, and the signal control information for controlling the background sound as $A_{sub}^i(f)$, can be expressed by the following equation.

[Numerical equation 26]

$$A(f) = \begin{bmatrix} A_{main}^1(f) & 0 & 0 & \cdots & 0 & 0 & 0 \\ 0 & A_{sub}^1(f) & 0 & \cdots & 0 & 0 & 0 \\ 0 & 0 & A_{main}^2(f) & \cdots & 0 & 0 & 0 \\ \vdots & \vdots & \vdots & \ddots & \vdots & \vdots & \vdots \\ 0 & 0 & 0 & \cdots & A_{main}^{L-1}(f) & 0 & 0 \\ 0 & 0 & 0 & \cdots & 0 & A_{main}^L(f) & 0 \\ 0 & 0 & 0 & \cdots & 0 & 0 & A_{sub}^L(f) \end{bmatrix}$$

At this time, a component element parameter H(f) can be expressed with the following equation.

$$H(f) = A(f) \cdot B(f)$$  [Numerical equation 27]

When the suppression coefficients have been mixed in the multipoint control unit 2505, the suppression coefficient common to the mixed object signals may be employed.

The object rendering information generation unit 2611 outputs the object rendering information indicative of a relation between the object signal and the output signal based upon the component element parameter and the component element rendering information. As a specific example of the above-mentioned conversion, the object rendering information T(f) can be defined as T(f)=U(f)×H(f) by employing U(f) of [Numerical equation 21].

Additionally, as another configuration example of the component element information conversion unit 2566, the component element parameter generation unit 651 and the object rendering information generation unit 2611 in FIG. 44 can be also integrated. In this case, the suppression coefficient is calculated by decoding the analysis information, the object rendering information is calculated from the calculated suppression coefficient, the signal control information, and the component element rendering information, and the object rendering information is outputted to the rendering information generation unit 2564. That is, the object rendering information T(f) can be defined as T(f)=U(f)×A(f)×B(f).

A second example of this embodiment relates to the case that the analysis information is a signal versus background sound ratio. Upon making a reference to FIG. 40, the signal analysis unit 101 outputs the signal versus background sound ratio as analysis information. Responding to this, the multipoint control unit 2505 mixes the signal versus background sound ratios, and the output signal generation unit 2550 controls the decoded signal based upon the signal versus background sound ratio, the object information, the signal control information, and the component element rendering information. The signal analysis unit 101 in the case of employing the signal versus background sound ratio as analysis information was explained in the second example of the second embodiment, so the output signal generation unit 2550 will be explained in details below.

A configuration of the output signal generation unit 2550 of FIG. 40 for controlling the objective sound and the background sound by employing the signal versus background sound ratio is represented in FIG. 43 and FIG. 44 similarly to case of the first example. Upon comparing this example with first example, it differs in an operation of the component element parameter generation unit 651 of FIG. 44. Thus, hereinafter, the component element parameter generation unit 651 will be explained.

The component element parameter generation unit 651 calculates the signal versus background sound ratio by decoding the analysis information, calculates the component element parameter based upon the signal control information from the signal versus background sound ratio, and outputs it to the object rendering information generation unit 2611. For example, after the signal versus background sound ratio is converted into the suppression coefficient as explained in the second embodiment, the component element parameter can be calculated based upon the suppression coefficient and the signal control information by employing [Numerical equation 25], [Numerical equation 26], and [Numerical equation 27] as explained in the first embodiment. Further, as explained in the fourth embodiment, the method of, after manipulating the signal versus background sound ratio based upon the signal control information, and converting the manipulated signal versus background sound ratio into the suppression coefficient, calculating the component element parameter may be employed as another method. In this case, upon defining the converted suppression coefficient of the object signal i as $g'_{ih}(f)$, the analysis parameter B'(f) behaves like the following equation, and the component element parameter H(f) becomes B'(f).

$$B'(f) = \begin{bmatrix} B'_1(f) & z_{M_1 K} & \cdots & z_{M_1 K} \\ z_{M_2 K} & B'_2(f) & \cdots & z_{M_2 K} \\ \vdots & \vdots & \ddots & \vdots \\ z_{M_N K} & z_{M_N K} & \cdots & B'_L(f) \end{bmatrix},$$ [Numerical equation 28]

$$B'_i(f) = \begin{bmatrix} g'_{i1}(f) & \cdots & g'_{iK}(f) \\ 1 - g'_{i1}(f) & \cdots & 1 - g'_{iK}(f) \end{bmatrix},$$

$$i = 1, 2, \ldots, L$$

As s another configuration example of the component element information conversion unit 2565 of FIG. 43, the component element parameter generation unit 651 and the object rendering information generation unit 2611 in FIG. 44 can be also integrated. In this case, the signal versus background sound ratio is calculated by decoding the analysis information, the object rendering information is calculated from the calculated signal versus background sound ratio, the signal control information, and the component element rendering information, and the object rendering information is outputted to the rendering information generation unit 2564. As a specific example, for example, after the signal versus background sound ratio is converted into the suppression coefficient as explained in the second embodiment, the object rendering information is calculated from the suppression coefficient, the signal control information, and the component element rendering information, and the object rendering information is outputted to the rendering information generation unit 2564 as explained in the first embodiment. That is, the object rendering information T(f) can be defined as T(f)=U(f)×A(f)×B(f) by employing the component element rendering information defined in [Numerical equation 21], the analysis parameter that can be calculated from the suppression coefficient defined in [Numerical equation 25], and the signal control information defined in [Numerical equation 26]. Further, as another method, as explained in the fourth embodiment, after the signal versus background sound ratio is manipulated based upon the signal control information, and the manipulated signal versus background sound ratio is converted into the suppression coefficient, the object rendering information may be calculated from the converted suppression coefficient and the component element rendering information. In this case, upon defining the converted suppression coefficient of the object signal i as $g'_{ih}(f)$, the object rendering information T(f) behaves like the following equation by employing B'(f) of [Numerical equation 28].

$$T(f)=U(f) \cdot B'(f)$$ [Numerical equation 29]

Where, U(f) was already defined in [Numerical equation 21].

A third example of this embodiment relates to the case that the analysis information is background sound. Upon making a reference to FIG. 40, the signal analysis unit 101 calculates the background sound as analysis information. Responding to this, the multipoint control unit 2505 mixes the background sound, and the output signal generation unit 2550 controls the decoded signal based upon the background sound, the object information, the signal control information, and the component element rendering information. The signal analysis unit 101 in the case of employing the background sound as analysis information was explained in the third example of the second embodiment, so its explanation is omitted. Thus, hereinafter, an operation of the output signal generation unit 2550 will be explained in details.

Figure 45:
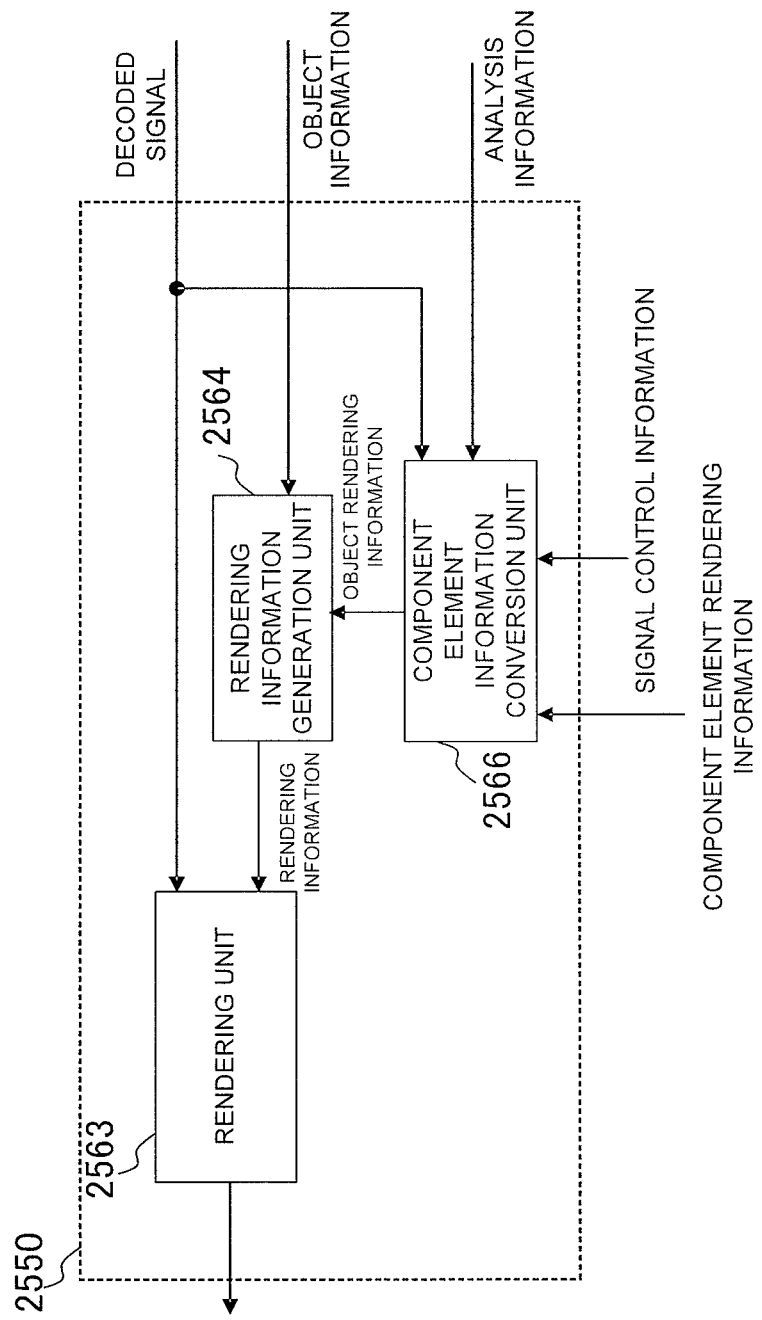
FIG. 45 shows a third configuration example of the output signal generation unit 2550.

A configuration example of the output signal generation unit 2550 is shown in FIG. 45. The output signal generation unit 2550 shown in FIG. 45, as compared with the output signal generation unit 2550 of the first example shown in FIG. 43, differs in a point that the component element information conversion unit 2565 is replaced with a component element information conversion unit 2566. Hereinafter, the component element information conversion unit 2566 will be explained.

Upon making a reference to FIG. 45, the component element information conversion unit 2566 has the decoded signal, the analysis information, the signal control information, and the component element rendering information as an input. The component element information conversion unit 2566 generates the object rendering information indicative of a relation between the object signal being included in the decoded signal and the output signal for each frequency component based upon these, and outputs it to the rendering information generation unit 2564.

Figure 46:
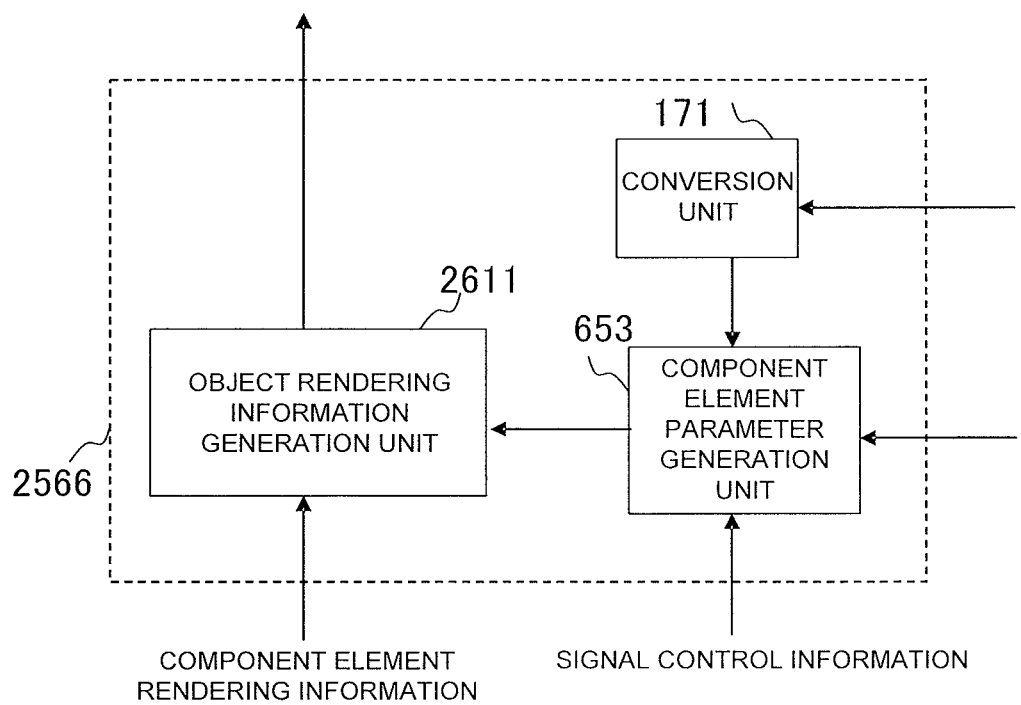
FIG. 46 shows a configuration example of a component element information conversion unit 2566.

A configuration example of the component element information conversion unit 2566 is shown in FIG. 46. The component element information conversion unit 2566 is configured of a conversion unit 171, a component element parameter generation unit 653, and an object rendering information generation unit 2611. The conversion unit 171, into which the decoded signal is inputted, generates the second converted signal by decomposing the decoded signal into the respective frequency components, and outputs the second converted signal to the component element parameter generation unit 653.

The component element parameter generation unit 653 has the second converted signal, the analysis information, and the signal control information as an input. The component element parameter generation unit 653 calculates the background sound by decoding the analysis information, generates the component element parameter based upon the calculated background sound, the second converted signal, and the signal control information, and outputs it to the object rendering information generation unit 2611.

Hereinafter, a specific example of the method of calculating the component element parameter is shown. In a first method, the suppression coefficient is calculated from the background sound and the second converted signal as explained in the third example of the second embodiment. In addition, the component element parameter is calculated based upon the suppression coefficient and the signal control information by employing [Numerical equation 25], [Numerical equation 26], and [Numerical equation 27]. In a second method, the suppression coefficient is calculated from the background sound, the signal control information, and the second converted signal with the method explained in the fourth example and the fifth example of the fourth embodiment. The analysis parameter B'(f) is calculated by employing [Numerical equation 28] for the suppression coefficient calculated with the foregoing methods, and the component element parameter H(f) is defined as B'(f).

An operation of the object rendering information generation unit 2611 was already explained in the first example of this embodiment.

Additionally, the component element parameter generation unit 653 and the object rendering information generation unit 2611 of FIG. 46 can be also integrated as another configuration example of the component element information conversion unit 2566. In this case, the object rendering information is calculated from the second converted signal decomposed into respective frequency components, the background sound in which the analysis information has been decoded, the signal control information, and the component element rendering information, and the object rendering information is outputted to the rendering information generation unit 2564.

Hereinafter, a specific example of the method of calculating the object rendering information is shown. In a first method, the suppression coefficient is calculated from the background sound by employing the decoded signal as explained in the third example of the second embodiment. In addition, as explained in the first example, the object rendering information is calculated from the suppression coefficient, the signal control information, and the component element parameter. That is, the object rendering information T(f) can be defines as T(f)=U(f)×A(f)×B(f) by employing the component element rendering information defined in [Numerical equation 21], and the analysis parameter that can be calculated from the suppression coefficient defined in [Numerical equation 25], and the signal control information defined in [Numerical equation 26]. In a second method, the suppression coefficient is calculated from the background sound, the signal control information, and the second converted signal with the methods explained in the fourth example and the fifth example of the fourth embodiment. By employing the suppression coefficient calculated with the foregoing methods, the object rendering information may be calculated from B'(f) of [Numerical equation 28] and U(f) of [Numerical equation 21] by employing [Numerical equation 29] as explained in the second example of this embodiment.

As explained above, the sixth embodiment of the present invention enables the receiving unit to control the input signal, which is configured of the objective sound and the background sound of each point, independently for each objective sound and for each background sound of each point based upon the analysis information in which the analysis information of each point has been mixed. Further, specific objective sound and background sound can be also controlled independently based upon the signal control information. Further, the localization of each objective sound and background sound can be controlled by employing the component element rendering information.

In addition, the receiving unit can curtail the arithmetic quantity relating to the calculation of the analysis information because the transmission unit calculates the analysis information.

A seventh embodiment of the present invention will be explained. This embodiment is characterized in that the receiving side terminal controls the input signal for each component element corresponding to each sound source of the input signal of each point based upon the analysis information, the object information, the signal control information, and the object rendering information.

Figure 47:
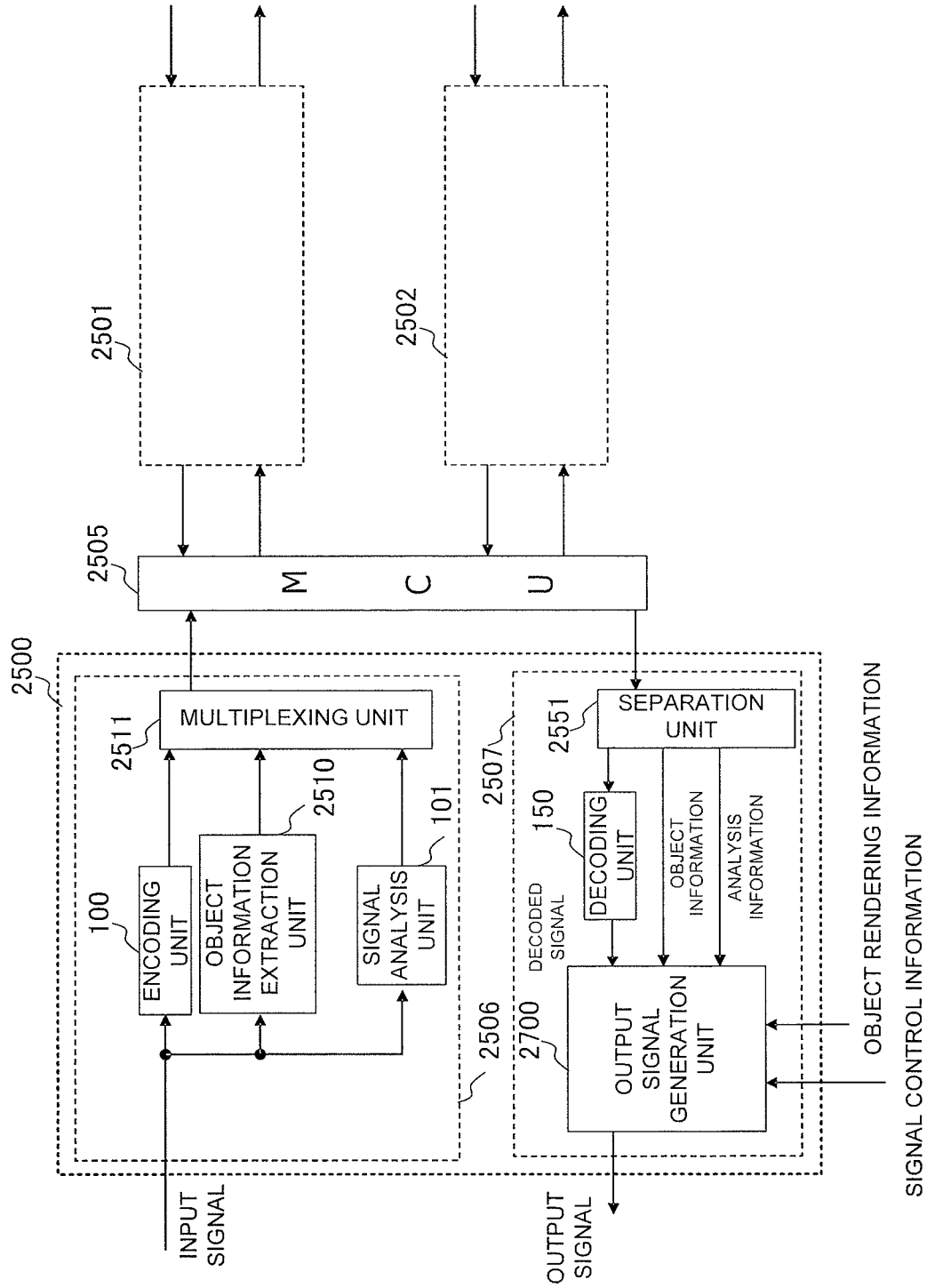
FIG. 47 is a block diagram illustrating a seventh embodiment of the present invention.

A configuration in the seventh embodiment of the present invention is shown in FIG. 47. FIG. 47, as compared with FIG. 40 indicative of the fifth embodiment, differs in a point that the output signal generation unit 2550 of the receiving unit 2507 is replaced with an output signal generation unit 2700, and a point that not the component element rendering information but the object rendering information is inputted into the output signal generation unit 2700. Thus, hereinafter, a first configuration example and a second configuration example of the output signal generation unit 2700 will be explained.

Figure 48:
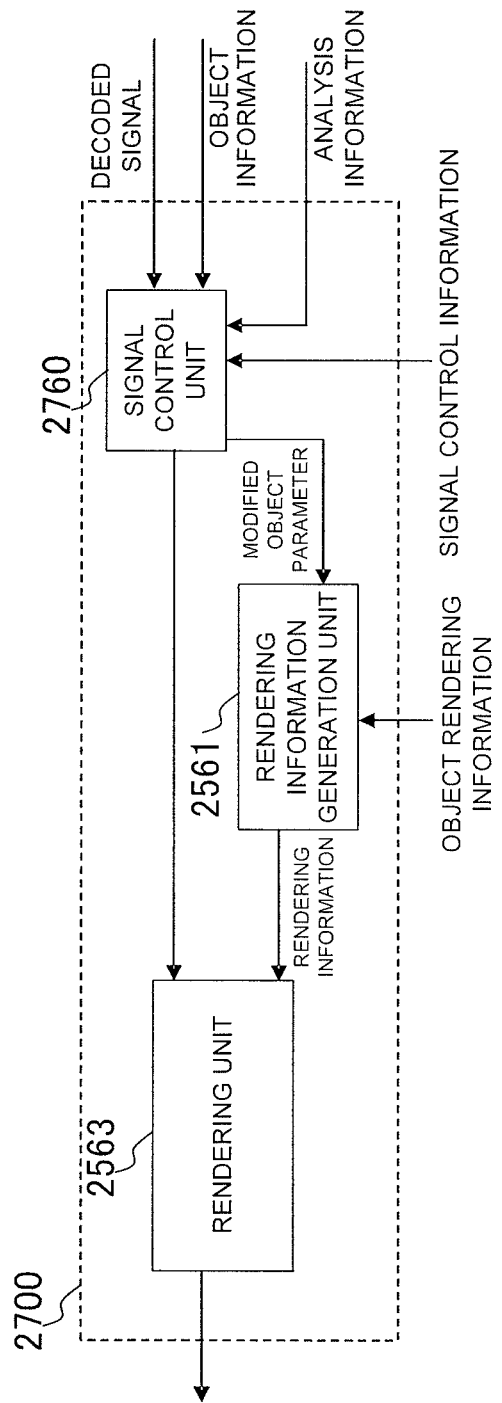
FIG. 48 shows a configuration example of an output signal generation unit 2700.

Upon making a reference to FIG. 48, a first configuration example of the output signal generation unit 2700 is configured of a signal control unit 2760, a rendering information generation unit 2561, and a rendering unit 2563.

The signal control unit 2760 has the decoded signal, the object information, the analysis information, and the signal control information as an input. The signal control unit 2760 generates the object parameter and the analysis parameter by decoding the object information and the analysis information, respectively. Next, the signal control unit 2760 decomposes the decoded signal into the object signals (before-mixture signals) by employing the object parameter, and further, decomposes the object signal into the configuration components by employing the analysis parameter. Thereafter, the signal control unit 2760 generates the modified component element by modifying the component element based upon the signal control information, re-configures the modified decoded signal (after-mixture signal, namely, the signal obtained by modifying the decoded signal based upon the signal control information) from the modified component element, and outputs the modified decoded signal to the rendering unit 2563. Further, the signal control unit 2760 generates the modified object parameter indicative of a relation between the modified decoded signal and the modified object signal (the signal obtained by modifying the before-mixture signal based upon the signal control information) for frequency component, and outputs the modified object parameter to the rendering information generation unit 2561.

Additionally, as an another operation of the signal control unit 2760, the signal control unit 2760 may convert the decoded signal into the modified decoded signal by employing the object parameter, the analysis parameter, and the signal control information without generating the modified component element. Also in this case, the signal control unit 2760 generates the modified object parameter indicative of a relation between the modified decoded signal and the modified object signal for each frequency component at the moment of converting the decoded signal into the modified decoded signal, and outputs the modified object parameter to the rendering information generation unit 2561.

A method of calculating the modified object parameter is shown. As shown in the fifth embodiment, a relation of [Numerical equation 11] to [Numerical equation 15] holds. At this time, when [Numerical equation 16] to [Numerical equation 19] is employed as a specific example, the matrix for converting the decoded signal into the modified decoded signal can be expressed as $D(f) \times A(f) \times B(f) \times C(f)$. where, $D(f)$ is a P-row and M-column matrix, and when an inverse matrix of $B(f) \times C(f)$ is employed, the modified object parameter can be expressed by $C(f)$, that is, by the object parameter.

The rendering information generation unit 2561 has the modified object parameter outputted from the signal control unit 2760, and object rendering information inputted via the input terminal as an input. The rendering information generation unit 2561 converts the object rendering information into the rendering information by employing the modified object parameter, and outputs the rendering information to the rendering unit 2563. A specific operation was already explained by employing [Numerical equation 24].

The rendering unit 2563 generates the output signal from the modified decoded signal outputted from the signal control unit 2760 based upon the rendering information outputted from the rendering information generation unit 2561, and outputs the output signal. The above operation was already explained in the fifth embodiment by employing FIG. 42, so its detailed explanation is omitted.

Next, a second configuration example of the output signal generation unit 2700 will be explained. Upon making a reference to FIG. 49, the output signal generation unit 2700 is configured of a rendering information generation unit 2564, an object rendering information modification unit 2770, and a rendering unit 2563.

The object rendering information modification unit 2770 has the analysis information, signal control information, and the object rendering information as an input. The object rendering information modification unit 2770 generates the analysis parameter by decoding the analysis information, modifies the object rendering information by employing the analysis parameter and the signal control information, and outputs the modified object rendering information to the rendering information generation unit 2564. Specifically, upon defining the modified object rendering information as T'(f), the following equation is yielded.

$$T'(f) = T(f) \cdot B^{-1}(f) \cdot A(f) \cdot B(f) \qquad \text{[Numerical equation 30]}$$

Where, B(f) and A(f) were already defined in [Numerical equation 17] and [Numerical equation 18], respectively.

The rendering information generation unit 2564 has the object information and the modified object rendering information as an input. The rendering information generation unit 2564 generates the rendering information based upon the object information and the modified object rendering information, and outputs it to the rendering unit 2563. The above operation was already explained in the fifth embodiment by employing FIG. 43, so its detailed explanation is omitted.

The rendering unit 2563 has the decoded signal and the rendering information as an input. The rendering unit 2563 generates the output signal from the decoded signal based upon the rendering information, and outputs the output signal. The above operation was already explained in the fifth embodiment by employing FIG. 43, so its detailed explanation is omitted.

As explained above, the seventh embodiment of the present invention enables the receiving unit to control the input signal for each component element corresponding to each sound source of the input signal of each point based upon the analysis information in which the analysis information of each point has been mixed. Further, only a specific sound source can be also controlled independently based upon the signal control information. Further, the localization of each object signal can be also controlled by employing the object rendering information.

In addition, the receiving unit can curtail the arithmetic quantity relating to the calculation of the analysis information because the transmission unit calculates the analysis information.

An eighth embodiment of the present invention will be explained. This embodiment is characterized in controlling the objective sound and the background sound based upon the analysis information, the object information, the signal control information, and the object rendering information with the input signal, in which the objective sound and the background sound coexist, targeted as a sound source.

A configuration of the multipoint control system in this embodiment is represented in FIG. 47 similarly to the case of the seventh embodiment. The multipoint control system includes conference terminals 2500, 2501, and 2502 being dispersively arranged in respective points, and a multipoint control unit (MCU) 2505 for controlling data exchange between the conference terminals. Each of the terminals 2500, 2501, and 2502 can assume an identical configuration, so a configuration example of only the terminal 2500 is shown. Thus, hereinafter, the terminal 2500 is exemplified for explanation with regard to the terminal.

The multipoint control unit 2505 was already explained in the sixth embodiment by employing FIG. 41, so its explanation is omitted.

Next, the terminal 2500 will be explained. A configuration of the terminal 2500 in this embodiment is shown in FIG. 47. While this embodiment assumes a configuration similar to that of the seventh embodiment, it differs in operations of the signal analysis unit 101 and the output signal generation unit 2700. Thus, hereinafter, the signal analysis unit 101 and the output signal generation unit 2700 will be explained in details.

A first example of this embodiment relates to the case that the analysis information is a suppression coefficient. Upon making a reference to FIG. 47, the signal analysis unit 101 outputs the suppression coefficient as analysis information. Responding to this, the multipoint control unit 2505 mixes the suppression coefficients, and the output signal generation unit 2700 controls the decoded signal by employing the signal control information, the object rendering information, the object information, and the suppression coefficient. An operation of the signal analysis unit 101 in the case of employing the suppression coefficient as analysis information was already explained in the first example of the second embodiment. Thus, hereinafter, the output signal generation unit 2700 will be explained in details.

Figure 49:
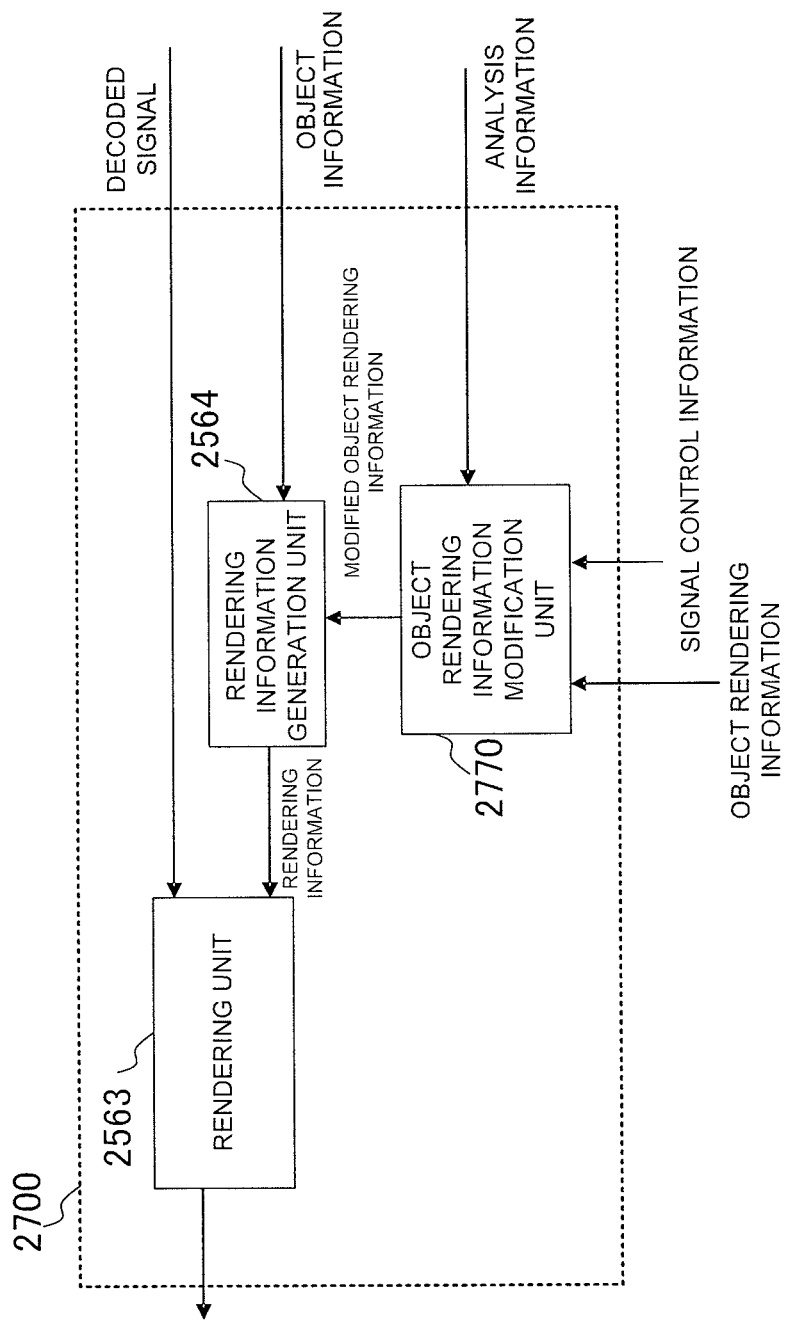
FIG. 49 shows a second configuration example of the output signal generation unit 2700.

A configuration of the output signal generation unit 2700 is shown in FIG. 49. While this configuration is similar to the second configuration example of the output signal generation unit 2700 in the seventh embodiment, it differs in an operation of the object rendering information modification unit 2770. Thus, hereinafter, the object rendering information modification unit 2770 will be explained in details.

Figure 50:
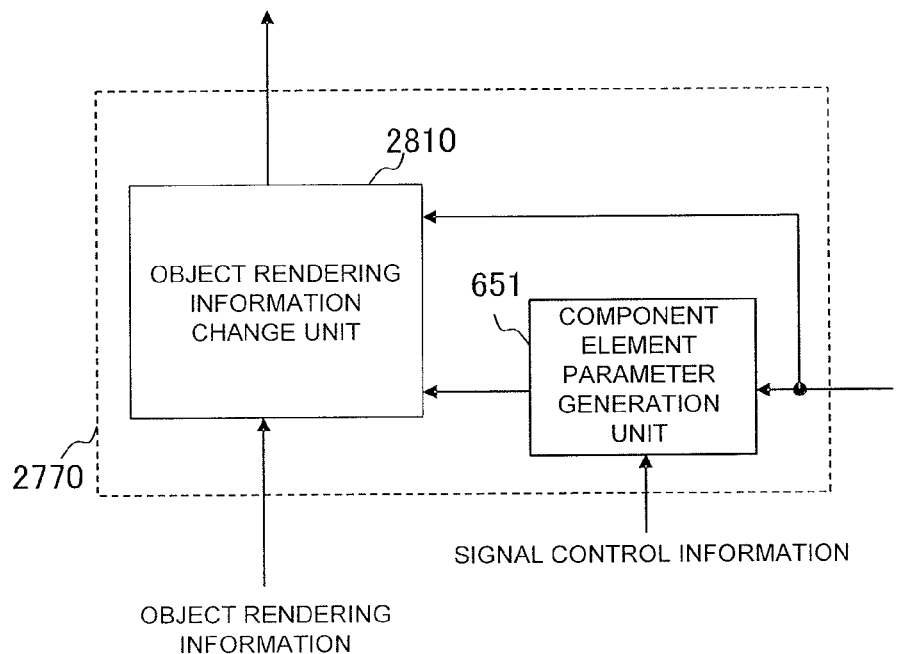
FIG. 50 shows a configuration example of an object rendering information modification unit 2770.

A configuration example of the object rendering information modification unit 2770 is shown in FIG. 50. The object rendering information modification unit 2770 is configured of a component element parameter generation unit 651 and an object rendering information change unit 2810.

The component element parameter generation unit 651, into which the analysis information and the signal control information are inputted, outputs the component element parameter. The detailed operation was already explained in the first example of the sixth embodiment, so its explanation is omitted.

The object rendering information change unit 2810 has the analysis information and the component element parameter as an input. The object rendering information change unit 2810 generates the suppression coefficient by decoding the analysis information, and modifies the object rendering information based upon the suppression coefficient and the component element parameter.

Specifically, upon defining the object rendering information as T(f), and the modified object rendering information as T'(f), the following equation is yielded.

$$T'(f)=T(f) \cdot B^{-1}(f) \cdot H(f)$$ [Numerical equation 31]

Where, B(f) and H(f) were already defined in [Numerical equation 25] and [Numerical equation 27], respectively.

Additionally, as another configuration example of the object rendering information modification unit 2770 of FIG. 49, the component element parameter generation unit 651 and the object rendering information change unit 2810 in FIG. 50 can be also integrated. In this case, the suppression coefficient is calculated by decoding the analysis information, the object rendering information is modified from the calculated suppression coefficient and the signal control information, and the modified object rendering information is outputted to the rendering information generation unit 2564.

Specifically, the modified object rendering information T'(f) can be defined as the following equation.

$$T'(f)=T(f) \cdot B^{-1}(f) \cdot A(f) \cdot B(f)$$ [Numerical equation 32]

Where, A(f) and B(f) were already defined in [Numerical equation 26] and [Numerical equation 25], respectively.

A second example of this embodiment relates to the case that the analysis information is a signal versus background sound ratio. In the second example, upon making a reference to FIG. 47, the signal analysis unit 101 outputs the signal versus background sound ratio as analysis information. Responding to this, the multipoint control unit 2505 mixes the signal versus background sound ratios, and the output signal generation unit 2700 controls the decoded signal based upon the signal versus background sound ratio, the object information, the signal control information, and the object rendering information. An operation of the signal analysis unit 101 in the case of employing the signal versus background sound ratio as analysis information was already explained in the second embodiment.

A configuration example of the output signal generation unit 2700 is shown in FIG. 49 and FIG. 50. Upon comparing this example with the first example, the former differs from the latter in configurations of the component element parameter generation unit 651 and the object rendering information change unit 2810 of FIG. 50.

The component element parameter generation unit 651 was already explained in the second example of the sixth embodiment, so its explanation is omitted.

The object rendering information change unit 2810 has the analysis information, the component element parameter, and the object rendering information as an input. The object rendering information change unit 2810 generates the signal versus background sound ratio by decoding the analysis information, modifies the object rendering information from the signal versus background sound ratio and the component element parameter, and outputs the modified object rendering information.

An example of the method of calculating the modified object rendering information will be explained. The suppression coefficient is calculated from the signal versus background sound ratio as explained in the second example of the second embodiment. In addition, the modified object rendering information is calculated based upon the object rendering information, the suppression coefficient, and the component element parameter by applying [Numerical equation 31] as explained in the first example of this embodiment.

Additionally, as another configuration example of the object rendering information modification unit 2770, the component element parameter generation unit 651 and the object rendering information change unit 2810 in FIG. 50 can be also integrated. In this case, the signal versus background sound ratio is calculated by decoding the analysis information, the modified object rendering information is calculated from the calculated signal versus background sound ratio, the signal control information, and the object rendering information, and the modified object rendering information is outputted to the rendering information generation unit 2564.

An example of the method of calculating the modified object rendering information in that case will be explained. The suppression coefficient is calculated from the signal versus background sound ratio as explained in the second example of the second embodiment. In addition, the modified object rendering information is calculated based upon the suppression coefficient, the signal control information, and the object rendering information by applying [Numerical equation 32] as explained in the first example of this embodiment.

A third example of this embodiment relates to the case that the analysis information is background sound. In the third example, upon making a reference to FIG. 47, the signal analysis unit 101 outputs the background sound as analysis information. Responding to this, the multipoint control unit 2505 mixes the signal versus background sound ratios, and the output signal generation unit 2700 controls the decoded signal based upon the background sound, the object information, the signal control information, and the object rendering information. An operation of the signal analysis unit 101 in the case of employing the background sound as analysis information was already explained in the third example of the second embodiment.

Figure 51:
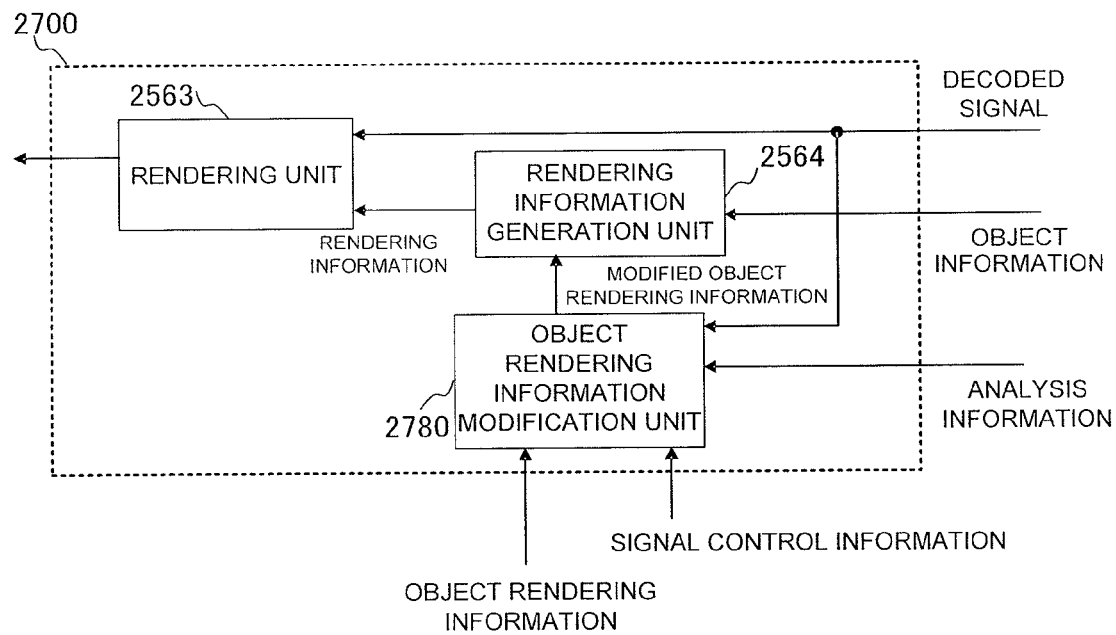
FIG. 51 shows a third configuration example of the output signal generation unit 2700.

A configuration example of the output signal generation unit 2700 is shown in FIG. 51. This configuration example, as compared with the first example of FIG. 49, differs in a point that the object rendering information modification unit 2770 is replaced with an object rendering information modification unit 2780. Thus, hereinafter, the object rendering information modification unit 2780 will be explained.

The object rendering information modification unit 2780 has the analysis information, the decoded signal, the signal control information, and the object rendering information as an input. The object rendering information modification unit 2780 modifies the object rendering information by employing the analysis information, the decoded signal, and the signal control information, and outputs the modified object rendering information to the rendering information generation unit 2564.

Figure 52:
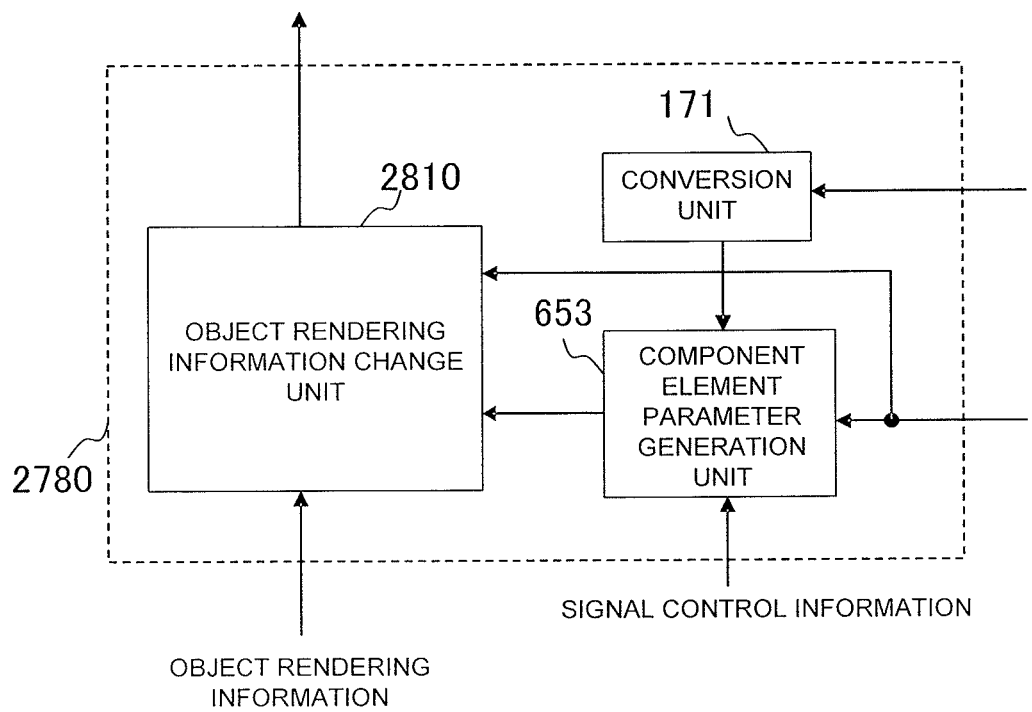
FIG. 52 shows a configuration example of an object rendering information modification unit 2780.

A configuration example of the object rendering information modification unit 2780 is shown in FIG. 52. The object rendering information modification unit 2780 is configured of a conversion unit 171, a component element parameter generation unit 653 and an object rendering information change unit 2810. The conversion unit 171 generates the second converted signal by decomposing the decoded signal into respective frequency components, and outputs the second converted signal to the component element parameter generation unit 653.

The component element parameter generation unit 653, into which the second converted signal, the signal control information, and the analysis information are inputted, outputs the component element parameter to the object rendering information change unit 2810. The detailed operation thereof was already explained in the third example of the sixth embodiment by employing FIG. 46, its explanation is omitted.

The object rendering information change unit 2810 calculates the background sound from the analysis information, modifies the object rendering information from the background sound and the component element parameter, and outputs the modified object rendering information to the rendering information generation unit 2564.

An example of the method of calculating the modified object rendering information will be explained. The suppression coefficient is calculated from the background sound as explained in the third example of the second embodiment. In addition, the modified object rendering information is calculated from the suppression coefficient, the component element parameter, and the object rendering information by applying [Numerical equation 31] as explained in the first example of this embodiment.

Additionally, as another configuration example of the object rendering information modification unit 2780, the component element parameter generation unit 653 and the object rendering information change unit 2810 in FIG. 52 can be also integrated. In this case, the modified object rendering information is calculated from the second converted signal, the background sound in which the analysis information has been decoded, the signal control information, and the object rendering information, and the modified object rendering information is outputted to the rendering information generation unit 2564.

An example of the method of calculating the modified object rendering information at this time will be explained. The suppression coefficient is calculated from the background sound as explained in the third example of the second embodiment. In addition, the modified object rendering information is calculated from the suppression coefficient, the signal control information, and the object rendering information by applying [Numerical equation 32] as explained in the first example of this embodiment.

As explained above, the eighth embodiment of the present invention enables the receiving unit to control the input signal, which is configured of the subjective sound and the background sound of each point, independently for each objective sound and for each background sound of each point based upon the analysis information in which the analysis information of each point has been mixed. Further, specific subjective sound and background sound can be also controlled independently based upon the signal control information. Further, the localization of each object signal can be also controlled by employing the object rendering information.

In addition, the receiving unit can curtail the arithmetic quantity relating to the calculation of the analysis information because the transmission unit calculates the analysis information.

A ninth embodiment of the present invention will be explained. This embodiment is characterized in that the receiving side terminal controls the input signal for each component element corresponding to each sound source of the input signal of each point based upon the analysis information, the object information, and the component element rendering information.

Figure 53:
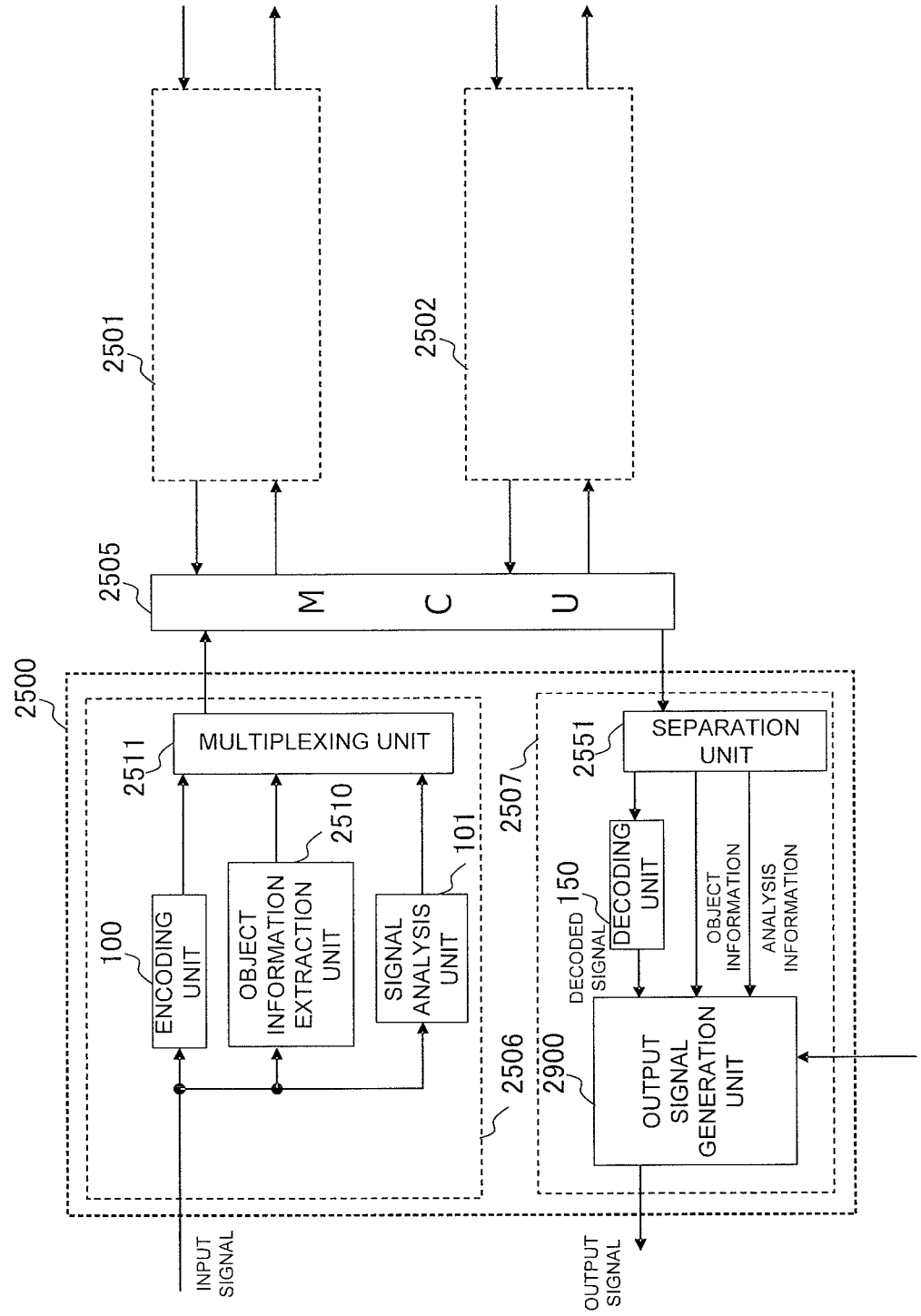
FIG. 53 is a block diagram illustrating a ninth embodiment of the present invention.

Upon making a reference to FIG. 53, this embodiment, as compared with the fifth embodiment of FIG. 40, differs in a point that the signal control information being inputted into the output signal generation unit 2900 of the terminal 2500 gets mixed with the component element rendering information, and responding to this, the output signal generation unit 2550 of the receiving unit 2507 is replaced with an output signal generation unit 2900. Thus, hereinafter, the output signal generation unit 2900 will be explained.

Figure 54:
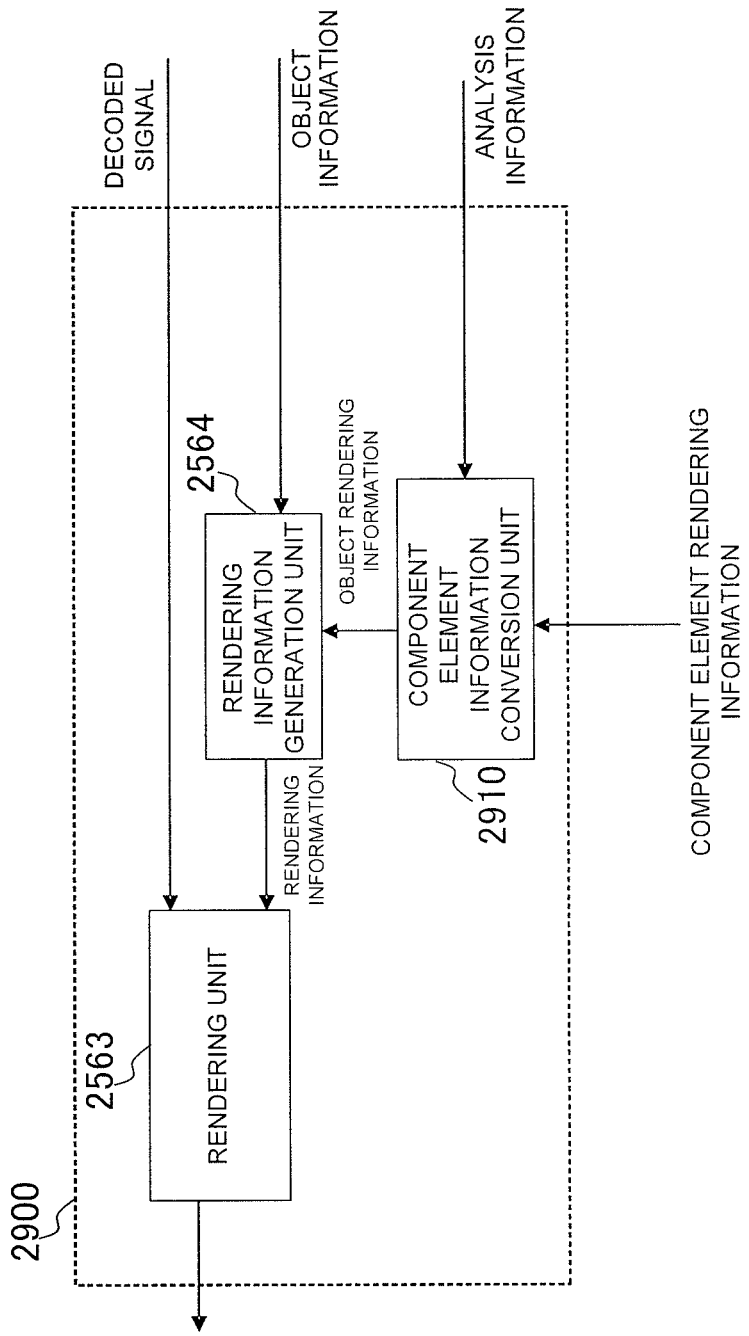
FIG. 54 shows a configuration example of an output signal generation unit 2900.

Upon making a reference to FIG. 54, the output signal generation unit 2900 of this embodiment is configured of a rendering information generation unit 2564, a component element information conversion unit 2910, and a rendering unit 2563.

The component element information conversion unit 2910 has the analysis information and the component element rendering information as an input. The component element information conversion unit 2910 generates the analysis parameter by decoding the analysis information, converts the component element rendering information into the object rendering information by employing the analysis parameter, and outputs the object rendering information to the rendering information generation unit 2564. Specifically, the object rendering information can be expressed by the equation of $T(f)=U(f) \times B(f)$. Where, $T(f)$ was defined in [Numerical equation 29], $U(f)$ in [Numerical equation 21], and $B(f)$ in [Numerical equation 17].

The rendering information generation unit 2564, into which the object information and the object rendering information are inputted, generates the rendering information, and outputs the rendering information to the rendering unit 2563. The detailed operation thereof was already explained in the fifth embodiment by employing FIG. 43, so its explanation is omitted.

The rendering unit 2563, into which the decoded signal and the rendering information are inputted, generates the output signal, and outputs the output signal. The detailed operation thereof was already explained in the fifth embodiment by employing FIG. 43, so its explanation is omitted.

As explained above, the ninth embodiment of the present invention enables the receiving unit to control the input signal for each component element corresponding to each sounds source of the input signal of each point based upon the analysis information in which the analysis information of each point has been mixed. Further, it is also possible to control only specific sound source independently, and to control the localization of each sound source based upon the component element rendering information.

In addition, the receiving unit can curtail the arithmetic quantity relating to the calculation of the analysis information because the transmission unit calculates the analysis information.

A tenth embodiment of the present invention will be explained. This embodiment is characterized in controlling the objective sound and the background sound based upon the analysis information, the object information, and the component element rendering information with the input signal, in which the objective sound and the background sound coexist, targeted as a sound source.

Upon making a reference to FIG. 53, this embodiment, as compared with the sixth embodiment of FIG. 40, differs in a point that the signal control information being inputted into the output signal generation unit 2900 of the terminal 2500 gets mixed with the component element rendering information, and responding to this, the output signal generation unit 2550 of the receiving unit 2507 is replaced with an output signal generation unit 2900. Thus, hereinafter, the output signal generation unit 2900 will be explained.

A first example of this embodiment relates to the case that the analysis information is a suppression coefficient. Upon making a reference to FIG. 53, the signal control unit 101 outputs the suppression coefficient as analysis information. Responding to this, the multipoint control unit 2505 mixes the suppression coefficient, and the output signal generation unit 2900 controls the decoded signal by employing the component element rendering information including the signal control information, the object information, and the suppression coefficient.

In FIG. 54, a configuration example of the output signal generation unit 2900 is shown. This embodiment, as compared with the sixth embodiment shown in FIG. 43, differs in a point that the component element information conversion unit 2565 is replaced with a component element information conversion unit 2910. Thus, hereinafter, the component element information conversion unit 2910 will be explained.

Figure 55:
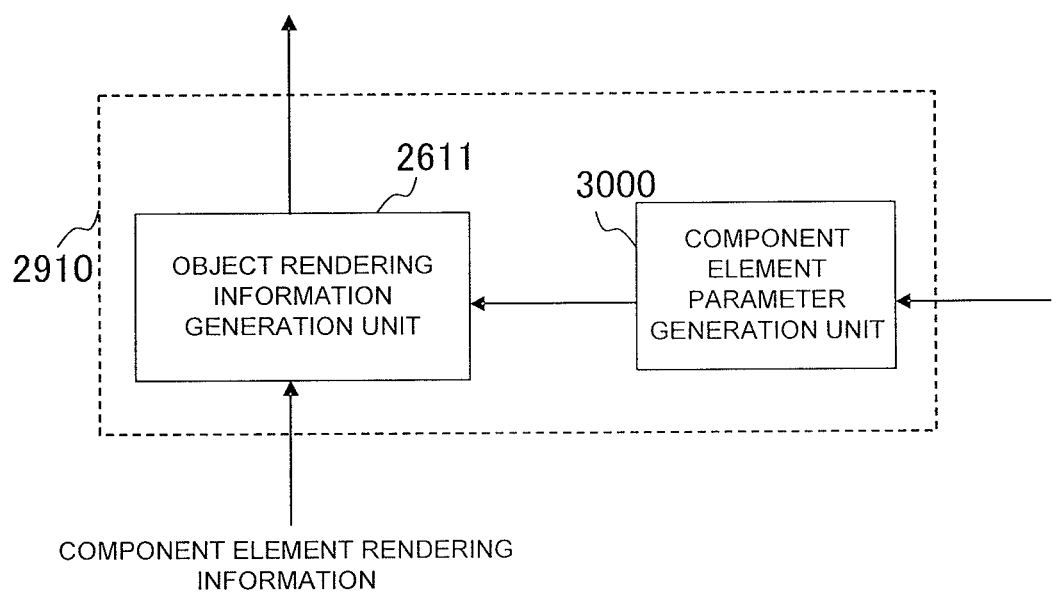
FIG. 55 shows a configuration example of a component element information conversion unit 2910.

In FIG. 55, a configuration example of the component element information conversion unit 2910 is shown. The component element information conversion unit 2910 is configured of a component element parameter generation unit 3000 and an object rendering information generation unit 2611. The component element information conversion unit 2910 differs in a point that the component element parameter generation unit 651 is replaced with the component element parameter generation unit 3000 as compared with the component element information conversion unit 2565 of the sixth embodiment shown in FIG. 44.

The component element parameter generation unit 3000 has the analysis information as an input. The component element parameter generation unit 3000 calculates the suppression coefficient by decoding the analysis information, generates the component element parameter, and outputs it to the object rendering information generation unit 2611.

An example of the method of calculating the component element parameter will be explained. This example differs from the first example of the sixth embodiment in a point of not utilizing the signal control information. That is, a component element parameter H(f) is equivalent to the case that a signal control information $A_{main}^{i}(f)$ for controlling the objective sound of the object signal i is $A_{main}^{i}(f)=1$ and a signal control information $A_{sub}^{i}(f)$ for controlling the background sound is $A_{sub}^{i}(f)=1$ in [Numerical equation 26], and behaves like the following equation.

$$H(f)=B(f) \quad \text{[Numerical equation 33]}$$

The object rendering information generation unit 2611, into which the component element parameter and the component element rendering information are inputted, generates the object rendering information. The detailed operation thereof was already explained in the first example of the sixth embodiment, its explanation is omitted. Additionally, the suppression coefficient common to all objects may be employed when the suppression coefficients have been mixed in the multipoint control unit 2505.

Additionally, as another configuration example of the component element information conversion unit 2910 of FIG. 54, the component element parameter generation unit 3000 and the object rendering information generation unit 2611 in FIG. 55 can be also integrated. In this case, the suppression coefficient is calculated by decoding the analysis information, the object rendering information is calculated from the suppression coefficient and the component element rendering information, and the object rendering information is outputted to the rendering information generation unit 2564. That is, the object rendering information T(f) can be defined as the following equation.

$$T(f)=U(f) \cdot H(f)=U(f) \cdot B(f) \quad \text{[Numerical equation 34]}$$

A second example of this embodiment relates to the case that the analysis information is a signal versus background sound ratio. In the second example, upon making a reference to FIG. 53, the signal analysis unit 101 outputs the signal versus background sound ratio as analysis information. Responding to this, the multipoint control unit 2505 mixes signal versus background sound ratios, and the output signal generation unit 2900 controls the decoded signal based upon the component element rendering information by employing the signal versus background sound ratio and the object information.

A configuration of the output signal generation unit 2900 is represented in FIG. 54 and FIG. 55 similarly to the case of the first example. Upon comparing this example with the first example, it differs in a configuration of the component element parameter generation unit 3000 of FIG. 55. Thus, hereinafter, the component element parameter generation unit 3000 will be explained.

The component element parameter generation unit 3000 has the analysis information as an input. The component element parameter generation unit 3000 calculates the signal versus background sound ratio by decoding the analysis information, calculates the component element parameter from the calculated signal versus background sound ratio, and outputs the component element parameter to the object rendering information generation unit 2611.

An example of the method of calculating the component element parameter will be explained. The suppression coefficient is calculated from the signal versus background sound ratio as explained in the third example of the second embodiment. In addition, the component element parameter can be calculated by employing [Numerical equation 33] as explained in the first example of this embodiment.

Additionally, as another configuration example of the component element information conversion unit 2910 of FIG. 54, the component element parameter generation unit 3000 and the object rendering information generation unit 2611 in FIG. 55 can be also integrated. In this case, the signal versus background sound ratio is calculated by decoding the analysis information, the object rendering information is calculated from the calculated signal versus background sound ratio and the component element rendering information, and the object rendering information is outputted to the rendering information generation unit 2564.

An example of the method of calculating the object rendering information at this time will be explained. The suppression coefficient is calculated from the signal versus background sound ratio as explained in the third example of the second embodiment. In addition, the object rendering information is calculated from the suppression coefficient and the component element parameter by applying [Numerical equation 34] as explained in the first example of this embodiment.

A third example of this embodiment relates to the case that the analysis information is background sound. In the third example, making a reference to FIG. 53, the signal analysis unit 101 outputs the background sound as analysis information. Responding to this, the multipoint control unit 2505 mixes the background sound, and the output signal generation unit 2900 controls the decoded signal based upon the background sound, the object information, and the component element rendering information.

Figure 56:
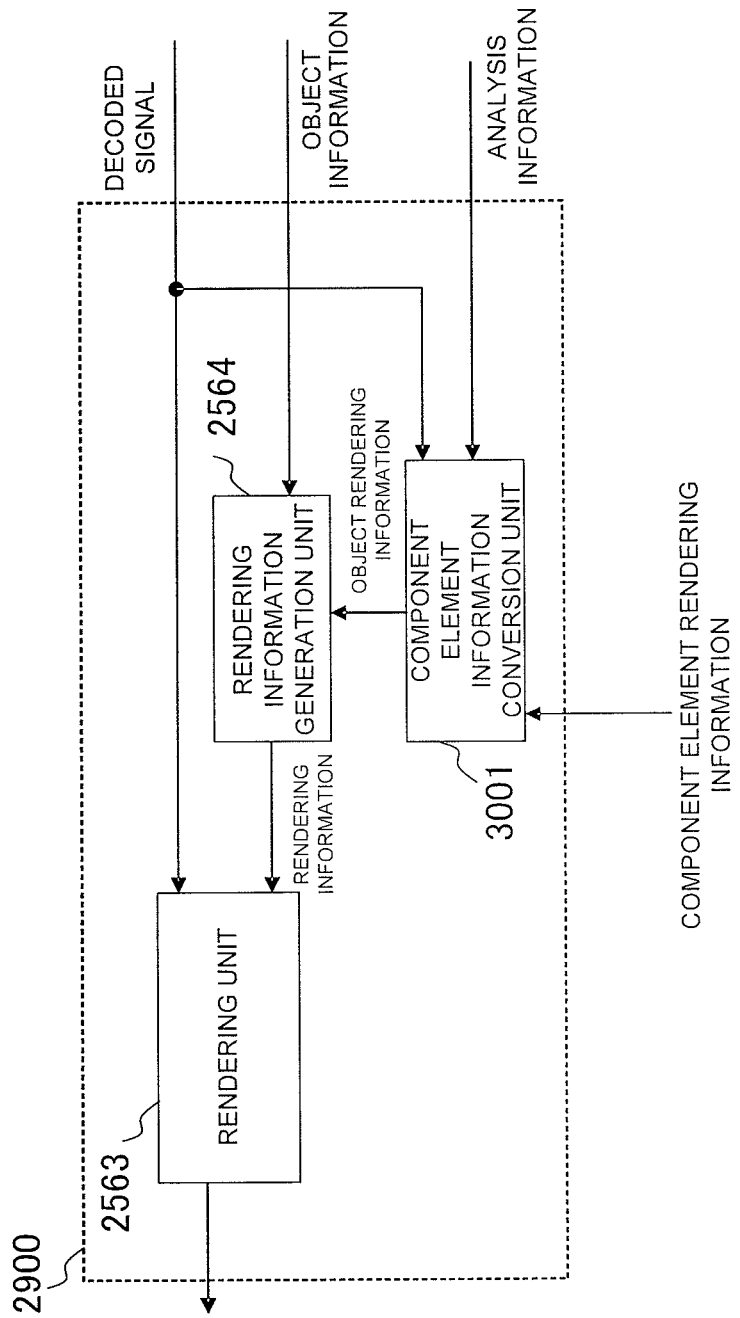
FIG. 56 shows a second configuration example of the output signal generation unit 2900.

A configuration of this example shown in FIG. 56, as compared with that of the first example shown in FIG. 54, differs in a point that the component element information conversion unit 2910 is replaced with a component element information conversion unit 3001. Thus, hereinafter, the component element information conversion unit 3001 will be explained.

Figure 57:
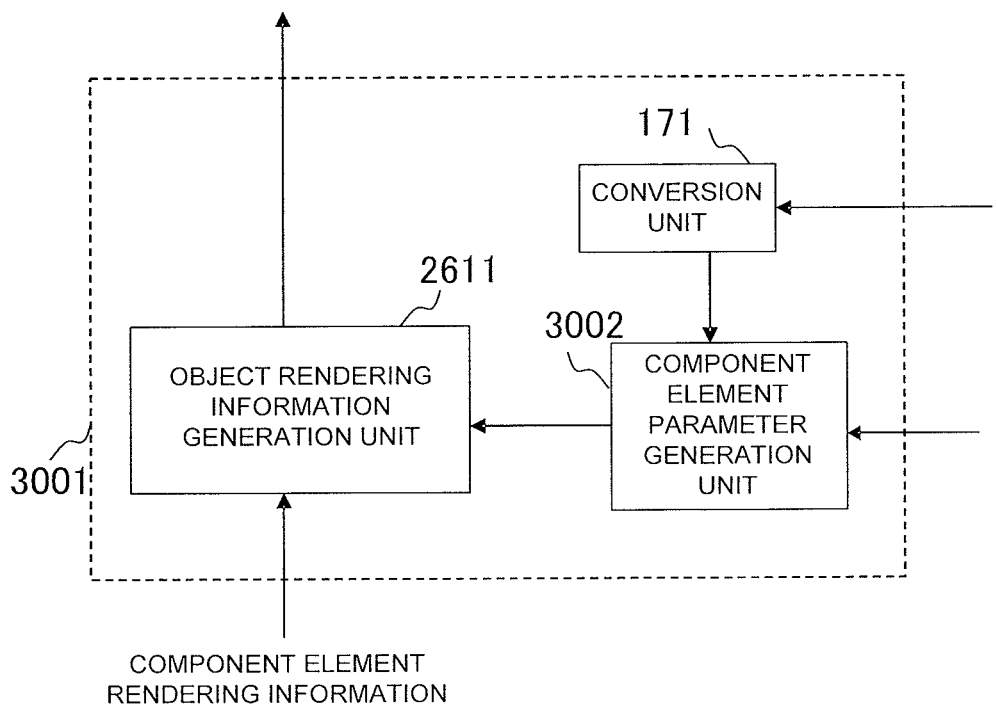
FIG. 57 shows a configuration example of a component element information conversion unit 3001.

A configuration example of the component element information conversion unit 3001 is shown in FIG. 57. The component element information conversion unit 3001 is configured of a conversion unit 171, a component element parameter generation unit 3002, and an object rendering information generation unit 2611.

The conversion unit 171, into which the decoded signal is inputted, generates the second converted signal in which the decoded signal has been discomposed into respective frequency components, and outputs the second converted signal to the component element parameter generation unit 3002.

The component element parameter generation unit 3002 has the analysis information and the second converted signal as an input. The component element parameter generation unit 3002 calculates the background sound by decoding the analysis information. In addition, the component element parameter generation unit 3002 calculates the component element parameter from the background sound and the second converted signal, and outputs the component element parameter to the object rendering information generation unit 2611.

An example of the method of calculating the component element parameter will be explained. The suppression coefficient is calculated from the background sound and the decoded signal as explained in the third example of the second embodiment. In addition, the component element parameter is calculated by applying [Numerical equation 33] as explained in the first example of this embodiment.

The object rendering information generation unit 2611, into which the component element parameter and the component element rendering information are inputted, outputs the object rendering information. The detailed operation thereof was already explained in the third example of the sixth embodiment, so its explanation is omitted.

Additionally, as another configuration example of the component element information conversion unit 3001 of FIG. 56, the component element parameter generation unit 3002 and the object rendering information generation unit 2611 in FIG. 57 can be also integrated. In this case, the object rendering information is calculated from the second converted signal, the background sound calculated by decoding the analysis information, and the component element rendering information, and the object rendering information is outputted to the rendering information generation unit 2564.

An example of the method of calculating the object rendering information will be explained. The suppression coefficient is calculated from the background sound and the decoded signal as explained in the third example of the second embodiment. In addition, the rendering information is calculated from the suppression coefficient and the component element parameter by applying [Numerical equation 34] as explained in the first example of this embodiment.

As explained above, the tenth embodiment of the present invention enables the receiving unit to control the input signal, which is configured of the objective sound and the background sound of each point, for each objective sound and for each background sound of each point independently based upon the analysis information in which the analysis information of each point has been mixed. Further, it is also possible to control specific objective sound and background sound independently and to control the localization of each sound source based upon the component element rendering information.

In addition, the receiving unit can curtail the arithmetic quantity relating to the calculation of the signal analysis because the transmission unit calculates the analysis information.

An eleventh embodiment of the present invention will be explained. This embodiment is characterized in that the transmission unit performs the analysis taking an influence of quantizing distortion, which has occurred in the encoding unit, into consideration, thereby reducing the quantizing distortion quantity that occurs at the moment that the receiving unit performs the decoding.

Figure 58:
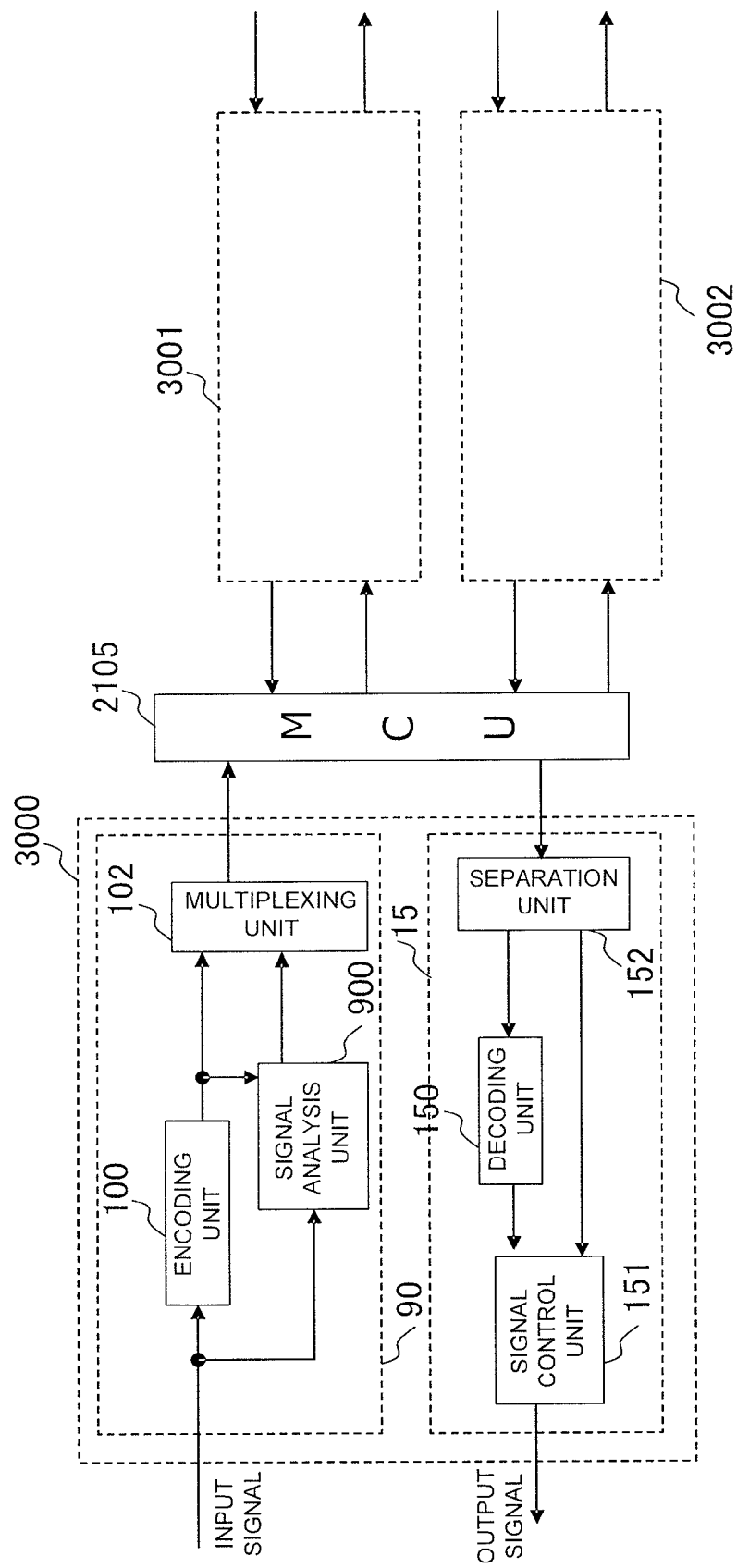
FIG. 58 is a block diagram illustrating an eleventh embodiment of the present invention.

Upon making a reference to FIG. 58, this embodiment differs in a point that the transmission unit 10 is replaced with a transmission unit 90 as compared with the first embodiment. Upon comparing the transmission unit 10 with the transmission unit 90, the latter differs from the former in a point that the signal analysis unit 101 is replaced with a signal analysis unit 900, and in addition, the signal coming from the encoding unit 100 is inputted into the signal analysis unit 900 besides the input signal.

A first configuration example of the signal analysis unit 900 will be explained in details by making a reference to FIG. 59.

The signal analysis unit 900 generates the analysis information from the input signal and the encoded signal coming from the encoding unit 100. The signal analysis unit 900 can generate the analysis information by taking the quantizing distortion quantity into consideration because the encoded signal is a signal having the quantizing distortion added hereto.

The signal analysis unit 900 receives the input signal and the encoded signal coming from the encoding unit 100, and outputs the analysis information. The signal analysis unit 900 is configured of a conversion unit 120, a decoding unit 150, a quantizing distortion calculation unit 910, an analysis information calculation unit 911, and a conversion unit 920.

The input signal is inputted into the conversion unit 120. Further, the encoded signal coming from the encoding unit 100 is inputted into the decoding unit 150.

The decoding unit 150 decodes the encoded signal inputted from the encoding unit 100. The decoding unit 150 outputs the decoded signal to the conversion unit 920. The conversion unit 920 decomposes the decoded signal into the frequency components. The conversion unit 920 outputs the decoded signal decomposed into the frequency components to the quantizing distortion calculation unit 910.

The conversion unit 120 decomposes the input signal into the frequency components. The conversion unit 120 outputs the input signal decomposed into the frequency components to the quantizing distortion calculation unit 910 and the analysis information calculation unit 911. The quantizing distortion calculation unit 910 compares the decoded signal decomposed into the frequency components with the input signal decomposed into the frequency components, and calculates the quantizing distortion quantity for each frequency component. For example, a difference between magnitude of each frequency component of the decoded signal decomposed into the frequency components and magnitude of each frequency component of the input signal decomposed into the frequency components could be the quantizing distortion in the above frequency. The quantizing distortion calculation unit 910 outputs the quantizing distortion quantity of each frequency to the analysis information calculation unit 911.

The analysis information calculation unit 911 receives the input signal decomposed into the frequency components from the conversion unit 120, and receives the quantizing distortion quantity of each frequency from the quantizing distortion calculation unit 910. With regard to the input signal decomposed into the frequency components, the analysis information calculation unit 911 decomposes the above input signal for each component element corresponding to the sound source. And, the analysis information calculation unit 911 generates the analysis information indicative of a relation between a plurality of the component elements. The analysis information calculation unit 911 outputs the analysis information. Further, with regard to the input signal decomposed into the frequency components, the analysis information calculation unit 911 may decompose the above input signal for each component element group that is configured of a plurality of the component elements.

The analysis information calculation unit 911, taking the quantizing distortion quantity into consideration, calculates the analysis information so that the quantizing distortion quantity is reduced at the moment that the receiving unit performs the decoding. For example, the analysis information calculation unit 911 may calculate the analysis information from magnitude of each frequency component of the input signal decomposed into the frequency components and magnitude of the quantizing distortion in the above frequency so that the quantizing distortion is auditorily masked. Herein, the analysis information calculation unit 911 may utilize the fact that the small component becomes hard to hear in a frequency neighboring the frequency of which the frequency component is large due to the auditory masking. The magnitude of the component, which becomes hard to hear in the neighboring frequency due to the magnitude of each frequency component, is defined as a masking characteristic. The analysis information calculation unit 911 calculates the masking characteristic in terms of all frequencies. The analysis information calculation unit 911 corrects the analysis information in each frequency by taking an influence of the quantizing distortion into consideration. The quantizing distortion is hard to hear when the magnitude of the quantizing distortion is smaller than the masking characteristic. In this case, the analysis information calculation unit 911 does not correct the analysis information because an influence of the quantizing distortion is small. The quantizing distortion is not masked when the magnitude of the quantizing distortion is larger than the masking characteristic. In this case, the analysis information calculation unit 911 corrects the analysis information so that the quantizing distortion is reduced. For example, when the suppression coefficient is employed as analysis information, the suppression coefficient, which is relatively small, should be employed so as to suppress the quantizing distortion as well simultaneously with the background sound As mentioned above, the analysis information calculation unit 911 corrects the analysis information, thereby allowing quantizing distortion to be auditorily masked, and the distortion and the noise to be reduced at the moment that the receiving unit performs the decoding.

So far, the correction of the analysis information such that the quantizing distortion was reduced by taking the auditory masking into consideration was explained. However, a configuration for correcting the analysis information so that the quantizing distortion is reduced in all frequencies without the auditory masking taken into consideration may be employed.

Figure 60:
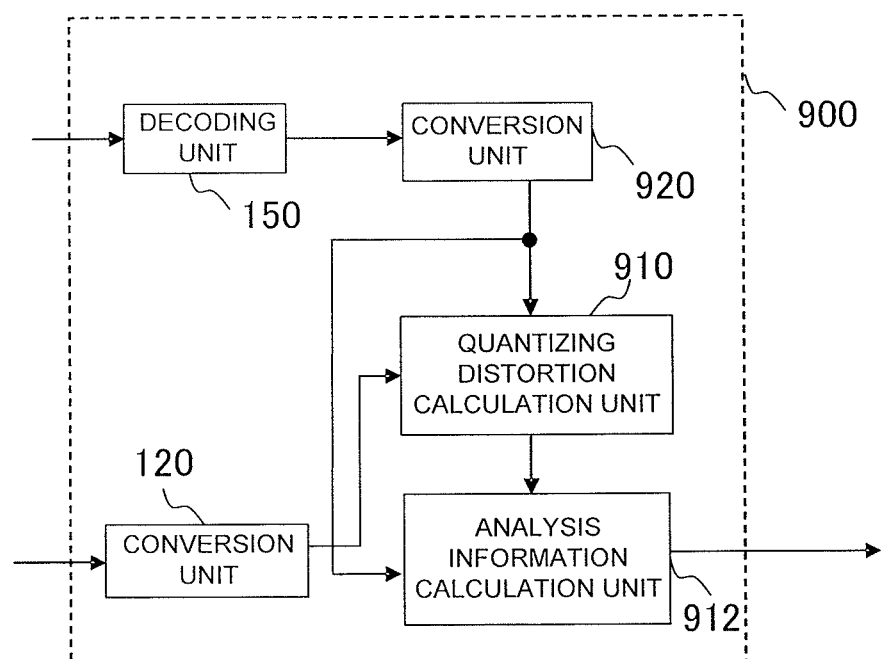
FIG. 60 shows a second configuration example of the signal analysis unit 900.

A second configuration example of the signal analysis unit 900 will be explained in details by making a reference to FIG. 60.

The signal analysis unit 900 receives the input signal and the encoded signal coming from the encoding unit 100, and outputs the analysis information. The signal analysis unit 900 is configured of a conversion unit 120, a decoding unit 150, a quantizing distortion calculation unit 910, an analysis information calculation unit 912, and a conversion unit 920.

The input signal is inputted into the conversion unit 120. Further, the encoded signal coming from the encoding unit 100 is inputted into the decoding unit 150.

The decoding unit 150 decodes the encoded signal inputted from the encoding unit 100. The decoding unit 150 outputs the decoded signal to the conversion unit 920. The conversion unit 920 decomposes the decoded signal into the frequency components. The conversion unit 920 outputs the decoded signal decomposed into the frequency components to the quantizing distortion calculation unit 910 and the analysis information calculation unit 912.

The conversion unit 120 decomposes the input signal into the frequency components. The conversion unit 120 outputs the input signal decomposed into the frequency components to the quantizing distortion calculation unit 910. The quantizing distortion calculation unit 910 compares the decoded signal decomposed into the frequency components with the input signal decomposed into the frequency components, and calculates the quantizing distortion quantity for each frequency component. For example, a difference between the magnitude of each frequency component of the decoded signal decomposed into the frequency components and the magnitude of each frequency component of the input signal decomposed into the frequency components could be the quantizing distortion in the above frequency. The quantizing distortion calculation unit 910 outputs the quantizing distortion quantity of each frequency to the analysis information calculation unit 912.

The analysis information calculation unit 912 receives the decoded signal decomposed into the frequency components from the conversion unit 920, and receives the quantizing distortion quantity of each frequency from the quantizing distortion calculation unit 910. With regard to the decoded signal decomposed into the frequency components, the analysis information calculation unit 912 decomposes the input signal for each component element that corresponds to the sound source. And, the analysis information calculation unit 912 generates the analysis information indicative of a relation between a plurality of the component elements. The analysis information calculation unit 912 outputs the analysis information corrected so that the quantizing distortion is reduced. The calculation of the analysis information such that the quantizing distortion is reduced is similar to the case of the first configuration example, so its explanation is omitted.

As explained above, the first configuration example and the second configuration example of the signal analysis unit 900 have an effect that generating the analysis information so as to reduce an influence of the encoding distortion that occurred in the encoding unit 100 makes it possible to reduce the quantizing distortion that occurs at the moment that the receiving unit 15 performs the decoding.

Continuously, a twelfth embodiment of the present invention will be explained. The twelfth embodiment of the present invention is for controlling the input signal that is configured of the objective sound and the background sound as a sound source. A configuration of the twelfth embodiment of the present invention is shown in FIG. 58 and FIG. 59 similarly to that of the ninth embodiment of the present invention. This embodiment differs from the ninth embodiment in a configuration of an analysis information calculation unit 911 of FIG. 59.

Figure 61:
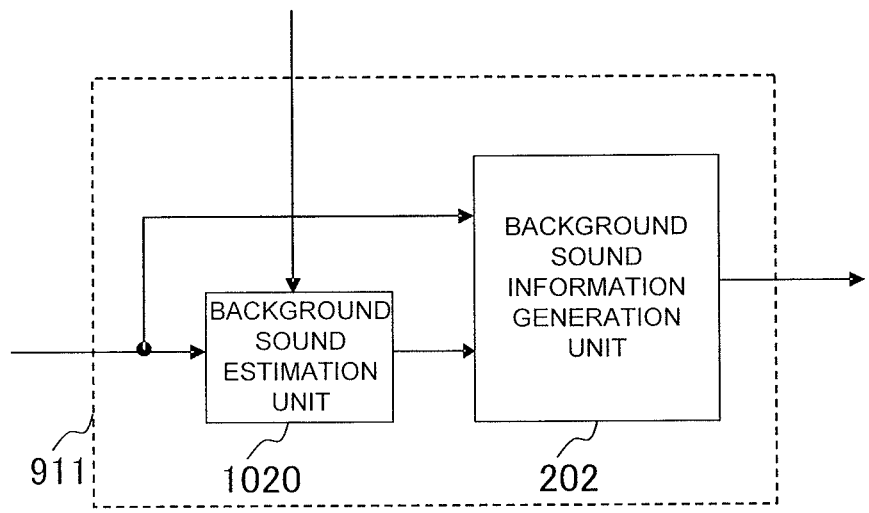
FIG. 61 shows a configuration example of an analysis information calculation unit 911.

A configuration example of the analysis information calculation unit 911 in the twelfth embodiment of the present invention will be explained in details by making a reference FIG. 61. The analysis information calculation unit 911 shown in FIG. 61, as compare with the analysis information calculation unit 121 shown in FIG. 10, differs in a point that the quantizing distortion quantity of each frequency coming from the quantizing distortion calculation unit 910 is inputted. In addition, while the analysis information calculation unit 121 is configured of the background sound estimation unit 200, the analysis information calculation unit 911 is configured of a background sound estimation unit 1020. Explanation of a portion which overlaps the portion explained in FIG. 10 and FIG. 43 is omitted.

The analysis information calculation unit 911 receives the input signal decomposed into the frequency components and the quantizing distortion quantity of each frequency, and outputs the analysis information. The analysis information calculation unit 911 is configured of a background sound information generation unit 202 and the background sound estimation unit 1020.

The background sound estimation unit 1020 receives the input signal decomposed into the frequency components and the quantizing distortion quantity of each frequency. The background sound estimation unit 1020 estimates the background sound by taking the quantizing distortion quantity into consideration. For example, the background sound estimation unit 1020 can perform a process similar to the process, which the background sound estimation unit 200 being included in the analysis information calculation unit 121 performs, with the background sound obtained by adding the quantizing distortion to the estimated background sound defined as an estimated background sound. The background sound estimation unit 1020 outputs the information of the background sound in which the quantizing distortion has been taken into consideration to the background sound information generation unit 202. The background sound information generation unit 202 generates the analysis information based upon the information of the background sound. And, the background sound information generation unit 202 outputs the analysis information in which the quantizing distortion has been taken into consideration.

The receiving unit 15 controls the decoded signal based upon the analysis information in which the quantizing distortion has been taken into consideration. This configuration makes it possible to take a high-quality control in which the quantizing distortion has been taken into consideration at the moment of controlling the decoded signal. In addition, this configuration yields an effect that the quantizing distortion, which occurs when the receiving unit 15 performs the decoding, can be reduced.

In addition, in the twelfth embodiment of the present invention, the background sound information generation unit 202 may be adapted to output the suppression coefficient as analysis information, the signal versus background sound ratio or the background sound itself.

Figure 59:
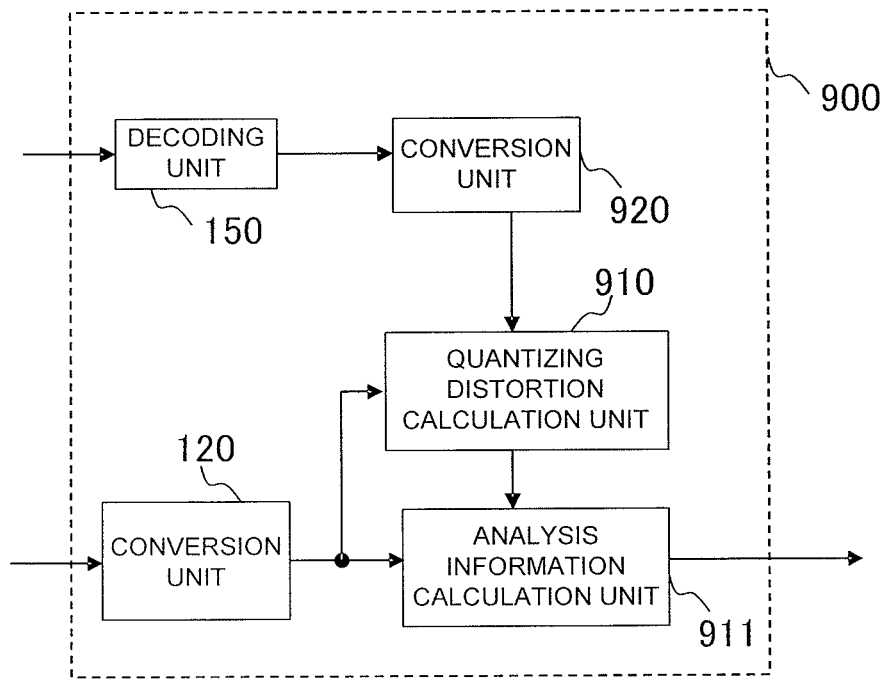
FIG. 59 shows a configuration example of a signal analysis unit 900.

The analysis information calculation unit 911 in FIG. 59 calculates and encodes the signal versus background sound ratio when encoding and outputting the signal versus background sound ratio as analysis information. The analysis information calculation unit 911 in FIG. 59 may employ the configuration of the background sound information generation unit 202 shown in FIG. 16 or the configuration of the background sound information generation unit 202 shown in FIG. 18 as that of the background sound information generation unit 202 thereof so as to encode the signal versus background sound ratio. In this case, the signal control unit 151 of the receiving unit 15 in FIG. 58 is configured so as to correspond to the control of the decoded signal by the signal versus background sound ratio.

The analysis information calculation unit 911 in FIG. 59 encodes and outputs the estimated background sound estimated in the background sound estimation unit 1020 when encoding and outputting the background sound itself as analysis information.

Figure 62:
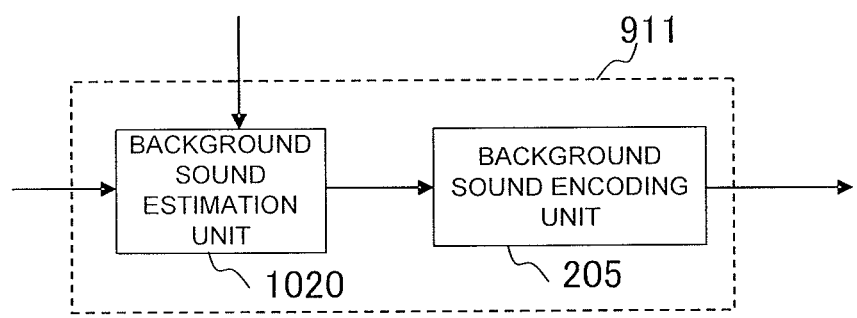
FIG. 62 shows a second configuration example of the analysis information calculation unit 912.

A configuration example of the analysis information calculation unit 911 for outputting the background sound itself as analysis information will be explained by making a reference to FIG. 62. The analysis information calculation unit 911 of this configuration example receives the input signal decomposed into the frequency components and the quantizing distortion quantity of each frequency, and outputs the encoded background sound. The analysis information calculation unit 911 is configured of a background sound encoding unit 205 and a background sound estimation unit 1020. An operation of the background sound estimation unit 1020 overlaps the operation explained in FIG. 61, so its explanation is omitted. Further, an operation of the background sound encoding unit 205 overlaps the operation explained in FIG. 21, so its explanation is omitted.

In this case, the signal control unit 151 of the receiving unit 15 in FIG. 58 is configured so as to correspond to the control of the decoded signal by the background sound.

Above, the twelfth embodiment of the present invention is for controlling the decoded signal based upon the suppression coefficient in which the quantizing distortion has been taken into consideration, the signal versus background sound ratio, or the background sound. This configuration makes it possible to take a high-quality control in which the quantizing distortion has been taken into consideration at the moment of controlling the decoded signal. In addition, this configuration yields an effect that the quantizing distortion and the encoding distortion, which occur at the moment that the receiving unit 15 performs the decoding, can be reduced.

Next, a thirteenth embodiment of the present invention will be explained. The thirteenth embodiment of the present invention is for reducing the arithmetic quantity in the transmission unit side, and the arithmetic quantity relating to the control for each component element corresponding to each sound source, which is taken by the receiving unit side based upon the analysis information.

Next, the thirteenth embodiment of the present invention will be explained by making a reference to FIG. 63. The thirteenth embodiment of the present invention shown in FIG. 63 differs from the first embodiment of the present invention shown in FIG. 1 in a point that the transmission unit 10 is replaced with a transmission unit 13, and a point that the receiving unit 15 is replaced with a receiving unit 18. With this configuration, the thirteenth embodiment of the present invention can share the conversion unit existing in the transmission unit, and can share the conversion unit existing in the receiving unit. As a result, the arithmetic quantity of the transmission unit 13 and the receiving unit 18 can be reduced.

Figure 63:
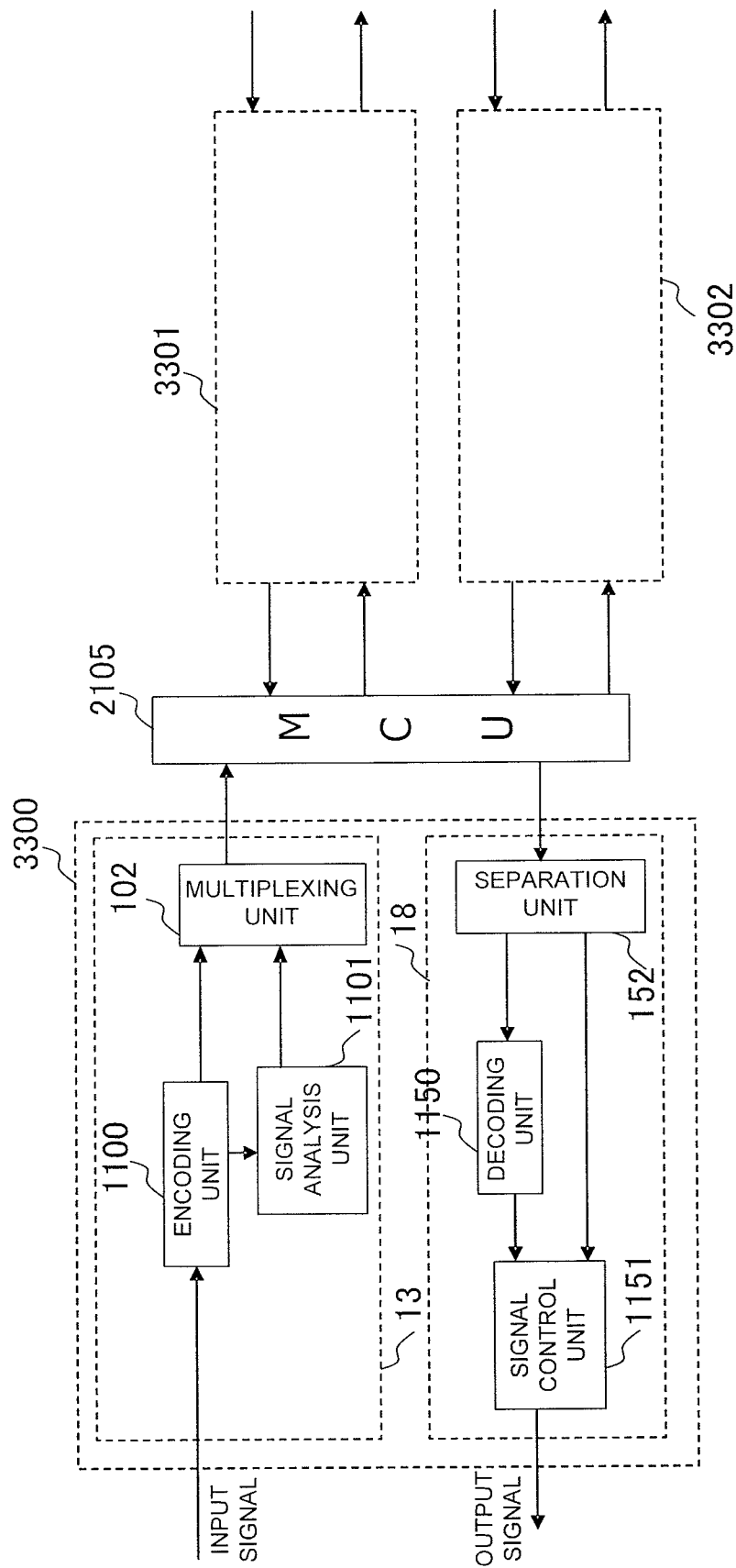
FIG. 63 is a block diagram illustrating a thirteenth embodiment of the present invention.

The transmission unit 13 shown in FIG. 63 differs from the transmission unit 10 shown in FIG. 1 in a point that the encoding unit 100 is replaced with an encoding unit 1100, and a point that the signal analysis unit 101 is replaced with a signal analysis unit 1101. In this example, the encoding unit 1100 outputs the input signal decomposed into the frequency components to the signal analysis unit 1101.

Figure 64:
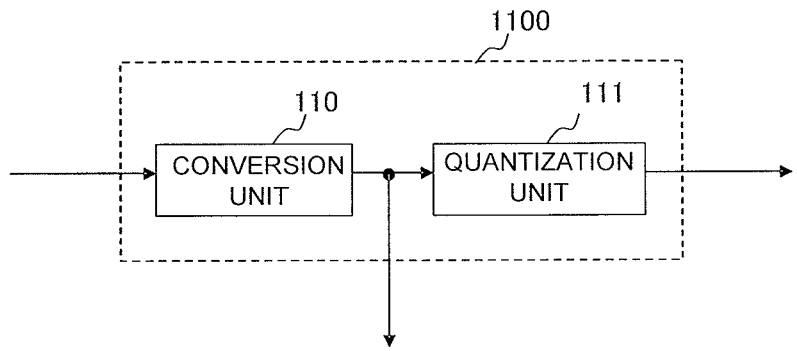
FIG. 64 shows a configuration example of an encoding unit 1100.

A configuration example of the encoding unit 1100 will be explained in details by making a reference to FIG. 64. The encoding unit 1100 shown in FIG. 64 differs from the encoding unit 100 shown in FIG. 2 in a point that the first converted signal, being an output of the conversion unit 110, is outputted to the signal analysis unit 1101. An operation of the conversion unit 110 and the quantization unit 111 overlaps the operation explained in FIG. 2, so its explanation is omitted. Herein, the arithmetic quantity of the encoding unit 1100 is almost identical to that of the encoding unit 100 because the encoding unit 1100 differs from the encoding unit 100 shown in FIG. 2 only in the signal being outputted.

Figure 65:
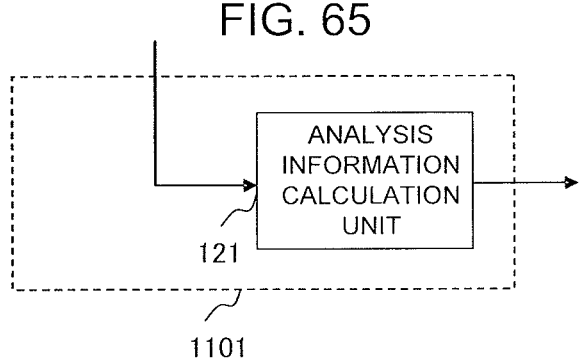
FIG. 65 shows a configuration example of a signal analysis unit 1101.

A configuration example of the signal analysis unit 1101 will be explained in details by making a reference to FIG. 65. The point in which the signal analysis unit 1101 shown in FIG. 65 differs from the signal analysis unit 101 shown in FIG. 4 is that the conversion unit 120 included in the signal analysis unit 101 is deleted. An operation of the analysis information calculation unit 121 overlaps the operation explained in FIG. 4, so its explanation is omitted.

The signal analysis unit 1101 receives the first converted signal from the encoding unit 1100. The received first converted signal is inputted into the analysis information calculation unit 121. Herein, upon comparing the conversion unit 110 within the encoding unit 1100 shown in FIG. 64 with the conversion unit 120 within the signal analysis unit 101 shown in FIG. 4, the first converted signal, being an output of the former, and the second converted signal, being an output of the latter, become identical to each other when the input signal being supplied to the conversion unit is identical and an operation of the conversion unit is identical. For this, it is possible to delete the conversion unit 120, and to use the first converted signal being outputted by the signal analysis unit 1101 as the second converted signal when an operation of the conversion unit 110 is identical to that of the conversion unit 120. With this configuration, the arithmetic quantity of the signal analysis unit 1101 is curtailed by a portion equivalent to the arithmetic quantity of the conversion unit 120 as compared with the arithmetic quantity of the signal analysis unit 101.

With regard to the receiving unit, the receiving unit 18 shown in FIG. 63 differs from the receiving unit 15 shown in FIG. 1 in a point that the decoding unit 150 is replaced with a decoding unit 1150, and a point that the signal control unit 151 is replaced with a signal control unit 1151.

Figure 66:
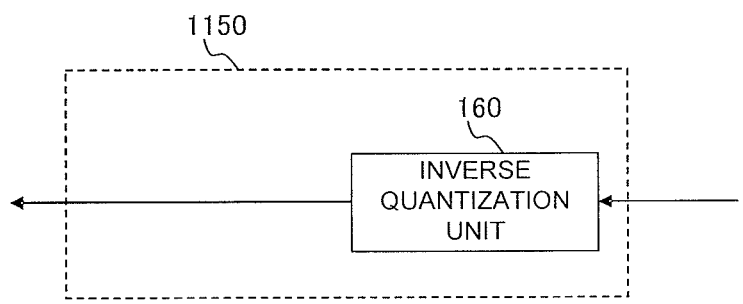
FIG. 66 shows a configuration example of a decoding unit 1150.

A configuration example of the decoding unit 1150 will be explained by making a reference to FIG. 66. The decoding unit 1150 differs from the decoding unit 150 shown in FIG. 3 in point that the inverse conversion 161 is deleted. An operation of the inverse quantization unit 160 overlap the operation explained in FIG. 3, so its explanation is omitted. In the decoding unit 150 shown in FIG. 3, the inverse conversion unit 161 inverse-converts the first converted signal being outputted by the inverse quantization unit 160 into a time region signal, and outputs it as a decoded signal to the conversion unit 171 shown in FIG. 5. In FIG. 5, the conversion unit 171 performs a process of receiving the decoded signal, and converting it into the second converted signal. Herein, as mentioned above, the first converted signal can be used as the second converted signal when an operation of the conversion unit 110 is identical to that of the conversion unit 120. With this, the decoding unit 1150 outputs the first converted signal being outputted by the inverse quantization unit 160 to the signal processing unit 172 being included in the signal control unit 1151 in this embodiment. Thus, in this embodiment, the inverse conversion unit 161 is deleted.

Figure 67:
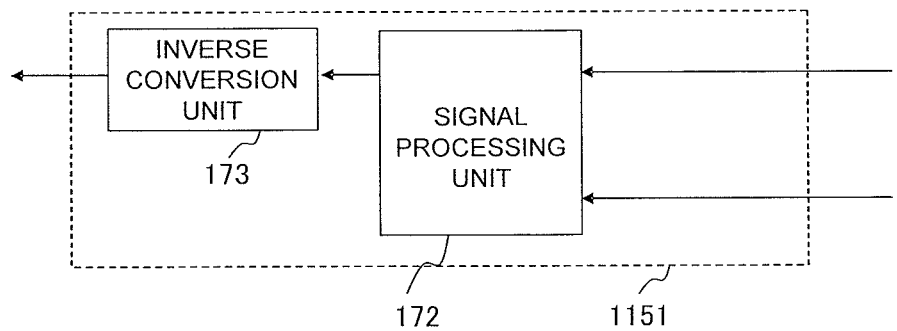
FIG. 67 shows a configuration example of a signal control unit 1151.

FIG. 67 is a view illustrating a configuration example of the signal control unit 1151. A difference between the signal control unit 151 and the signal control unit 1151 is that the input signal inputted as a time region signal is converted into the frequency component by the conversion unit 171, and thereafter, supplied to the signal processing unit 172 in the signal control unit 151 shown in FIG. 5, and on the other hand, the conversion unit 171 is deleted, and the frequency component coming from the decoding unit 1150 is directly supplied to the signal processing unit 172 in the signal control unit 1151. Herein, upon paying attention to the frequency component being supplied to the signal control unit 1151 from the decoding unit 1150, it can be seen that a difference between the first embodiment shown in FIG. 1 and the thirteenth embodiment shown in FIG. 63 is whether or not the frequency component being outputted by the inverse quantization unit 160 goes through the inverse conversion unit 161 and the conversion unit 171, the signal having a frequency component identical to that of the signal being outputted by the inverse quantization unit 160 is supplied in any case, and the signal processing unit 172 within the signal control unit 1151 outputs an identical result. Herein, upon inquiring the arithmetic quantity of the receiving unit, it can be seen that the arithmetic quantity of the decoding unit 1150 is curtailed by a portion equivalent to the arithmetic quantity of the inverse conversion unit 161 as compared with the arithmetic quantity of the decoding unit 150. Further, it can be seen that the arithmetic quantity of the signal control unit 1151 is curtailed by a portion equivalent to the arithmetic quantity of the conversion unit 171 as compared with the arithmetic quantity of the signal control unit 151.

A configuration example of the signal control unit 1151 will be explained in details by making a reference to FIG. 67. The signal control unit 1151 shown in FIG. 67 differs from the signal control unit 151 shown in FIG. 5 in a point that the conversion unit 171 is deleted. Operations of the signal processing unit 172 and the inverse conversion unit 173 overlap the operation explained in FIG. 5, so its explanation is omitted.

Figure 5:
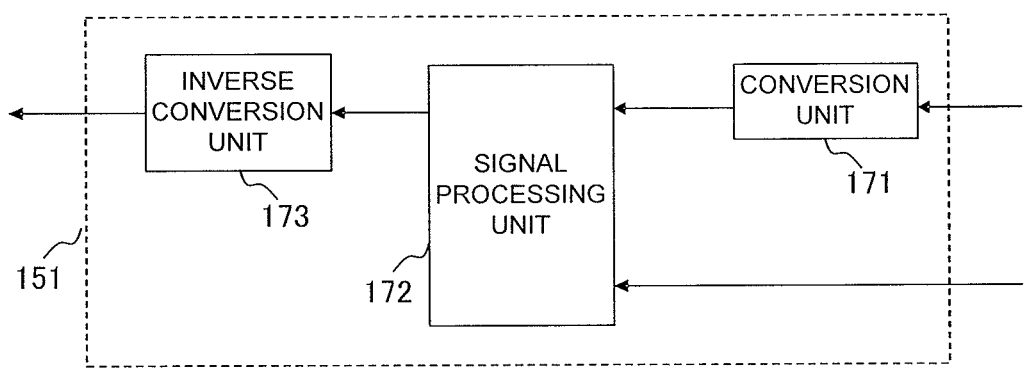
FIG. 5 shows a configuration example of a signal control unit 151.

In the signal control unit 151 of FIG. 5, the decoded signal inputted as a time region signal is converted into the second converted signal by the conversion unit 171, and outputted to the signal processing unit 172. As mentioned above, the first converted signal can be used as the second converted signal when an operation of the conversion unit 110 is identical to that of the conversion unit 120. This enables the signal processing unit 172 being included in the signal control unit 1151 to receive the first converted signal being outputted by the inverse quantization unit 160. Thus, in this example, the conversion unit 171 is deleted.

Herein, upon paying attention to the signal being inputted into the signal control unit 1151 from the decoding unit 1150, it can be seen that a difference between the first embodiment shown in FIG. 1 and the thirteenth embodiment shown in FIG. 63 is whether or not the signal being outputted by the inverse quantization unit 160 goes through the inverse conversion unit 161 and the conversion unit 171. When the first converted signal can be used as the second converted signal, the frequency component of the signal being outputted by the inverse quantization unit 160 is identical to the frequency component of the signal being inputted into the signal processing unit 172 in both of the first embodiment and the thirteenth embodiment. Thus, the signal processing unit 172 within the signal control unit 1151 outputs a result identical to the result that the signal processing unit 172 shown in FIG. 5 outputs. Further, the arithmetic quantity of the decoding unit 1150 is curtailed by a portion equivalent to the arithmetic quantity of the inverse conversion unit 161 shown in FIG. 3 as compared with the arithmetic quantity of the decoding unit 150. In addition, the arithmetic quantity of the signal control unit 1151 is curtailed by a portion equivalent to the arithmetic quantity of the conversion unit 171 shown in FIG. 5 as compared with the arithmetic quantity of the signal control unit 151.

Above, the thirteenth embodiment of the present invention has an effect that the arithmetic quantity is curtailed by a portion equivalent to the respective arithmetic quantities of the conversion unit 120, the inverse conversion unit 161, and the conversion unit 171 as compared with the case of the first embodiment in addition to the effect of the first embodiment of the present invention. In addition, the configuration of the thirteenth embodiment capable of curtailing the arithmetic quantity is applicable to the second embodiment to the twelfth embodiment of the present invention. With this, each embodiment has an effect of curtailing the arithmetic quantity that is similar to the effect of the thirteenth embodiment of the present invention.

Above, so far, the method of analyzing the input signal that is configured of a plurality of the sound sources, calculating the analysis information, and controlling the decoded signal based upon the analysis information in the receiving side was explained in the first embodiment to the thirteenth embodiment of the present invention. Herein, the details thereof will be explained by employing a specific example. As an input signal, for example, there exist sound, musical instrument sound, etc. that differ for each utilization method. In addition to these, operational sound that each machine utters, sound or a foot step of a manipulator, etc. exist in the case of aiming for the monitoring with sound.

The signal analysis control system relating to the present invention is configured to analyze the input signal, and encode the analyzed result as analysis information when a plurality of the component elements exist in the input signal. A configuration similar to the configuration shown in FIG. 1 is applied when a plurality of the component elements exist. The configuration of the signal analysis unit 101 and the signal control unit 151, the information that the signal analysis unit 101 outputs to the multiplexing unit 102, and the information being sent to the signal control unit 151 from the separation unit 152 will be explained in details, respectively.

Figure 68:
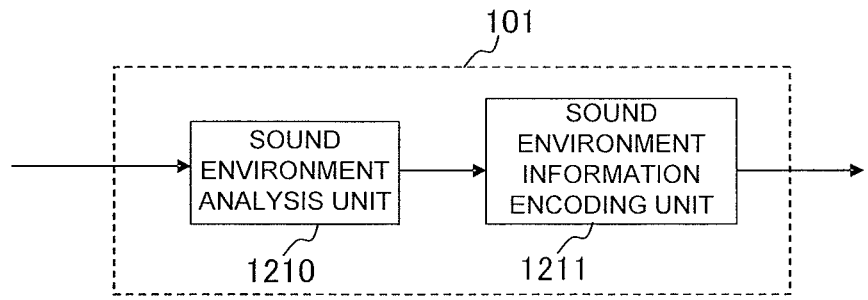
FIG. 68 shows a second configuration example of the signal analysis unit 101.

A second configuration example of the signal analysis unit 101 will be explained in details by making a reference to FIG. 68. The second configuration example of the signal analysis unit 101 is applied when a plurality of the component elements exist. This signal analysis unit 101 is configured of a sound environment analysis unit 1210 and a sound environment information encoding unit 1211. The sound environment analysis unit 1210 analyzes the information of a plurality of the component elements being included in the input signal. The sound environment analysis unit 1210 outputs the component element analysis information to the sound environment information encoding unit 1211. The sound environment information encoding unit 1211 encodes the component element analysis information inputted from the sound environment analysis unit 1210. And, the sound environment information encoding unit 1211 outputs the encoded component element analysis information to the multiplexing unit 102 shown in FIG. 1. Herein, the multiplexing unit 102 shown in FIG. 1 carries out the multiplexing corresponding to the component element analysis information inputted from the sound environment information encoding unit 1211.

The sound environment analysis unit 1210 will be further explained in details.

As a method of analyzing the information of a plurality of the sound sources in the sound environment analysis unit 1210, various methods are employable. For example, as a method of analyzing the information of a plurality of the sound sources, the method of the signal separation disclosed in Non-patent document 11 (Speech Enhancement, Springer, 2005, pp. 371-402) may be employed. Further, as a method of analyzing the information of a plurality of the sound sources, the method of the signal separation, which is called an auditory scene analysis, a computational auditory scene analysis, a single input signal separation, a single channel signal separation, etc., may be employed. With these methods of the signal separation, the sound environment analysis unit 1210 separates the input signal into a plurality of the component elements. In addition, the sound environment analysis unit 1210 converts each separated component elements into the component element analysis information that should be outputted, and outputs it. This component element analysis information can be outputted in various formats. For example, as component element analysis information, there exist the suppression coefficient for suppressing the background sound, a percentage of each component element in each frequency component, and magnitude of each frequency component of the signal of each component element itself. The percentage of the component element includes, for example, an amplitude ratio with the input signal, an energy ratio with the input signal, an average value thereof, etc. The magnitude of each frequency component of the signal includes, for example, an amplitude absolute value, an energy value, an average value thereof, etc. Further, the analysis result itself that should be outputted, or the signal that can be easily converted into the analysis result that should be outputted can be obtained in a way to the signal separation, depending upon the method of the signal separation. In that case, it is also possible to perform the process of obtaining the analysis result that should be outputted in a way to the signal separation without performing the signal separation to the end.

Figure 69:
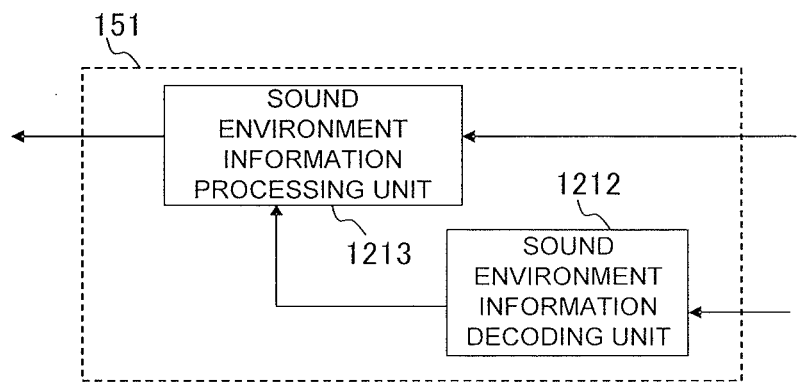
FIG. 69 shows a second configuration example of the signal control unit 151.

A configuration example of the signal control unit 151 will be explained in details by making a reference to FIG. 69. The configuration example of the signal control unit 151 is applied when a plurality of the component elements exist. The signal control unit 151 is configured of a sound environment information decoding unit 1212 and a sound environment information processing unit 1213. The signal control unit 151 receives the decoded signal from the decoding unit 150, and the signal of which the analysis information has been encoded from the separation unit 152. The sound environment information decoding unit 1212 decodes the signal received from the separation unit 152, of which the analysis information has been encoded. The sound environment information decoding unit 1212 outputs the decoded analysis information to the sound environment information processing unit 1213. The above analysis information is equivalent to the analysis information outputted by the sound environment analysis unit 1210 being included in the signal analysis unit 101 shown in FIG. 68. The sound environment information processing unit 1213 controls the decoded signal based upon the analysis information inputted from the sound environment information decoding unit 1212. This method of the control differs depending upon a purpose of the control. For example, the sound environment information processing unit 1213 may take a control for suppressing the background sound similarly to the case of the second embodiment.

Above, when the component elements being included in the input signal exist in plural, applying the present invention yields the effect that is gained in the first embodiment of the present invention.

Above, the first embodiment of the present invention was explained with the configuration, which was applied when the component elements being included in the input signal existed in plural, exemplified. Likewise, a scheme for changing the signal analysis unit, the signal control unit, or the output signal generation unit may be employed for the second embodiment to the thirteenth embodiment. Further, like the configurations of the fifth embodiment to the tenth embodiment, the control for localizing the output of each component element to the output signal, which is configured of a plurality of the channels, may be taken.

In addition, when the number of the channels of the input signal is plural, as a technique of the analysis in the signal analysis unit 101 of the present invention, the technique, which is called a directivity control, a beamforming, a blind source separation, or an independent component analysis, may be employed. In particular, when the number of the channels of the input signal is larger than the number of the objective sound, the signal may be analyzed not by employing the above-mentioned method of estimating the background sound information or the method of the analysis being employed in a thirteenth embodiment, but by employing only the directivity control, the beamforming, the blind source separation, or the independent component analysis. For example, the technology relating to the directivity control and the beamforming is disclosed in Non-patent document 12 (Microphone Arrays, Springer, 2001), and Non-patent document 13 (Speech Enhancement, Springer, 2005, pp. 229-246). Further, the technology relating to the methods of the blind source separation and the independent component analysis is disclosed in Non-patent document 14 (Speech Enhancement, Springer, 2005, pp. 271-369).

The configuration shown in FIG. 1 is applied for the first embodiment of the present invention when the foregoing method of the analysis is applied. In addition, the configuration of the signal analysis unit 101, the configuration of the signal control unit 151, the information that the signal analysis unit 101 outputs to the multiplexing unit 102, and the information being sent to the signal control unit 151 from the separation unit 152 will be explained in details. The input signal is a signal of a plurality of the channels. A basic operation, which is similar to the operation of the first embodiment, overlaps the operation explained in FIG. 1, so its explanation is omitted.

A third configuration example of the signal analysis unit 101 will be explained in details by making a reference to FIG. 70. The third configuration example of the signal analysis unit 101 corresponds to the case that the number of the channels of the input signal is plural. The signal analysis unit 101 of this configuration example employs the method of the independent component analysis as a method of analyzing the input signal. The signal analysis unit 101 of this configuration example outputs a filter coefficient for the signal separation of the component element corresponding to each sound source being included in the input signal as analysis information.

The signal analysis unit 101 is configured of a signal separation analysis unit 1200 and a separation filter encoding unit 1201. The signal separation analysis unit 1200 calculates a separation filter coefficient with the method of the independent component analysis. The separation filter coefficient is a filter coefficient that is employed for performing the signal separation of the component element corresponding to each sound source being included in the input signal. And, the signal separation analysis unit 1200 outputs the separation filter coefficient to the separation filter encoding unit 1201. The separation filter encoding unit 1201 encodes the separation filter coefficient inputted from the signal separation analysis unit 1200. The separation filter encoding unit 1201 outputs the encoded separation filter coefficient as analysis information.

A third configuration example of the signal control unit 151 will be explained in details by making a reference to FIG. 71. The third configuration example of the signal control unit 151 corresponds to the case that the number of the channels of the input signal is plural.

The signal control unit 151 is configured of a separation filter decoding unit 1202 and a filter 1203. The separation filter decoding unit 1202 receives the encoded separation filter coefficient as analysis information from the separation unit 152. And, the separation filter decoding unit 1202 decodes the encoded separation filter coefficient, and outputs the separation filter coefficient to the filter 1203. The filter 1203 receives the decoded signal of a plurality of the channels from the decoding unit 150, and receives the separation filter coefficient from the separation filter decoding unit 1202. And, the filter 1203 performs the filtering process based upon the separation filter coefficient for the decoded signal of a plurality of the channels. The filter 1203 outputs the signal in which the signal of the component element corresponding to each sound source has been separated.

As explained above, in the present invention, the transmission unit analyzes the input signal when the number of the channels of the input signal is plural. This configuration enables the receiving unit to control the input signal, which is configured of a plurality of the sound sources, for each component element corresponding to each sound source based upon the information of the signal analysis made by the transmission unit also when the number of the channels of the input signal is plural. In addition, the receiving unit can curtail the arithmetic quantity relating to the calculation of the signal analysis because the transmission unit analyzes the signal.

Figure 70:
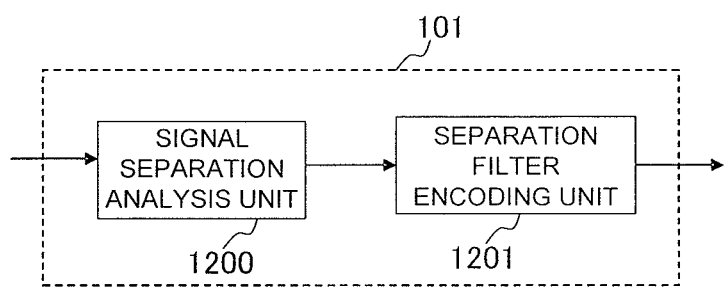
FIG. 70 shows a third configuration example of the signal analysis unit 101.
Figure 71:
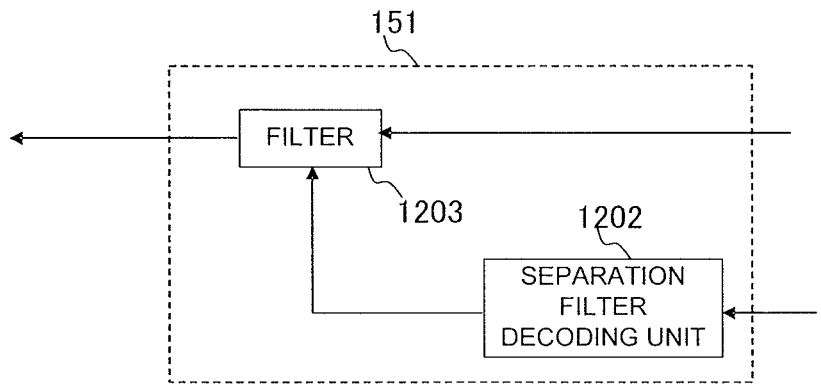
FIG. 71 shows a third configuration example of the signal control unit 151.

Further, while the filter coefficient of the separation filter was employed as analysis information of the input signal in the configuration examples shown in FIG. 70 and FIG. 71, the analysis information employed in the first embodiment to the thirteenth embodiment may be employed. For this, it is enough for the signal separation analysis unit 1200 shown in FIG. 70 to be configured so as to calculate the separation filter, and to perform the signal separation employing the separation filter. This leads to the configuration in which the separation filter encoding unit 1201 is replaced with the sound environment information encoding unit 1211 shown in FIG. 68.

In addition, not only of the method of the independent component analysis but also the methods disclosed in the Non-patent documents 12 to 15 may be employed as a method of analyzing the input signal in the signal analysis unit 101. Further, these methods of the analysis may be combined with the methods of the analysis in the first embodiment to the thirteenth embodiment of the present invention, and employed. In addition, the analysis result that should be outputted, or the signal that can be easily converted into the analysis result that should be outputted can be obtained in a way to the signal analysis, depending upon the method of the analysis. In that case, the process of the analysis may be changed so that the analysis result is outputted without the signal analysis performed to the end.

Figure 72:
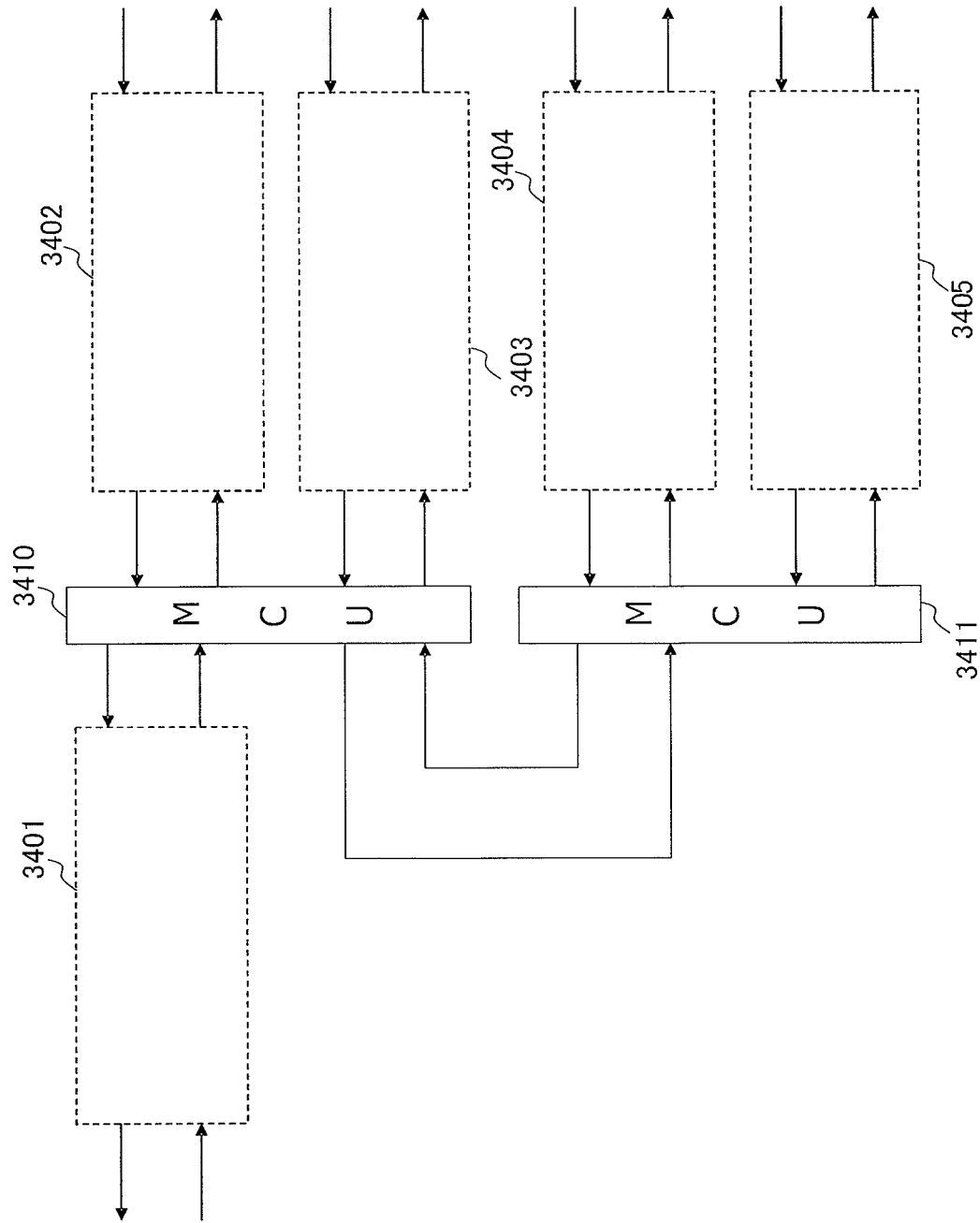
FIG. 72 is a block diagram illustrating a fourteenth embodiment of the present invention.

A fourteenth embodiment of the present invention will be explained. In FIG. 72, a configuration of the multipoint control system in this embodiment is shown. This embodiment is for connecting the multipoint control units multi-stepwise. As terminals 3401, 3402, 3403, 3404, and 3405, and multipoint control units 3410 and 3411 of FIG. 72, for example, the terminal 2500 and the multipoint control unit 2105 explained in the first embodiment may be employed. Additionally, it is apparent that connecting the multipoint control units multi-stepwise does not incur inconvenience at all because one set of the input/output of the multipoint control unit is identical to the input/output of the terminal. With the multi-step connection of the multipoint control units, the load of the processing quantity of the multipoint control unit can be dispersed, and a large-scale remote conference system can be established in addition to the effect of the first embodiment of the present invention. Additionally, this multi-step connection of the multipoint control units is applicable to the second embodiment to the thirteenth embodiment of the present invention.

Figure 73:
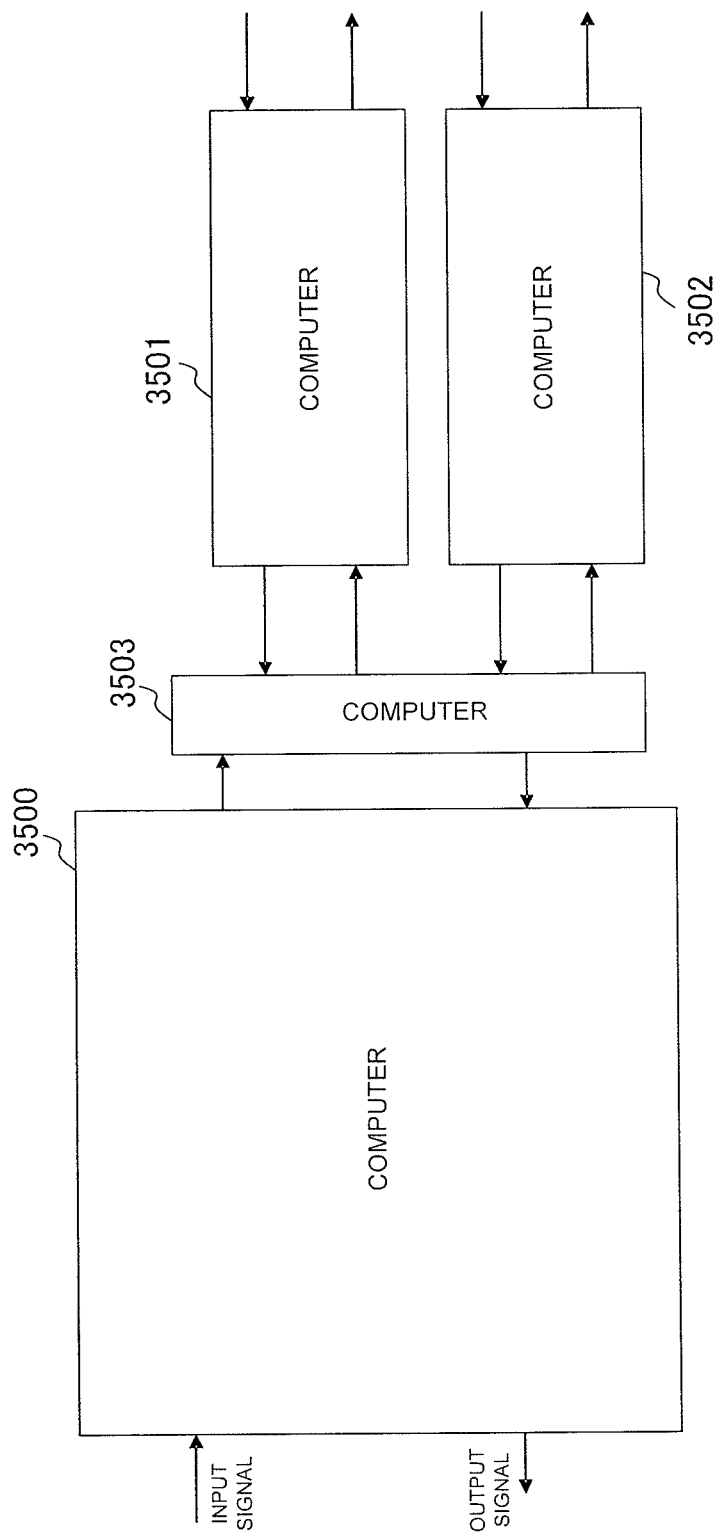
FIG. 73 is a block diagram illustrating a fifteenth embodiment of the present invention.
Figure 74:
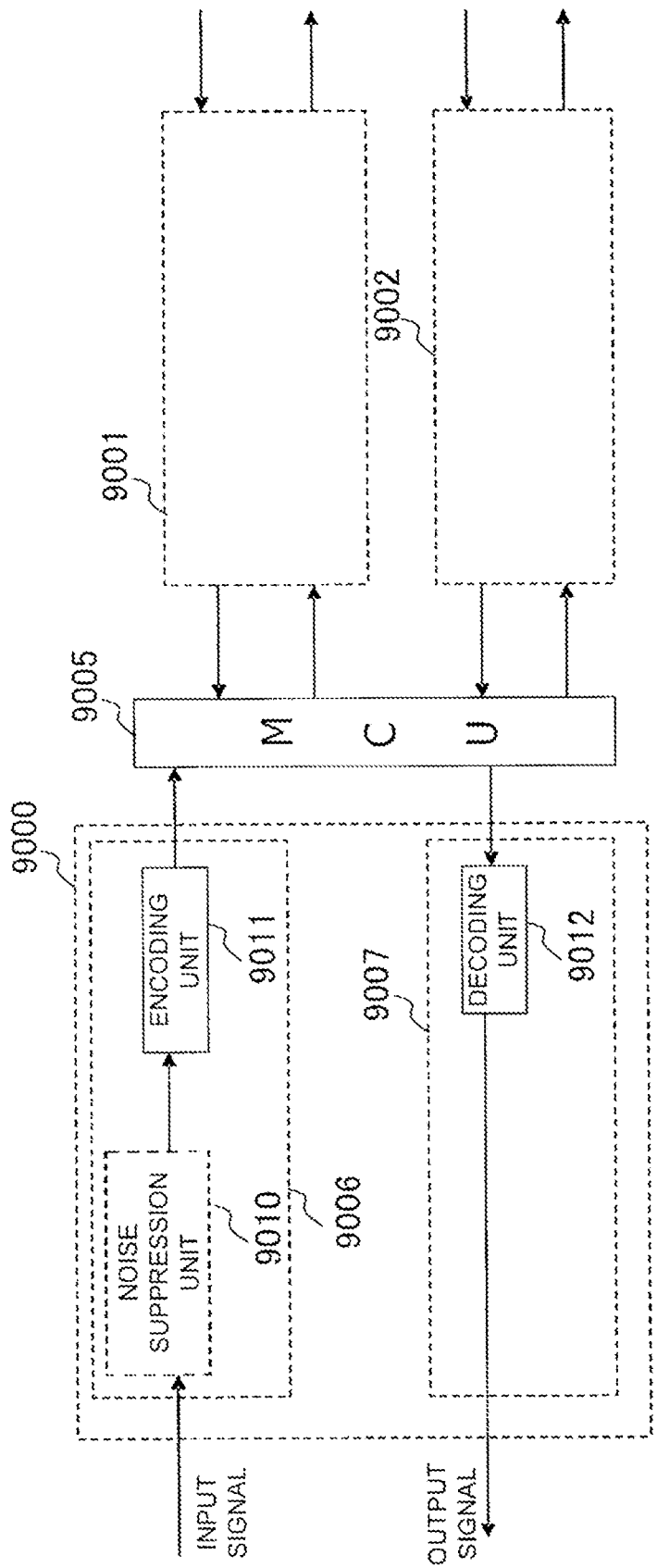
FIG. 74 is a block diagram illustrating the conventional multipoint conference system.

A fifteenth embodiment of the present invention will be explained. FIG. 73 is a block diagram of the signal processing device founded upon the fifteenth embodiment of the present invention. The fifteenth embodiment of the present invention includes computers (central processing devices; processors; data processing devices) 3500, 3501, 3502, and 3503 each of which operates under a program control. Each of the computers 3500, 3501, and 3502, which performs the process of the receiving unit and the transmission unit explained in the first embodiment to the fourteenth embodiment, and receives the input signal, and outputs the transmission signal, operates based upon a program for receiving the transmission signal and generating the output signal. On the other hand, the computer 3503, which performs the process of the multipoint control unit explained in the first embodiment to the fourteenth embodiment, operates based upon a program for mixing the transmission signals coming from each terminal and delivering a mixture result to each terminal. In this embodiment, while an example in which the number of the computers being connected to the computer 3503 was three was explained, the signal processing device can be configured of the terminals of which the number is arbitrary.

Above, while the present invention has been described with respect to the preferred embodiments and examples, the present invention is not always limited to the above-mentioned embodiment and examples, and alterations to, variations of, and equivalent to these embodiments and the examples can be implemented without departing from the spirit and scope of the present invention.

The 1st invention inventions is characterized in that a multipoint control unit, comprising: a first signal receiving unit for receiving a first signal including a plurality of component elements, and first analysis information indicative of a relation between the plurality of component elements being included in said first signal; a second signal receiving unit for receiving a second signal including a plurality of component elements, and second analysis information indicative of a relation between the plurality of component elements being included in said second signal; a signal mixing unit for mixing said first signal and said second signal; and an analysis information mixing unit for mixing said first analysis information and said second analysis information.

In addition, the 2nd invention in the above-mentioned 1st invention is characterized in that said analysis information mixing unit comprises an analysis parameter mixing unit for converting said first analysis information into a first analysis parameter indicative of frequency components, and said second analysis information into a second analysis parameter indicative of frequency components, and mixing said first analysis parameter and said second analysis parameter for each frequency component.

In addition, the 3rd invention in the above-mentioned 1st invention is characterized in that said signal mixing unit generates mixed information; and said analysis information mixing unit mixes said first analysis information and said second analysis information based upon said mixed information.

In addition, the 4th invention in the above-mentioned 3rd invention is characterized in that said analysis information mixing unit comprises an analysis parameter mixing unit for converting said first analysis information into a first analysis parameter indicative of frequency components, and said second analysis information into a second analysis parameter indicative of frequency components, and mixing said first analysis parameter and said second analysis parameter for each frequency component based upon said mixed information.

In addition, the 5th invention in the above-mentioned 4th invention is characterized in that said analysis information mixing unit comprises a selection unit for selecting said first analysis parameter and said second analysis parameter.

In addition, the 6th invention in the above-mentioned 3rd or 4th inventions is characterized in that said mixed information is a weighting for said first signal and said second signal.

In addition, the 7th invention in the above-mentioned 1st invention is characterized in that said first signal receiving unit receives first object information indicative of a characteristic of said first signal for each frequency component; said second signal receiving unit receives second object information indicative of a characteristic of said second signal for each frequency component; and said multipoint control unit further comprises an object information mixing unit for mixing said first object information and said second object information.

In addition, the 8th invention in the above-mentioned 7th invention is characterized in that said object information mixing unit selects said first object information and said second object information responding to an importance degree.

In addition, the 9th invention is characterized in that a signal analysis device, comprising: a signal receiving unit for receiving an input signal including a plurality of component elements; a signal analysis unit for generating analysis information indicative of a relation between said plurality of component elements from said input signal; and an object information extraction unit for generating object information indicative of a characteristic of said input signal for frequency component.

In addition, the 10th invention is characterized in that a signal control device, comprising: a signal receiving unit for receiving an input signal including a plurality of component elements, analysis information indicative of a relation between said plurality of component elements, and object information indicative of a characteristic of said input signal for each frequency component; and an output signal generation unit for receiving component element rendering information for controlling an output of said component element, and generating an output signal in which said component element has been controlled, based upon said analysis information, said object information, and said component element rendering information.

In addition, the 11th invention in the above-mentioned 10th invention is characterized in that said output signal generation unit comprises: a component element information conversion unit for generating object rendering information indicative of a relation between said input signal and said output signal for each frequency component based upon said analysis information; a rendering information generation unit for generating said rendering information based upon said object information and said object rendering information; and a rendering unit for generating said output signal from said input signal based upon said rendering information.

In addition, the 12th invention in the above-mentioned 10th invention is characterized in that said output signal generation unit comprises: a component element information conversion unit for generating object rendering information indicative of a relation between said input signal and said output signal for each frequency component based upon said analysis information and said input signal; a rendering information generation unit for generating said rendering information based upon said object information and said object rendering information; and a rendering unit for generating said output signal from said input signal based upon said rendering information.

In addition, the 13th invention in the above-mentioned 10th invention is characterized in that said output signal generation unit further receives signal control information for controlling a specific component element, and generates an output signal in which said component element has been controlled, based upon said analysis information, said object information, said component element rendering information, and said signal control information.

In addition, the 14th invention in the above-mentioned 13th invention is characterized in that said output signal generation unit comprises: a signal control unit for generating an object signal in which said signal has been decomposed into frequency components, based upon said object information, decomposing a component element of said object signal based upon said analysis information, modifying said component element based upon said signal control information, generating a modified signal from said modified component element, and generating a parameter indicative of a relation between said modified component element and said modified signal; a rendering information generation unit for generating rendering information indicative of a relation between said modified signal and said output signal from said component element rendering information based upon said parameter; and a rendering unit for generating said output signal from said modified signal based upon said rendering information.

In addition, the 15th invention in the above-mentioned 13th invention is characterized in that said output signal generation unit comprises: a component element information conversion unit for generating object rendering information indicative of a relation between said input signal and said output signal for each frequency component based upon said analysis information and said signal control information; a rendering information generation unit for generating said rendering information based upon said object information and said object rendering information; and a rendering unit for generating said output signal from said input signal based upon said rendering information.

In addition, the 16th invention in the above-mentioned 13th invention is characterized in that said output signal generation unit comprises: a component element information conversion unit for generating object rendering information indicative of a relation between an object signal and said output signal for each frequency component based upon said analysis information, said signal control information, and said input signal; a rendering information generation unit for generating said rendering information based upon said object information and said object rendering information; and a rendering unit for generating said output signal from said input signal based upon said rendering information.

In addition, the 17th invention is characterized in that a signal control device, comprising: a signal receiving unit for receiving an input signal including a plurality of component elements, analysis information indicative of a relation between said plurality of component elements, and object information indicative of a characteristic of said input signal for each frequency component; and an output signal generation unit for receiving object rendering information indicative of a relation between said input signal and an output signal for each frequency component, and signal control information for controlling a specific component element, and generating an output signal in which said component element has been controlled, based upon said analysis information, said object information, said object rendering information, and said signal control information.

In addition, the 18th invention in the above-mentioned 17th invention is characterized in that said output signal generation unit comprises: a signal control unit for generating an object signal in which said signal has been decomposed into frequency components, based upon said object information, decomposing a component element of said object signal based upon said analysis information, modifying said component element based upon said signal control information, generating a modified signal from said modified component element, and generating a parameter indicative of a relation between said modified component element and said modified signal; a rendering information generation unit for generating rendering information indicative of a relation between said modified signal and said output signal based upon said parameter and said object rendering information; and a rendering unit for generating said output signal from said modified signal based upon said rendering information.

In addition, the 19th invention in the above-mentioned 17th invention is characterized in that said output signal generation unit comprises: an object rendering information modification unit for modifying said object rendering information based upon said analysis information and said signal control information; a rendering information generation unit for generating said rendering information based upon said object information and said object rendering information; and a rendering unit for generating said output signal from said input signal based upon said rendering information.

In addition, the 20th invention in the above-mentioned 17th invention is characterized in that said output signal generation unit comprises: an object rendering information modification unit for modifying said object rendering information based upon said analysis information, said signal control information, and said input signal; a rendering information generation unit for generating said rendering information based upon said object information and said object rendering information; and a rendering unit for generating said output signal from said input signal based upon said rendering information.

In addition, the 21st invention is characterized in that a multipoint control method, comprising: receiving a first signal including a plurality of component elements, and first analysis information indicative of a relation between the plurality of component elements being included in said first signal; receiving a second signal including a plurality of component elements, and second analysis information indicative of a relation between the plurality of component elements being included in said second signal; mixing said first signal and said second signal; and mixing said first analysis information and said second analysis information.

In addition, the 22nd invention in the above-mentioned 21st invention is characterized in that said multipoint control method comprising converting said first analysis information into a first analysis parameter indicative of frequency components, and said second analysis information into a second analysis parameter indicative of frequency components, and mixing said first analysis parameter and said second analysis parameter for each frequency component.

In addition, the 23rd invention in the above-mentioned 21st invention is characterized in that said multipoint control method comprising: generating mixed information by mixing said first signal and said second signal; and mixing said first analysis information and said second analysis information based upon said mixed information.

In addition, the 24th invention in the above-mentioned 23rd invention is characterized in that said multipoint control method comprising converting said first analysis information into a first analysis parameter indicative of frequency components, and said second analysis information into a second analysis parameter indicative of frequency components, and mixing said first analysis parameter and said second analysis parameter for each frequency component based upon said mixed information.

In addition, the 25th invention in the above-mentioned 24th invention is characterized in that said multipoint control method comprising selecting said first analysis parameter and said second analysis parameter.

In addition, the 26th invention in the above-mentioned 23rd or 24th inventions is characterized in that said mixed information is a weighting for said first signal and said second signal.

In addition, the 27th invention in the above-mentioned 21st invention is characterized in that said multipoint control method comprising: receiving first object information indicative of a characteristic of said first signal for each frequency component; receiving second object information indicative of a characteristic of said second signal for each frequency component; and further mixing said first object information and said second object information.

In addition, the 28th invention in the above-mentioned 27th invention is characterized in that said multipoint control method comprising selecting said first object information and said second object information responding to an importance degree.

In addition, the 29th invention is characterized in that a signal analysis method comprising: from an input signal including a plurality of component elements, generating analysis information indicative of a relation between said plurality of component elements; and generating object information indicative of a characteristic of said input signal for each frequency component.

In addition, the 30th invention is characterized in that a signal control method, comprising: receiving an input signal including a plurality of component elements, analysis information indicative of a relation between said plurality of component elements, and object information indicative of a characteristic of said input signal for each frequency component; and receiving component element rendering information for controlling an output of said component element, and generating an output signal in which said component element has been controlled, based upon said analysis information, said object information, and said component element rendering information.

In addition, the 31st invention in the above-mentioned 30th invention is characterized in that said signal control method comprising: generating object rendering information indicative of a relation between said input signal and said output signal for each frequency component based upon said analysis information; generating said rendering information based upon said object information and said object rendering information; and generating said output signal from said input signal based upon said rendering information.

In addition, the 32nd invention in the above-mentioned 30th invention is characterized in that said A signal control method comprising: generating object rendering information indicative of a relation between said input signal and said output signal for each frequency component based upon said analysis information and said input signal; generating said rendering information based upon said object information and said object rendering information; and generating said output signal from said input signal based upon said rendering information.

In addition, the 33rd invention in the above-mentioned 30th invention is characterized in that said signal control method comprising receiving signal control information for controlling a specific component element, and generating an output signal in which said component element has been controlled, based upon said analysis information, said object information, said component element rendering information, and said signal control information.

In addition, the 34th invention in the above-mentioned 33th invention is characterized in that said signal control method comprising: generating an object signal in which said signal has been decomposed into frequency components, based upon said object information, decomposing a component element of said object signal based upon said analysis information, modifying said component element based upon said signal control information, generating a modified signal from said modified component element, and generating a parameter indicative of a relation between said modified component element and said modified signal; generating rendering information indicative of a relation between said modified signal and said output signal from said component element rendering information based upon said parameter; and generating said output signal from said modified signal based upon said rendering information.

In addition, the 35th invention in the above-mentioned 33th invention is characterized in that said A signal control method comprising: generating object rendering information indicative of a relation between said input signal and said output signal for each frequency component based upon said analysis information and said signal control information; generating said rendering information based upon said object information and said object rendering information; and generating said output signal from said input signal based upon said rendering information.

In addition, the 36th invention in the above-mentioned 33rd invention is characterized in that said signal control method comprising: generating object rendering information indicative of a relation between an object signal and said output signal for each frequency component based upon said analysis information, said signal control information, and said input signal; generating said rendering information based upon said object information and said object rendering information; and generating said output signal from said input signal based upon said rendering information.

In addition, the 37th invention is characterized in that a signal control method, comprising: receiving an input signal including a plurality of component elements, analysis information indicative of a relation between said plurality of component elements, and object information indicative of a characteristic of said input signal for each frequency component; and receiving object rendering information indicative of a relation between said input signal and an output signal for each frequency component, and signal control information for controlling a specific component element, and generating an output signal in which said component element has been controlled, based upon said analysis information, said object information, said object rendering information, and said signal control information.

In addition, the 38th invention in the above-mentioned 37th invention is characterized in that said signal control method comprising: generating an object signal in which said signal has been decomposed into frequency components, based upon said object information, decomposing a component element of said object signal based upon said analysis information, modifying said component element based upon said signal control information, generating a modified signal from said modified component element, and generating a parameter indicative of a relation between said modified component element and said modified signal; generating rendering information indicative of a relation between said modified signal and said output signal based upon said parameter and said object rendering information; and generating said output signal from said modified signal based upon said rendering information.

In addition, the 39th invention in the above-mentioned 37th invention is characterized in that said signal control method comprising: modifying said object rendering information based upon said analysis information and said signal control information; generating said rendering information based upon said object information and said object rendering information; and generating said output signal from said input signal based upon said rendering information.

In addition, the 40th invention in the above-mentioned 37th invention is characterized in that said signal control method comprising: modifying said object rendering information based upon said analysis information, said signal control information, and said input signal; generating said rendering information based upon said object information and said object rendering information; and generating said output signal from said input signal based upon said rendering information.

In addition, the 41st invention is characterized in that a program for causing an information processing device to execute the processes of: receiving a first signal including a plurality of component elements, and first analysis information indicative of a relation between the plurality of component elements being included in said first signal; receiving a second signal including a plurality of component elements, and second analysis information indicative of a relation between the plurality of component elements being included in said second signal; mixing said first signal and said second signal; and mixing said first analysis information and said second analysis information.

In addition, the 42nd invention is characterized in that a program for causing an information processing device to execute the processes of: receiving an input signal including a plurality of component elements, generating analysis information indicative of a relation between said plurality of component elements from said input signal; and generating object information indicative of a characteristic of said input signal for each frequency component.

In addition, the 43rd invention is characterized in that a program for causing an information processing device to execute the processes of: receiving an input signal including a plurality of component elements, analysis information indicative of a relation between said plurality of component elements, and object information indicative of a characteristic of said input signal for each frequency component; and receiving component element rendering information for controlling an output of said component element, and generating an output signal in which said component element has been controlled, based upon said analysis information, said object information, and said component element rendering information.

In addition, the 44th invention is characterized in that a program for causing an information processing device to execute the processes of: receiving an input signal including a plurality of component elements, analysis information indicative of a relation between said plurality of component elements, and object information indicative of a characteristic of said input signal for each frequency component; and receiving object rendering information indicative of a relation between said input signal and an output signal for each frequency component, and signal control information for controlling a specific component element, and generating an output signal in which said component element has been controlled, based upon said analysis information, said object information, said object rendering information, and said signal control information.

This application is based upon and claims the benefit of priority from Japanese patent application No. 2007-168547, filed on Jun. 27, 2007, the disclosure of which is incorporated herein in its entirety by reference.

The invention claimed is:

1. A multipoint control unit for controlling signal exchange between a plurality of terminal, comprising:
   a first signal receiving unit configured to receive a first signal including sound and noise, said sound and said noise are not separated, and first analysis information indicative of a relation between said sound and said noise included in said first signal, from a first terminal, said first analysis information is generated based on said first signal by said first terminal;
   a second signal receiving unit configured to receive a second signal including sound and noise, said sound and said noise are not separated, and second analysis information indicative of a relation between said sound and said noise being included in said second signal, from second terminal, said second analysis information is generated based on said second signal by said second terminal;
   a signal mixing unit configured to mix said first signal and said second signal according to weights of said first signal and said second signal, said weights are generated by comparing a sound level of said first signal and a sound level of said second signal, such that the sound level is increased for the signal, among the first and the second signals, with a higher sound level;

an analysis information mixing unit configured to mix said first analysis information and said second analysis information according to said weights of said first signal and said second signal; and transmitter configured to transmit said mixed signal and said analysis information to a third terminal, said third terminal generates an output signal by controlling said mixed signal based upon said analysis information.

2. A multipoint control unit according to claim 1, wherein said analysis information mixing unit comprises an analysis parameter mixing unit configured to convert said first analysis information into a first analysis parameter indicative of frequency components of said first analysis information, and said second analysis information into a second analysis parameter indicative of frequency components of said second analysis information, and mix said first analysis parameter and said second analysis parameter for each predetermined frequency component based upon said weights of said first signal and said second signal.

3. A multipoint control unit according to claim 1:
wherein said first signal receiving unit configured to receive first object information indicative of a characteristic of each frequency component of said first signal;
wherein said second signal receiving unit configured to receive second object information indicative of a characteristic of each frequency component of said second signal; and
wherein said multipoint control unit further comprises an object information mixing unit configured to mix said first object information and said second object information.

4. A multipoint control unit according to claim 3, wherein said object information mixing unit configured to select said first object information and said second object information responding to an importance degree.

5. The multipoint control unit according to claim 1, wherein the sounds of the first signal and second signal are received by a microphone and the noises of the first signal and second signal are background sound received by the microphone.

6. A multipoint control method of controlling signal exchange between a plurality of terminals, comprising:
receiving a first signal including sound and noise, said sound and said noise are not separated, and first analysis information indicative of a relation between said sound and said noise being included in said first signal, from a first terminal, said first analysis information is generated based on said first signal by said first terminal;
receiving a second signal including sound and noise, said sound and said noise are not separated, and second analysis information indicative of a relation between said sound and said noise being included in said second signal, from second terminal, said second analysis information is generated based on said second signal by said second terminal;
mixing said first signal and said second signal according to weights of said first signal and said second signal, and transmits said mixed signal to a third terminal, said weights are generated by comparing a sound level of said first signal and a sound level of said second signal, such that the sound level is increased for the signal, among the first and the second signals, with a higher sound level;
mixing said first analysis information and said second analysis information according to said weights of said first signal and said second signal, and transmits said mixed analysis information to a third terminal; and transmitting said mixed signal and said analysis information to a third terminal, said third terminal generates an output signal by controlling said mixed signal based upon said analysis information.

7. A multipoint control method according to claim 6, comprising converting said first analysis information into a first analysis parameter indicative of frequency components, and said second analysis information into a second analysis parameter indicative of frequency components, and mixing said first analysis parameter and said second analysis parameter for each frequency component based upon said weights of said first signal and said second signal.

8. A multipoint control method according to claim 6, comprising:
receiving first object information indicative of a characteristic of each frequency component of said first signal;
receiving second object information indicative of a characteristic of each frequency component of said second signal; and
further mixing said first object information and said second object information.

9. A multipoint control method according to claim 8, comprising selecting said first object information and said second object information responding to an importance degree.

10. The multipoint control method according to claim 6, wherein the sounds of the first signal and second signal are received by a microphone and the noises of the first signal and second signal are background sound received by the microphone.

11. A non-transitory computer readable recording medium in which a program for causing an information processing device to execute the processes of:
receiving a first signal including sound and noise, said sound and said noise are not separated, and first analysis information indicative of a relation between said sound and said noise being included in said first signal, said first analysis information is generated based on said first signal by said first terminal;
receiving a second signal including sound and noise, said sound and said noise are not separated, and second analysis information indicative of a relation between said sound and said noise being included in said second signal, said second analysis information is generated based on said second signal by said second terminal;
mixing said first signal and said second signal according to weights of said first signal and said second signal, said weights are generated by comparing a sound level of said first signal and a sound level of said second signal, such that the sound level is increased for the signal, among the first and the second signals, with a higher sound level;
mixing said first analysis information and said second analysis information according to said weights of said first signal and said second signal; and
transmitting said mixed signal and said analysis information to a third terminal, said third terminal generates an output signal by controlling said mixed signal based upon said analysis information.

12. The non-transitory computer readable recording medium according to claim 11, wherein the sounds of the first signal and second signal are received by a microphone and the noises of the first signal and second signal are background sound received by the microphone.

13. A multipoint control system comprising a plurality of signal analysis devices, a plurality of signal control devices, and a multipoint control unit configured to mix input signals coming from said signal analysis devices other than a signal analysis device of a distribution destination, and transmits a mixed signal to a signal control device of the distribution destination:
   wherein each of said signal analysis devices comprises:
   relation between sound and noise of input signal; and
   a signal transmitting unit configured to transmit said input signal and analysis information to said multipoint control unit;
   wherein, said multipoint control unit comprises:
   a plurality of signal receiving units each of which receives said input signals and said analysis information from the signal analysis device, being the distribution destination;
   a plurality of signal mixing units, each of said signal mixing units configured to generate a mixed signal by performing a weighted addition for the input signals other than said input signal of the distribution destination, said weighted being generated based on a comparison a first sound level of a first input signal among the input signals and a second sound level of a second input signal among the input signals, so that the sound level is increased for the input signal, among the first and the second input signals, with a higher sound level;
   a plurality of analysis information mixing units, each of said analysis information mixing units configured to generate mixed analysis information from analysis information other than analysis information coming from the distribution destination; and
   a plurality of signal transmitting units, each of said signal transmitting units configured to transmit the mixed signal generated from the input signals other than the input signal of the destination distribution, and the mixed analysis information generated from the input signals other than the input signal of the distribution destination to the signal control device, being the distribution destination; and
   wherein each of said signal control devices comprises:
   a signal receiving unit configured to receive said mixed signal and said mixed analysis information from said multipoint control unit; and
   an output signal generation unit configured to generate an output signal by controlling component elements of the input signal composed in said mixed signal based upon said analysis information and component element rendering information for controlling said output signal of the component elements.

* * * * *